(12) United States Patent
Zhang et al.

(10) Patent No.: US 10,462,891 B2
(45) Date of Patent: Oct. 29, 2019

(54) COST EFFECTIVE CARTRIDGE FOR A PLASMA ARC TORCH

(71) Applicant: Hypertherm, Inc., Hanover, NH (US)

(72) Inventors: Yu Zhang, Hanover, NH (US); Zheng Duan, Hanover, NH (US); Mahyar Esmaili, Wilmot, NH (US); Mike Kornprobst, Lebanon, NH (US); Brett Hansen, Mapleton, UT (US); Garrett Quillia, Enfield, NH (US)

(73) Assignee: Hypertherm, Inc., Hanover, NH (US)

( * ) Notice: Subject to any disclaimer, the term of this patent is extended or adjusted under 35 U.S.C. 154(b) by 456 days.

(21) Appl. No.: 15/043,044

(22) Filed: Feb. 12, 2016

(65) Prior Publication Data

US 2016/0165712 A1    Jun. 9, 2016

Related U.S. Application Data

(63) Continuation-in-part of application No. 14/824,946, filed on Aug. 12, 2015.

(60) Provisional application No. 62/036,393, filed on Aug. 12, 2014.

(51) Int. Cl.
*H05B 1/02* (2006.01)
*H05H 1/34* (2006.01)
*B23K 10/02* (2006.01)

(52) U.S. Cl.
CPC ............ *H05H 1/34* (2013.01); *B23K 10/02* (2013.01); *H05H 2001/3457* (2013.01); *H05H 2001/3468* (2013.01); *H05H 2001/3489* (2013.01)

(58) Field of Classification Search
CPC ............. H05B 1/34; H05B 2001/3457; H05B 2001/3468; H05B 2001/3489; B23K 10/02; B23K 10/006
USPC ............. 219/121.5, 121.51, 121.52, 121.48, 219/121.54, 121.57
See application file for complete search history.

(56) References Cited

U.S. PATENT DOCUMENTS

| | | | |
|---|---|---|---|
| 2,985,050 A | 5/1961 | Schwacha |
| 3,018,360 A | 1/1962 | Engel |
| 3,153,133 A | 10/1964 | Ducati |
| 3,279,177 A | 10/1966 | Ducati |
| 3,294,953 A | 12/1966 | Spies |
| 3,518,401 A | 6/1970 | Mathews |

(Continued)

FOREIGN PATENT DOCUMENTS

| | | |
|---|---|---|
| DE | 202013010576 | 2/2014 |
| EP | 0242023 A2 | 10/1987 |

(Continued)

OTHER PUBLICATIONS

U.S. Appl. No. 15/043,028, Zhang et al., filed Feb. 12, 2016.

(Continued)

*Primary Examiner* — Mark H Paschall
(74) *Attorney, Agent, or Firm* — Proskauer Rose LLP

(57) ABSTRACT

A crown for a plasma arc torch is provided. The crown includes a body defining a proximal and a distal end. The body includes an electrically conductive material. The crown also includes at least one raised feature at the proximal end of the body. The raised feature is adapted to activate a consumable sensor inside of the plasma arc torch. The crown further includes a biasing surface at the proximal end of the body for physically contacting a resilient element.

26 Claims, 23 Drawing Sheets

(56) References Cited

U.S. PATENT DOCUMENTS

| | | |
|---|---|---|
| 3,684,911 A | 8/1972 | Perugini et al. |
| 4,011,996 A | 3/1977 | Tsuji et al. |
| 4,034,250 A | 7/1977 | Kiselev et al. |
| 4,087,050 A | 5/1978 | Tsuji et al. |
| 4,311,897 A | 1/1982 | Yerushalmy |
| 4,355,262 A | 10/1982 | Chan et al. |
| 4,519,835 A | 5/1985 | Gauvin et al. |
| 4,570,048 A | 2/1986 | Poole |
| 4,620,080 A | 10/1986 | Arata et al. |
| 4,682,005 A | 7/1987 | Marhic |
| 4,687,139 A | 8/1987 | Lockwood |
| 4,733,052 A | 3/1988 | Nilsson et al. |
| 4,783,004 A | 11/1988 | Lockwood |
| 4,896,016 A | 1/1990 | Broberg et al. |
| 4,914,271 A | 4/1990 | Delzenne et al. |
| 4,924,060 A | 5/1990 | Delzenne |
| 4,929,811 A | 5/1990 | Blankenship |
| 4,940,877 A | 7/1990 | Broberg |
| 4,948,485 A | 8/1990 | Wallsten et al. |
| 4,967,055 A | 10/1990 | Raney et al. |
| 4,982,067 A | 1/1991 | Marantz et al. |
| 5,018,670 A | 5/1991 | Chalmers |
| 5,023,425 A | 6/1991 | Severance, Jr. |
| 5,132,512 A | 7/1992 | Sanders et al. |
| 5,144,110 A | 9/1992 | Marantz et al. |
| 5,183,646 A | 2/1993 | Anderson et al. |
| 5,200,595 A | 4/1993 | Boulos et al. |
| 5,208,441 A | 5/1993 | Broberg |
| 5,239,161 A | 8/1993 | Lang |
| 5,309,683 A | 5/1994 | Rockett |
| 5,317,126 A | 5/1994 | Couch, Jr. et al. |
| 5,390,964 A | 2/1995 | Gray, Jr. |
| 5,409,164 A | 4/1995 | Delzenne et al. |
| 5,440,477 A | 5/1995 | Rohrberg et al. |
| 5,502,245 A | 3/1996 | Dassel et al. |
| 5,518,221 A | 5/1996 | Zurecki et al. |
| 5,556,562 A | 9/1996 | Sorenson |
| 5,558,842 A | 9/1996 | Vassiliou et al. |
| 5,560,844 A | 10/1996 | Boulos et al. |
| 5,580,531 A | 12/1996 | Vassiliou et al. |
| 5,695,662 A | 12/1997 | Couch, Jr. et al. |
| 5,717,187 A | 2/1998 | Rogozinski et al. |
| 5,796,067 A | 8/1998 | Enyedy et al. |
| 5,801,282 A | 9/1998 | Dassel et al. |
| 5,841,095 A | 11/1998 | Lu et al. |
| 5,844,196 A | 12/1998 | Oakley |
| 5,860,849 A | 1/1999 | Miller |
| 5,874,707 A | 2/1999 | Iida et al. |
| 5,897,795 A | 4/1999 | Lu et al. |
| 5,968,379 A | 10/1999 | Zhao et al. |
| 5,994,663 A | 11/1999 | Lu |
| 6,084,199 A | 7/2000 | Lindsay et al. |
| 6,096,993 A | 8/2000 | Marhic et al. |
| 6,133,542 A | 10/2000 | Dvorak et al. |
| 6,147,318 A | 11/2000 | Marhic |
| 6,163,008 A | 12/2000 | Roberts et al. |
| 6,169,264 B1 | 1/2001 | Marhic |
| 6,256,873 B1 | 7/2001 | Tiffany et al. |
| 6,320,156 B1 | 11/2001 | Yamaguchi et al. |
| 6,337,460 B2 | 1/2002 | Kelkar et al. |
| 6,365,867 B1 | 4/2002 | Hooper |
| 6,444,945 B1 | 9/2002 | Maschwitz et al. |
| 6,525,292 B1 | 2/2003 | Girold |
| 6,616,767 B2 | 9/2003 | Zhao et al. |
| 6,657,162 B1 | 12/2003 | Jung et al. |
| 6,703,581 B2 | 3/2004 | Jones et al. |
| 6,713,711 B2 | 3/2004 | Conway et al. |
| 6,717,096 B2 | 4/2004 | Hewett et al. |
| 6,800,336 B1 | 10/2004 | Fornsel et al. |
| 6,881,921 B2 | 4/2005 | Horner-Richardson et al. |
| 6,888,092 B2 | 5/2005 | Walters |
| 6,903,301 B2 | 6/2005 | Jones et al. |
| 6,919,526 B2 | 7/2005 | Kinerson et al. |
| 6,936,786 B2 | 8/2005 | Hewett et al. |
| 6,946,616 B2 | 9/2005 | Kinerson et al. |
| 6,989,505 B2 | 1/2006 | MacKenzie et al. |
| 7,030,337 B2 | 4/2006 | Baker et al. |
| 7,161,111 B2 | 1/2007 | Schneider |
| 7,196,283 B2 | 3/2007 | Buchberger et al. |
| 7,202,440 B2 | 4/2007 | Hewett et al. |
| 7,220,937 B2 | 5/2007 | Hofman et al. |
| 7,375,302 B2 | 5/2008 | Twarog et al. |
| 7,411,149 B2 | 8/2008 | Schneider |
| 7,423,235 B2 | 9/2008 | Severance, Jr. |
| 7,598,473 B2 | 10/2009 | Cook et al. |
| 7,615,720 B2 | 11/2009 | Sanders |
| 7,622,693 B2 | 11/2009 | Foret |
| 7,671,294 B2 | 3/2010 | Belashchenko et al. |
| 7,759,599 B2 | 7/2010 | Hawley et al. |
| 7,927,094 B2 | 4/2011 | Fong et al. |
| 8,030,592 B2 | 10/2011 | Weidman |
| 8,035,055 B2 | 10/2011 | Twarog et al. |
| 8,089,025 B2 | 1/2012 | Sanders |
| 8,097,828 B2 | 1/2012 | Roberts et al. |
| 8,115,136 B2 | 2/2012 | Mather et al. |
| 8,203,095 B2 | 6/2012 | Storm et al. |
| 8,373,084 B2 | 2/2013 | Salsich |
| 8,389,887 B2 | 3/2013 | Liebold et al. |
| 8,395,076 B2 | 3/2013 | Matus |
| 8,395,077 B2 | 3/2013 | Duan et al. |
| 8,455,786 B2 | 6/2013 | Fang |
| 8,546,719 B2 | 10/2013 | Warren, Jr. et al. |
| 8,575,510 B2 | 11/2013 | Laurish et al. |
| 8,581,139 B2 | 11/2013 | Severance, Jr. |
| 8,624,150 B2 * | 1/2014 | Simek .................. B23K 10/00 219/121.48 |
| 8,698,036 B1 | 4/2014 | Zhang et al. |
| 8,698,306 B2 | 4/2014 | Yu et al. |
| 8,759,715 B2 | 6/2014 | Narayanan et al. |
| 8,790,447 B2 | 7/2014 | Bieri et al. |
| 8,921,731 B2 | 12/2014 | Krink et al. |
| 9,157,360 B2 | 10/2015 | Hoy-Peterson et al. |
| 9,398,679 B2 | 7/2016 | Namburu |
| 9,550,251 B2 | 1/2017 | Guilotta |
| 9,609,733 B2 | 3/2017 | Severance |
| 2002/0012756 A1 | 1/2002 | Kuckertz et al. |
| 2002/0117482 A1 | 8/2002 | Hewett et al. |
| 2002/0117483 A1 | 8/2002 | Jones et al. |
| 2002/0117484 A1 | 8/2002 | Jones et al. |
| 2003/0085205 A1 | 5/2003 | Lai et al. |
| 2003/0148709 A1 | 8/2003 | Anand et al. |
| 2004/0177807 A1 | 9/2004 | Pui et al. |
| 2004/0195217 A1 | 10/2004 | Conway et al. |
| 2005/0061784 A1 * | 3/2005 | Matus .................. B23K 9/0956 219/121.54 |
| 2006/0016789 A1 | 1/2006 | Mackenzie et al. |
| 2006/0163216 A1 * | 7/2006 | Brandt .................... H05H 1/34 219/121.39 |
| 2006/0289397 A1 | 12/2006 | Mahawill |
| 2006/0289398 A1 | 12/2006 | Cook et al. |
| 2006/0289406 A1 | 12/2006 | Helenius et al. |
| 2007/0044449 A1 | 3/2007 | O'brien et al. |
| 2007/0045241 A1 | 3/2007 | Schneider et al. |
| 2007/0082532 A1 | 4/2007 | Morris |
| 2007/0082533 A1 | 4/2007 | Currier et al. |
| 2007/0090168 A1 | 4/2007 | Snow et al. |
| 2007/0154306 A1 | 7/2007 | Anderson et al. |
| 2007/0181540 A1 | 8/2007 | Lindsay et al. |
| 2007/0210034 A1 | 9/2007 | Mather et al. |
| 2007/0262060 A1 | 11/2007 | Roberts et al. |
| 2008/0083711 A1 * | 4/2008 | Twarog .................. H05H 1/34 219/121.48 |
| 2008/0217305 A1 | 9/2008 | Sanders |
| 2008/0210669 A1 | 10/2008 | Yang et al. |
| 2008/0237356 A1 | 10/2008 | Singleton et al. |
| 2008/0308535 A1 | 12/2008 | Rego et al. |
| 2009/0026180 A1 | 1/2009 | Yang et al. |
| 2009/0027782 A1 | 1/2009 | Takahashi et al. |
| 2009/0045174 A1 | 2/2009 | Haberler et al. |
| 2009/0152255 A1 | 6/2009 | Ma et al. |
| 2009/0206721 A1 | 8/2009 | Foret |
| 2009/0230095 A1 | 9/2009 | Liebold et al. |
| 2009/0230097 A1 | 9/2009 | Liebold et al. |
| 2009/0277882 A1 | 11/2009 | Bornemann |

(56) References Cited

U.S. PATENT DOCUMENTS

| | | |
|---|---|---|
| 2010/0078408 A1 | 4/2010 | Liebold et al. |
| 2010/0084381 A1 | 4/2010 | Indraczek et al. |
| 2010/0133241 A1 | 6/2010 | Wilhelm et al. |
| 2010/0264120 A1 | 10/2010 | Reinke et al. |
| 2011/0042358 A1 | 2/2011 | Albanese et al. |
| 2012/0012560 A1 | 1/2012 | Roberts et al. |
| 2012/0012565 A1 | 1/2012 | Zhang et al. |
| 2012/0036832 A1 | 2/2012 | Hoy-Petersen et al. |
| 2012/0055907 A1 | 3/2012 | Allimant et al. |
| 2012/0058649 A1 | 3/2012 | Okumura et al. |
| 2012/0060691 A1 | 3/2012 | Bieri et al. |
| 2012/0103946 A1 | 5/2012 | Krink et al. |
| 2012/0152913 A1 | 6/2012 | Mather et al. |
| 2012/0181257 A1 | 7/2012 | Mather et al. |
| 2012/0246922 A1 | 10/2012 | Hussary et al. |
| 2012/0248073 A1 | 10/2012 | Conway et al. |
| 2012/0261392 A1 | 10/2012 | Barnett et al. |
| 2013/0043222 A1 | 2/2013 | Leiteritz et al. |
| 2013/0043224 A1 | 2/2013 | Leiteritz et al. |
| 2013/0087535 A1 | 4/2013 | Barnett et al. |
| 2013/0103466 A1 | 4/2013 | Fisher |
| 2013/0126487 A1 | 5/2013 | Crowe |
| 2013/0153545 A1 | 6/2013 | Kim et al. |
| 2013/0248497 A1 | 9/2013 | Stoeger et al. |
| 2014/0021172 A1 | 1/2014 | Sanders et al. |
| 2014/0023856 A1 | 1/2014 | Bisges et al. |
| 2014/0069895 A1* | 3/2014 | Brine .......... B23K 10/00 219/121.44 |
| 2014/0076861 A1 | 3/2014 | Cornelius et al. |
| 2014/0113527 A1* | 4/2014 | Lindsay .......... B23K 5/00 451/5 |
| 2014/0217070 A1 | 8/2014 | Pikus et al. |
| 2015/0076819 A1 | 3/2015 | Mather et al. |
| 2015/0129562 A1 | 5/2015 | Severance, Jr. |
| 2015/0181686 A1 | 6/2015 | Schulze et al. |
| 2015/0273617 A1 | 10/2015 | Gullotta |
| 2015/0319835 A1 | 11/2015 | Sanders et al. |
| 2015/0319836 A1 | 11/2015 | Sanders et al. |
| 2015/0332071 A1* | 11/2015 | Hoffa .......... B23K 5/00 340/10.2 |
| 2016/0120015 A1 | 4/2016 | Crowe |
| 2016/0174353 A1 | 6/2016 | Mitra et al. |
| 2016/0221108 A1* | 8/2016 | Hoffa .......... B23K 10/006 |
| 2016/0314938 A1 | 10/2016 | Park |

FOREIGN PATENT DOCUMENTS

| | | |
|---|---|---|
| EP | 0875329 | 11/1998 |
| EP | 1 006 760 | 6/2000 |
| EP | 1117279 | 7/2001 |
| EP | 2175702 A1 | 4/2010 |
| JP | 5744467 A | 3/1982 |
| JP | 2011014459 A | 1/2011 |
| JP | 4688450 | 5/2011 |
| JP | 4707108 B2 | 6/2011 |
| RU | 2066263 C1 | 9/1996 |
| RU | 95105277 A | 4/1997 |
| RU | 2354460 C2 | 10/2008 |
| WO | 9621339 A1 | 7/1996 |
| WO | 99/07193 | 2/1999 |
| WO | 03/089183 A1 | 10/2003 |
| WO | 2015073522 A1 | 5/2015 |

OTHER PUBLICATIONS

Centricut catalog "2013-2014 Plasma torches and consumables", 68 pages.
Drawing of Hypertherm Part No. 120934, 2000 (redacted).
Thermal Dynamics XT™-300 Brochure, May 7, 2007, 6 pages; http://wv, 'W-.mitaustccl.lv/wn-contcnt/uploads/2013/I I/V- XT300-Torch.pdf.
Thermal Dynamics, "XT-301 Automated Plasma Cutting Torch",Thermadyne, Nov. 2005, 4 pages, retrieved from the Internet at: http://victortechnologies.com/IM_Uploads/DocLib_5849_XT-301%20Torch%20for%20use%20w%20Merlin%201000%20Brochure%20(63-2524)_Nov2005.pdf.
Welding Magazine, "Plasma cutting system for mild steel",Oct. 2008, p. 34, retrieved from the Internet at: http://search.proquest.com/professional/printviewfile?accountid=157282.
Welding Magazine, "Plasma cutting systems and products: new and or upgraded plasma cutting systems and torches have been designed to offer increased flexibility and to boost performance and productivity", Apr. 2007, pp. 36-38, retrieved from the internet at: http://search.proquest.com/professional/printviewfile?accountid=157282.
Amada America Inc.,"Amada WACS System", Retrieved from the Internet at: http://www.amada.de/en/laser/wacs-system.html, printed Oct. 27, 2016, 2 pages.
Komatsu America Industries, LLC: "Next Generation Twister TFP6062-300A Power Supply Units", Retrieved from the Internet at: http://www.komatsuplasma.com/kai/ctd/en/ffp6062/pdf/TFP6062_Brochure.pdf, printed Oct. 27, 2016, 2 pages.
Komatsu America Industries, LLC: "TFPL Twister Series", Retrieved from the internet at: http://fineplasma.com/kai/ctd/en/tfp/pdf/eTFP.pdf, printed Oct. 27, 2016, 6 pages.
Trumpf Inc.,"TruLaser: Cost-effective cutting through thick and thin", Retrieved from the internet at: http://www.us.trumpf.com/fileadmin/DAM/us.trumpf.com/Brochures/2D_Laser/TruLaser_US_10-12.pdf, printed Oct. 26, 2016, 32 pages.
International Search Report and Written Opinion to corresponding PCT Application No. PCT/US2015/044884, dated Dec. 9, 2015, 15 pages.

\* cited by examiner

US 10,462,891 B2

COST EFFECTIVE CARTRIDGE FOR A PLASMA ARC TORCH

CROSS REFERENCE TO RELATED APPLICATION

This application is a continuation-in-part of U.S. Ser. No. 14/824,946, filed Aug. 12, 2015, which claims the benefit of and priority to U.S. Provisional Patent Application No. 62/036,393, filed Aug. 12, 2014. The entire contents of these applications are owned by the assignee of the instant application and incorporated herein by reference in their entirety.

TECHNICAL FIELD

The present invention generally relates to cartridges for a contact start plasma arc torch, and more particularly, to one or more replaceable, low-cost cartridges, each having multiple integrated components.

BACKGROUND

Thermal processing torches, such as plasma arc torches, are widely used for high temperature processing (e.g., heating, cutting, gouging and marking) of materials. A plasma arc torch generally includes a torch body, an electrode mounted within the torch body, an emissive insert disposed within a bore of the electrode, a nozzle with a central exit orifice mounted within the torch body, a shield, electrical connections, passages for cooling, passages for arc control fluids (e.g., plasma gas) and a power supply. A swirl ring can be used to control fluid flow patterns in the plasma chamber formed between the electrode and the nozzle. In some torches, a retaining cap is used to maintain the nozzle and/or swirl ring in the plasma arc torch. In operation, the torch produces a plasma arc, which is a constricted jet of an ionized gas with high temperature and sufficient momentum to assist with removal of molten metal. Gases used in the torch can be non-reactive (e.g., argon or nitrogen), or reactive (e.g., oxygen or air).

One method for producing a plasma arc in a plasma arc torch is the contact start method. The contact start method involves establishing physical contact and electrical communication between the electrode and the nozzle to create a current path between them. The electrode and the nozzle can cooperate to create a plasma chamber within the torch body. An electrical current is provided to the electrode and the nozzle, and a gas is introduced to the plasma chamber. Gas pressure builds up until the pressure is sufficient to separate the electrode and the nozzle. The separation causes an arc to be formed between the electrode and the nozzle in the plasma chamber. The arc ionizes the introduced gas to produce a plasma jet that can be transferred to the workpiece for material processing. In some applications, the power supply is adapted to provide a first electrical current known as a pilot current during generation of the arc and a second current known as a transferred arc current when the plasma jet has been transferred to the workpiece.

Various configurations are possible for generating the arc. For example, the electrode can move within the torch body away from the stationary nozzle. Such a configuration is referred to as the "blow-back" contact start method because the gas pressure causes the electrode to move away from the workpiece. A problem with such systems relates to precise alignment of the nozzle and electrode consumables, which significantly impacts life expectancy of the consumables and material processing/cut quality. In another configuration, the nozzle can move away from the relatively stationary electrode. Such a configuration is referred to as the "blow-forward" contact start method because the gas pressure causes the nozzle to move toward the workpiece.

Existing plasma cutting systems include a large array of separate consumables available for use with different currents and/or operating modes. The large number of consumable options requires large part counts and inventories for users, and can confuse users and increase the possibility of installing incorrect consumables. The large number of consumable options can also cause lengthy torch setup time(s) and make it difficult to transition among cutting processes that require different arrangements of consumables in the torch, arrangement and installation of which is often performed in the field one component at a time. For example, before a cutting operation, selecting and installing the correct set of consumables for a particular cutting task can be burdensome and time-consuming. Furthermore, selection, assembly, and installation of these components in the field can cause alignment issues or compatibility issues when old components are used with new components. During torch operation, existing consumables can experience performance issues such as failing to maintain proper consumable alignment and spacing. Furthermore, current consumables include substantial amounts of expensive materials (e.g., Vespel™) and often require a relatively complex manufacturing process, which leads to significant manufacturing costs and inhibits their widespread commercialization, production and adoption. What is needed is a new and improved consumable platform that decreases manufacturing costs and time, decreases part count, increases system performance (e.g., component alignment, cut quality, consumable life, variability/versatility, etc.), and eases installation and use of consumables by end users.

SUMMARY

The present invention provides one or more integrated, cost-effective cartridge designs for a plasma arc torch, such as for a manually-operated, air-cooled plasma arc torch. Generally, because a cartridge includes a suite of two or more consumable components, it provides ease of use and shortens the time for installation into a plasma arc torch in comparison to installing each consumable component individually. In addition, the use of a cartridge in a torch improves component alignment and cut consistency. However, manufacturing and material costs can prohibit the widespread commercialization and production of cartridges. The present invention solves this problem by providing one or more cost effective cartridge designs that facilitate cartridge commercialization and production and improve their installation.

The invention, in one aspect, features a cartridge for an air-cooled plasma arc torch. The cartridge comprises a swirl ring and a crown. The swirl ring includes a molded thermoplastic elongated body having a substantially hollow portion, the molded thermoplastic elongated body having a distal end and a proximal end and configured to receive an electrode within the hollow portion. The swirl ring also includes a plurality of gas flow openings defined by the distal end of the elongated body and configured to impart a swirling motion to a plasma gas flow for the plasma arc torch. The swirl ring further includes a nozzle retention feature on a surface of the elongated body at the distal end for retaining a nozzle to the elongated body. The crown is affixed to the proximal end of the elongated body of the swirl ring. The crown substantially encloses the proximal end of the elongated body.

In some embodiments, the crown is formed of an electrically conductive material. The crown can be configured to retain the electrode within the cartridge and pass an electrical current to the electrode. The crown can comprise a biasing surface for physically contacting a resilient element that biases against a proximal end of the electrode. Additionally, the crown can comprise a substantially hollow body configured to retain the resilient element between the biasing surface and the proximal end of the electrode.

In some embodiments, the body of the crown has a substantially uniform thickness. In some embodiments, the crown includes at least one vent hole.

In some embodiments, the crown comprises a contact surface for facilitating electrical contact with a corresponding contact surface of the electrode when the plasma arc torch is operated in a transferred arc mode. The contact surface of the crown is characterized by the absence of contact with the corresponding contact surface of the electrode during initiation of a pilot arc. The contact surface can be configured to physically contact the corresponding contact surface of the electrode when the torch is operated in the transferred arc mode.

In some embodiments, the plurality of gas flow openings of the swirl ring include slots defined by a plurality of extensions disposed about the distal end of the elongated body of the swirl ring, each slot situated between a pair of the extensions.

In some embodiments, the nozzle retention feature includes a groove located on an external surface of the extensions. Retention of the nozzle to the swirl ring can be via one of snap fit, threading or crimping. In some embodiments, engagement between the crown and the swirl ring is by one of crimping, snap fit, or threading.

In some embodiments, the elongated body of the swirl ring is molded from a thermoplastic material comprising a polymer formed of ether and ketone molecules. The thermoplastic material can have one or more properties comprising (i) a glass transition temperature (Tg) of greater than about 320 Fahrenheit (F), (ii) a coefficient of linear thermal expansion (CLTE) of less than about 22 micro-inch/inch-Fahrenheit (micro.in/in.F) below Tg, (iii) a CLTE of less than about 55 micro.in/in.F above Tg, (iv) a melting point of greater than about 720 Fahrenheit, and (v) a dielectric strength of greater than about 480 kilo-volt/inch.

In some embodiments, the ratio of an axial length (L) of each gas flow opening to an average radius (R) between the radius of the electrode and the radius of an inner wall of the swirl ring is less than about 0.5. In some embodiments, the plurality of gas flow openings are disposed in a single layer about the distal end of the elongated body, each gas flow opening having an offset of about 0.040 inches between an opening in an inner wall of the swirl ring and an opening on an outer wall of the swirl ring.

In another aspect, a molded swirl ring for an air-cooled plasma arc torch is provided. The molded swirl ring comprises a molded thermoplastic elongated body comprising a substantially hollow portion. The molded thermoplastic elongated body has a distal end and a proximal end and configured to receive an electrode within the hollow portion. The molded swirl ring also includes a plurality of molded gas flow openings each extending from an interior surface to an exterior surface of the elongated body. The molded gas flow openings are disposed about the distal end of the elongated body and configured to impart a swirl to a plasma gas flow of the plasma arc torch. The molded swirl ring further includes a nozzle retention surface on the body for retaining a nozzle at the distal end of the elongated body.

In some embodiments, the plurality of gas flow openings include slots defined by a plurality of extensions disposed about the distal end of the elongated body, each slot situated between a pair of the extensions. The distal end of the elongated body of the swirl ring and the nozzle can cooperatively define the plurality of gas flow openings.

In some embodiments, the nozzle retention surface includes a nozzle retention feature located on an external surface of the extensions. The nozzle retention feature can comprise a groove configured to receive a portion of the nozzle via crimping. In some embodiments, the nozzle retention surface comprises a sloped surface configured to receive a portion of the nozzle via crimping.

In some embodiments, the swirl ring is configured to engage the nozzle via one of snap fit or threading. In some embodiments, the swirl ring is configured to engage the nozzle via crimping.

In some embodiments, the elongated body is molded from a thermoplastic material comprising a polymer formed of ether and ketone molecules. The thermoplastic material can further comprise one or more additives.

In another aspect, an assembly for an air-cooled plasma arc torch is provided. The assembly comprises an electrode, a swirl ring molded from a thermoplastic material, a nozzle, and a crown. The swirl ring comprises a nozzle retention surface at a distal end and a crown retention element at a proximal end. The nozzle is fixedly secured to the distal end of the swirl ring via the nozzle retention surface, where the nozzle includes an exit orifice at a distal end of the nozzle. The crown is fixedly secured to the proximal end of the swirl ring via the crown retention element. The crown is configured to enclose the swirl ring at the proximal end. The securement of the swirl ring, the nozzle and the crown creates a chamber in which the electrode is permanently disposed and aligned relative to the nozzle.

In some embodiments, the nozzle retention surface comprises a sloped surface and the nozzle is secured to the distal end of the swirl ring by crimping at least a portion of the nozzle against the sloped surface. The crimping of the nozzle to the nozzle retention can establish (1) a radial centering of the nozzle exit orifice within the chamber with respect to a distal end of the electrode to within 0.005 inches, and (2) a longitudinal positioning of the electrode within the chamber between the distal end of the electrode and the nozzle exit orifice during a transferred arc operation of the assembly to within 0.030 to 0.060 inches.

In some embodiments, the crown retention element comprises a groove configured to secure the swirl ring by at least one of crimping, threading, or snap fit. The securement of the crown to the swirl ring via the crown retention element can establish a longitudinal positioning of the electrode within the chamber between a distal end of the electrode and the nozzle exit orifice during a transferred arc operation of the assembly to within 0.030 to 0.060 inches.

In some embodiments, the assembly further comprises a resilient element between a biasing surface of the crown and the electrode, the resilient element physically contacting the electrode and imparting a separation force upon the electrode. The resilient element can pass substantially all of a pilot arc current to the electrode when the plasma arc torch is operated in a pilot arc mode. The crown can comprise a hollow body for maintaining the resilient element substantially therein. In some embodiments, the resilient element comprises at least one of a spring or wire.

In some embodiments, the assembly further comprises an o-ring configured to substantially surround the proximal end of the swirl ring to seal the swirl ring against a body of the plasma arc torch.

In another aspect, a crown is provided for a contact start plasma arc torch configured for electrical communication with an electrode. The crown comprises a substantially hollow body, formed from an electrically conductive material, configured to receive a resilient element. The hollow body has a substantially uniform thickness. The crown also includes a biasing surface at a proximal end of the crown for physically contacting the resilient element. The crown further includes an interior contact surface at the distal end for physically contacting, during a transferred arc mode of the plasma arc torch, a corresponding surface at the proximal end of the electrode. The contact surface is characterized by an absence of contact with the corresponding surface of the electrode during a pilot arc mode of the plasma arc torch.

In some embodiments, the contact surface is configured to pass at least a portion of a transferred arc current from the power supply to the electrode during the transferred arc mode. Additionally, the resilient element can be configured to pass substantially all of a pilot arc current from the power supply to the electrode during the pilot arc mode.

In some embodiments, the crown further includes a retention element for connection to a swirl ring via one of crimping, snap fit or threading. In some embodiments, the crown further includes at least one vent hole. In some embodiments, the crown further comprises a circular tunnel portion that includes the biasing surface and is configured to house at least a portion of the resilient element. In some embodiments, the crown further comprises a depressed center extending away from the proximal end that includes the contact surface.

In some embodiments, the crown is formed via a stamping process.

In another aspect, a method for aligning a plurality of components in a cartridge is provided. The method includes molding a thermoplastic material to form a swirl ring comprising a distal end, a proximal end and a hollow body. The method also includes disposing an electrode inside of the hollow body of the swirl ring and retaining the electrode to the cartridge by fixedly securing the nozzle to the distal end of the swirl ring. The method further includes longitudinally aligning the electrode relative to the nozzle by fixedly securing a crown to the proximal end of the swirl ring, thereby establishing the longitudinal alignment during a transferred arc operation of the cartridge when a gas flow is used to bias the electrode into contact with the crown.

In some embodiments, the method further comprises forming the crown via a stamping process. In some embodiments, the method further comprises radially aligning the electrode by restraining a radial motion of the electrode within the hollow body of the swirl ring.

In some embodiments, the longitudinal alignment comprises restraining a longitudinal motion of the electrode to within a blow-back distance defined by a distal end of the electrode and an exit orifice of the nozzle during the transferred arc operation.

In some embodiments, fixed securing the nozzle to the distal end of the swirl ring comprises crimping a portion of the nozzle into a retention surface on the distal end of the swirl ring.

In another aspect, a consumable cartridge for a plasma arc torch is provided. The consumable cartridge includes an outer component defining a substantially hollow body, an inner component disposed substantially within the hollow body of the outer component, and a hollow region between the rear portion of the inner component and the outer component. The inner component includes a forward portion configured to axially secure and rotatably engage the outer component to the inner component and a rear portion substantially suspended within the hollow body of the outer component. The rear portion is axially secured and rotatably engaged with the outer component via the forward portion. The hollow region is configured to receive a torch head to enable mating between the rear portion of the inner component and a cathode of the torch head.

In some embodiments, the forward portion of the inner component includes a means for enabling axial securement and rotatable engagement of the outer component thereto. This means for enabling is dimensioned to permit independent rotation of the inner and outer components relative to each other. In some embodiments, the rear portion of the inner component has no means for enabling axial securement and rotatable engagement with the outer component. The axial securing and rotatable engaging of the outer component to the inner component can be by one of crimping, snap fitting, frictional fitting or threading.

In some embodiments, the outer component comprises at least one of a shield, an insulating component, a retaining cap or a cap sleeve. In some embodiments, the inner component comprises at least one of a crown, a swirl ring, an electrode or a nozzle.

In some embodiments, the rear portion of the inner component is configured to substantially surround and physically contact at least a portion of the cathode. The rear portion of the inner component can comprise a cavity configured to receive the at least a portion of the cathode extending into the cartridge. In some embodiments, at least one of the rear portion of the inner component or the outer component comprises at least one thread for engaging the torch head.

In some embodiments, the inner component further comprises one or more fins disposed on an external surface of the inner component. The outer component can also comprise one or more fins disposed on an internal surface of the outer component.

In some embodiments, the outer component provides an electrical path for a pilot arc current of the plasma arc torch.

In another aspect, a cartridge consumable for a plasma arc torch is provided. The cartridge consumable comprises (i) an outer component defining a substantially hollow body, (ii) an inner component, comprising at least an electrode, disposed within the hollow body of the outer component; and (iii) an engagement feature disposed on the inner component. The engagement feature is adapted to axially constrain the outer component relative to the inner component while permitting independent rotation of the inner and outer components relative to each other.

In some embodiments, the inner component further comprises a crown that is substantially locked into position upon assembly into the plasma arc torch. A swirl ring can be connected to the outer component via a nozzle of the inner component. The electrode can be disposed within a hollow enclosure defined by the swirl ring and the nozzle. At least one of the swirl ring or the electrode can be a part of the inner component.

In some embodiments, the outer component comprises a metallic retaining cap and an electrically insulative cap sleeve overmolded onto the retaining cap. A shield can be connected to the inner component via the outer component. The shield can be a part of the outer component.

In some embodiments, the cartridge consumable further comprises a hollow region between the outer component and the inner component. The hollow region is configured to matingly engage a head of the plasma arc torch. The cartridge consumable can further include a washer located between the outer component and a nozzle of the inner component. The washer comprises one or more cooling channels configured to regulate a gas flow therethrough.

In yet another aspect, a method of assembling a multi-piece cartridge consumable is provided, where the cartridge consumable comprises an outer component and an inner component for installation into a plasma arc torch. The method includes disposing the inner component within a hollow body of the outer component. The method also includes axially restraining the outer component relative to a forward portion of the inner component while permitting independent rotation of the inner and outer components relative to each other. The method further includes substantially suspending and radially orienting, by the axial restraining, a rear portion of the inner component within the hollow body of the outer component.

In some embodiments, the method further includes installing the multi-piece cartridge consumable into a torch head by disposing the torch head in a hollow region between the rear portion of the inner component and the outer component. The installing can enable physical mating between a cathode of the torch head and a recess in the rear portion of the inner component. In some embodiments, the method further includes rotating the outer component independent of the inner component to secure the torch head to the multi-piece cartridge consumable.

In some embodiments, the method further includes assembling the inner component of the multi-piece cartridge, which comprises disposing an electrode inside of a hollow body of a swirl ring, retaining the electrode within the hollow body by fixedly securing a nozzle to a distal end of the swirl ring, and fixedly securing a crown to a proximal end of the swirl ring. In some embodiments, the method further includes assembling the outer component of the multi-piece cartridge, which comprises over-molding an insulative cap sleeve onto a retaining cap and fixedly connecting a shield to the cap sleeve.

In some embodiments, the method further includes radially aligning the inner component with respect to the outer component by one or more fins disposed on a surface of at least one of the inner or outer component.

In yet another aspect, a crown for a plasma arc torch is provided. The crown includes a body defining a proximal and a distal end, the body including an electrically conductive material and at least one raised feature at the proximal end of the body. The raised feature adapted to activate a consumable sensor inside of the plasma arc torch. The crown can also include a biasing surface at the proximal end of the body for physically contacting a resilient element.

In some embodiments, the crown further includes a contact surface at the distal end of the body for physically contacting, during a transferred arc mode of the plasma arc torch, a corresponding surface of an electrode. The at least one raised feature is configured to activate the consumable sensor by pressing against the consumable sensor upon installation of the crown into the plasma arc torch, thereby permitting a flow of electrical current through one of (i) the biasing surface to the resilient element during a pilot arc mode of the plasma arc torch or (ii) the contact surface to the electrode during the transferred arc mode.

In some embodiments, the body of the crown is substantially hollow and is configured to retain the resilient element between the biasing surface and the electrode. The body of the crown can have a substantially uniform thickness.

In some embodiments, the body of the crown defines a cavity configured to receive at least a portion of a cathode of the plasma arc torch. The contact surface can be located in an interior surface of the crown body defining the cavity.

In yet another aspect, an inner cartridge consumable of a multi-piece cartridge consumable for a plasma arc torch is provided. The inner cartridge consumable includes a crown including (i) a recess about a central axis shaped to receive at least a portion of a cathode of the plasma arc torch and (ii) a protrusion region surrounding the recess about the central axis shaped to house a spring component. The inner cartridge consumable also includes a swirl ring defining a distal end and a proximal end. The swirl ring is fixedly connected to the crown at the proximal end of the swirl ring. The inner cartridge consumable further includes a nozzle fixedly connected to the swirl ring at the distal end of the swirl ring and an electrode disposed in a chamber defined within the fixed connection of the crown, the swirl ring and the nozzle.

In some embodiments, the the crown physically contacts the cathode and is disposed between the cathode and the electrode. In some embodiments, the crown defines an opening to allow at least a portion of the cathode to pass therethrough to physically contact the electrode in a transferred arc mode of operating the plasma arc torch. The recess of the crown can be configured to permit the cathode to extend within the inner cartridge consumable.

In some embodiments, the protrusion region of the crown is adapted to activate a consumable sensor inside of the plasma arc torch. In some embodiments, a portion of the swirl ring is adapted to extend through an opening in the crown to activate a consumable sensor inside of the plasma arc torch.

In some embodiments, the inner cartridge consumable is substantially conductive. In some embodiments, the spring component is adapted to extend longitudinally and substantially parallel to the cathode upon installation of the multi-piece cartridge consumable in the plasma arc torch.

In some embodiments, the inner cartridge consumable further comprises a retention feature disposed on a surface of the inner cartridge consumable for rotationally engaging and axially securing an outer cartridge consumable of the multi-piece cartridge consumable. The retention feature can be disposed on a surface of at least one of the nozzle or the swirl ring.

In yet another aspect, a method of installing a cartridge into a plasma arc torch is provided. The method includes assembling an inner component of the cartridge including disposing an electrode inside of a hollow body of a swirl ring that includes a distal end and a proximal end, capturing the electrode within the swirl ring by fixedly securing a nozzle at the distal end of the swirl ring, and fixedly securing a crown to the proximal end of the swirl ring. The method also includes securing a torch head to the cartridge that includes the inner component and an outer component, and depressing, by at least one raised feature, a consumable sensor inside of a torch head of the plasma arc torch. The method further includes establishing an electrical current flow path from a source of power through the torch head and to the cartridge based on the depressing.

In some embodiments, the method further includes positioning the crown between a cathode of the torch head and the electrode and radially and longitudinally aligning the cathode, the crown and the electrode. The method can further include enabling physical mating between the cathode and a recess of the crown. The method can further include enabling physical contact between the cathode and the electrode via an opening of the crown during a transferred mode operation of the plasma arc torch.

In some embodiments, the method further includes physically contacting, by a biasing surface at the proximal end of the crown, a resilient element and physically contacting, by a contact surface at the distal end of the crown, a corresponding surface of the electrode during a transferred arc mode of the plasma arc torch. The method can further include permitting a flow of electrical current in the electrical current flow path through one of (i) the biasing surface to the resilient element during a pilot arc mode of the plasma arc torch or (ii) the contact surface to the electrode during the transferred arc mode.

In some embodiments, the method further includes disposing the inner component within a hollow body of the outer component and axially restraining the inner component relative to the outer component while permitting independent rotation of the inner and outer components relative to each other. The method can further include substantially suspending and radially orienting, by the axial restraining, a rear portion of the inner component within the hollow body of the outer component. The method can further include radially aligning the inner component with respect to the outer component by one or more fins disposed on a surface of at least one of the inner or outer component.

In some embodiments, the raise feature is disposed on the crown or the swirl ring.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
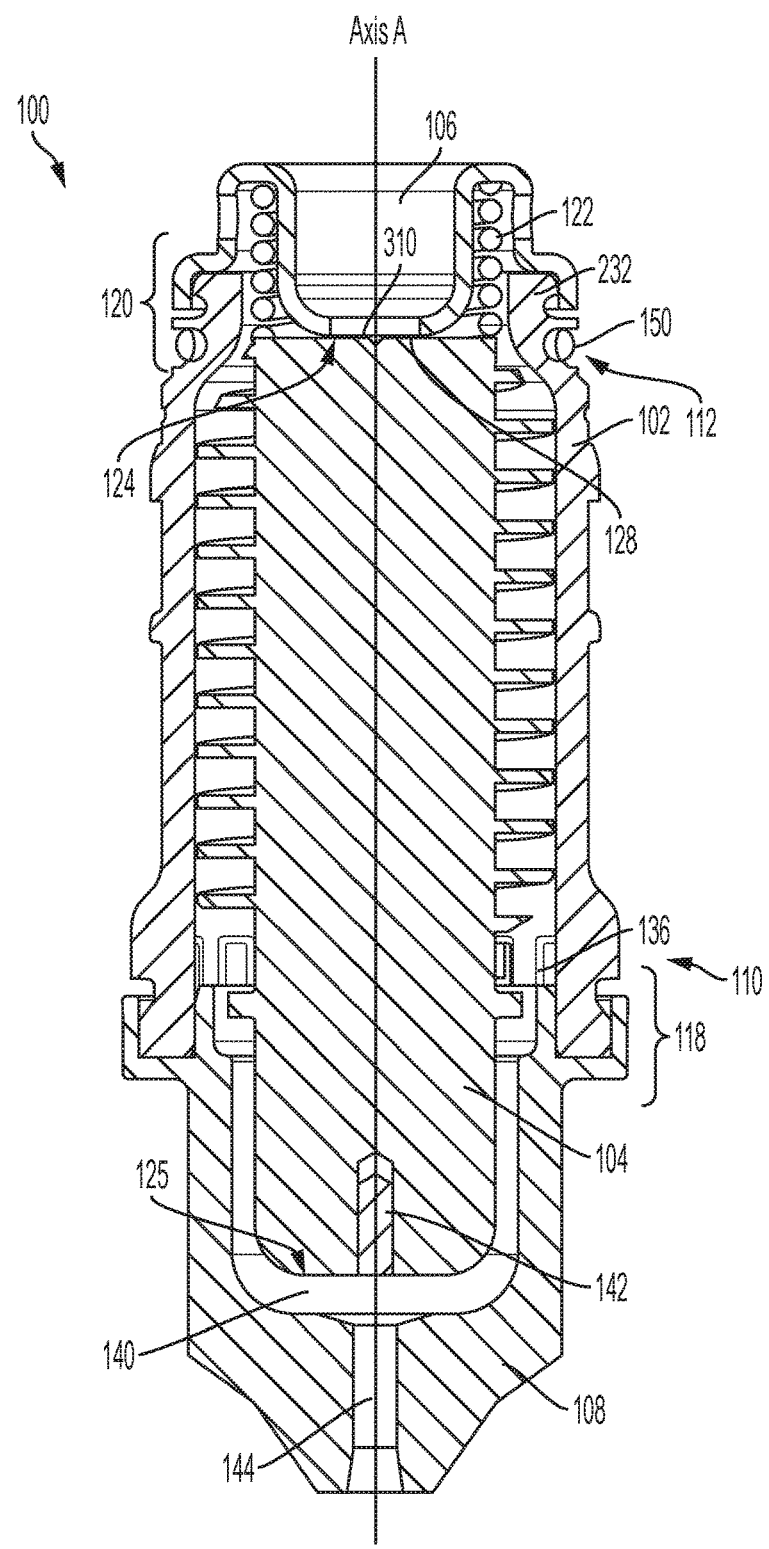
FIG. 1 is a cross-sectional view of an exemplary cartridge for a plasma arc torch, according to an illustrative embodiment of the invention.

FIG. 1 is a cross-sectional view of an exemplary cartridge 100 for a plasma arc torch, according to an illustrative embodiment of the invention. As shown, the cartridge 100 includes an end cap 106 (e.g., a crown), a swirl ring 102, an electrode 104, and a nozzle 108 oriented substantially symmetrically about the longitudinal axis A. The cartridge 100 can additionally include a resilient element 122 and/or a sealing device 150. The cartridge 100 can use a blow-back contact starting mechanism for contact starting the plasma arc torch upon assembly into the torch. Specifically, the electrode 104 can be a spring-forward electrode, which means that the resilient element 122 (e.g., a spring) can exert a separating force on the proximal end 124 of the electrode 104 to bias the electrode 104 away from the end cap 106 and toward the nozzle 108.

Figure 2:
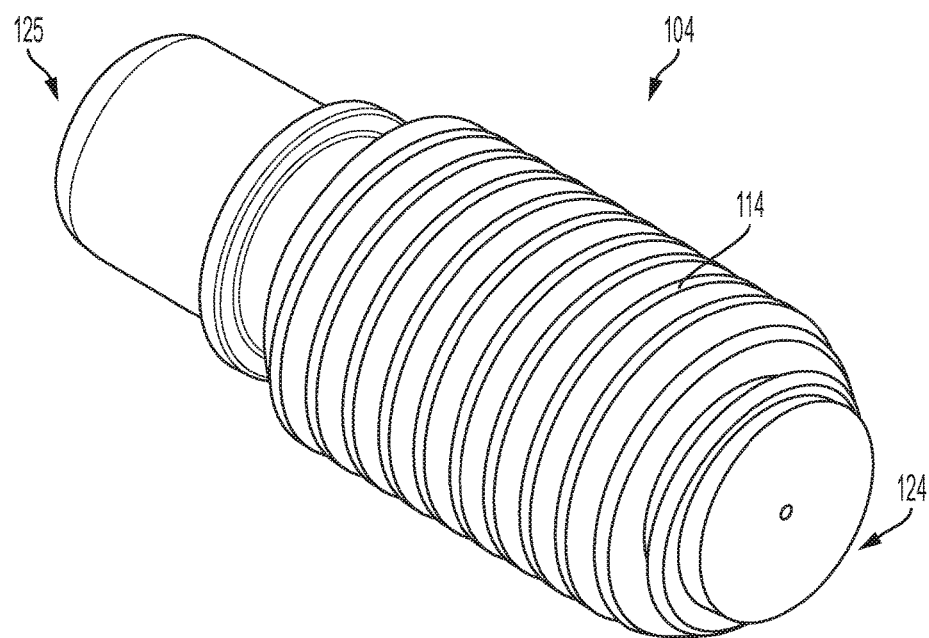
FIG. 2 is an isometric view of the electrode of the cartridge of FIG. 1, according to an illustrative embodiment of the invention.

FIG. 2 is an isometric view of the electrode 104, according to an illustrative embodiment of the invention. As shown, the electrode 104 includes a set of spiral-shaped fins 114 for directing a gas flow and facilitating cooling of the cartridge 100. An emissive insert 142 (i.e., emitter), as shown in FIG. 1, can be disposed in the distal end 125 of the electrode 104 so that an emission surface is exposed. The insert 142 can be made of hafnium or other materials that possess suitable physical characteristics, including corrosion resistance and a high thermionic emissivity. Forging, impact extrusion, or cold forming can be used to initially form the electrode 104 prior to finish machining the component.

Figure 3:
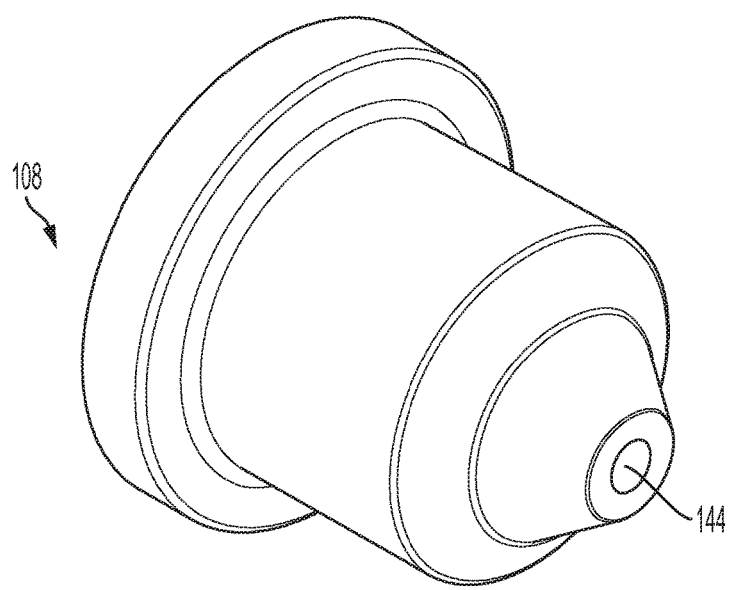
FIG. 3 is an isometric view of the nozzle of the cartridge of FIG. 1, according to an illustrative embodiment of the invention.

The nozzle 108 can be spaced from the distal end 125 of the electrode 104 and define, in relation to the electrode 104, a plasma chamber 140. FIG. 3 is an isometric view of the nozzle 108, according to an illustrative embodiment of the invention. The nozzle 108 includes a centrally-located exit orifice 144 for introducing a plasma arc, such as an ionized gas jet, to a workpiece (not shown) to be cut.

In some embodiments, the swirl ring 102 has a set of radially spaced gas flow openings 136 configured to impart a tangential velocity component to a gas flow for the plasma arc torch, causing the gas flow to swirl. This swirl creates a vortex that constricts the arc and stabilizes the position of the arc on the insert 142. In some embodiments, the sealing device 150, such as an o-ring, can be located on an external surface of the swirl ring 102 at its proximal end 112 to engage an internal surface of the plasma arc torch body (not shown) when the the cartridge 100 is installed into the plasma arc torch body. The sealing device 150 is configured to provide a leak-proof seal of fluids (e.g., gases) between the cartridge 100 and the plasma arc torch body at that location.

Figure 4A:
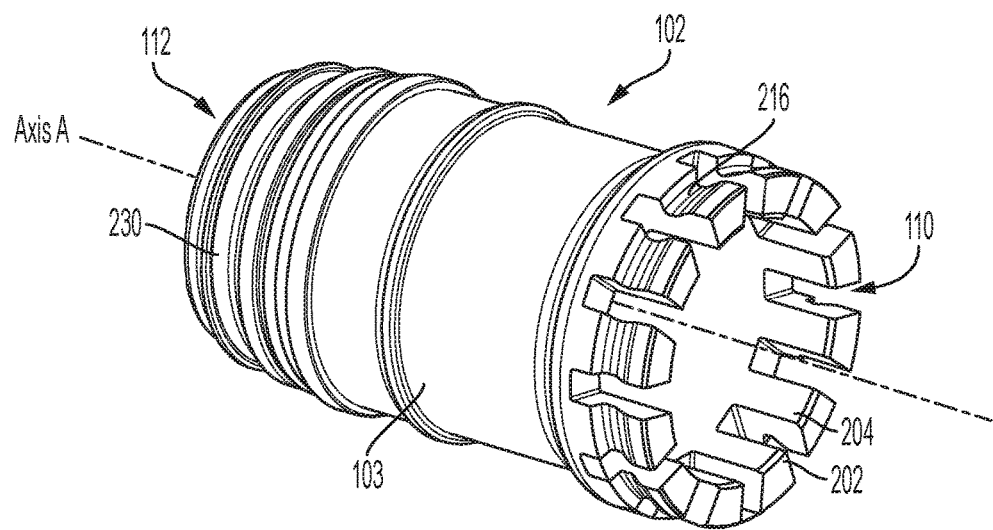
FIGS. 4a and 4b are isometric and profile views of the swirl ring of the cartridge of FIG. 1, respectively, according to an illustrative embodiment of the invention.
Figure 4B:
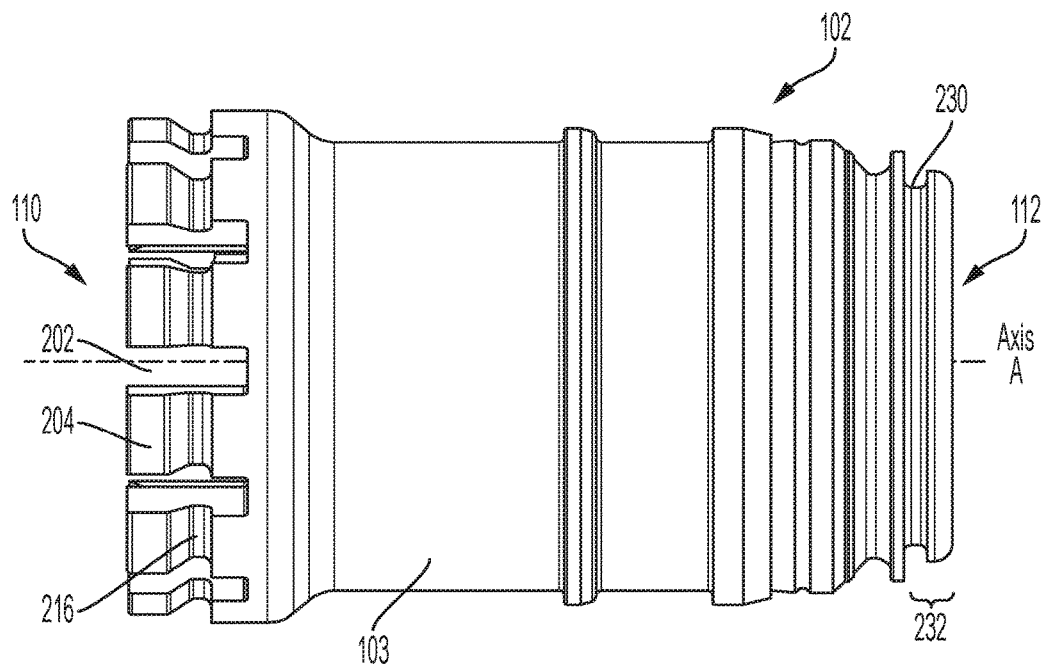

FIGS. 4a and 4b are isometric and profile views of the swirl ring 102 of the cartridge 100 of FIG. 1, respectively, according to an illustrative embodiment of the invention. As shown, the swirl ring 102 can be defined by a substantially hollow, elongated body 103 having the distal end 110 and the proximal end 112 along the longitudinal axis A. The distal end 110 of the swirl ring 102 is characterized as the end that is closest to a workpiece when operating the cartridge 100 within the plasma arc torch, and the proximal end 112 is the opposite of the distal end 110 along the longitudinal axis A. In some embodiments, the hollow body 103 of the swirl ring 102 is dimensioned to receive the electrode 104 and substantially extend over the length of the electrode 104 along the longitudinal axis A. The inner wall of the the swirl ring 102 can thus radially align the electrode 104 by limiting a radial movement of the electrode 104. An interface 118 can be formed between the distal end 110 of the swirl ring 102 and the nozzle 108 to join the two consumable components together as a part of the cartridge 100. Another interface 120 can be formed between the proximal end 112 of the swirl ring 102 and the end cap 106 to join the two consumable components together as a part of the cartridge 100. In general, the interface 118 and/or the interface 120 form a chamber in which the electrode 104 is permanently disposed and aligned (longitudinally and radially) relative to the nozzle 108 and the end cap 106.

In some embodiments, the one or more gas flow openings 136 of the swirl ring 102 are disposed about the distal end 110 of its elongated body 103, such as around a circumference of its distal end 110. In some embodiments, the one or more gas flow openings 136 are molded. Each gas flow opening 136 can extend from an interior surface to an exterior surface of the elongated body 103 and is oriented to impart a swirling motion relative to the axis A to the gas (e.g., air) flowing therethrough. Each gas flow opening 136 can be circular or non-circular (e.g., rectangular, squared and/or square-cornered) in geometry. In some embodiments, the gas flow openings 136 have substantially uniform dimensions. In some embodiments, as shown in FIGS. 4a and 4b, the gas flow openings 136 are at least partially defined by slots 202 at the distal end 110 of the elongated body 103 of the swirl ring 102. These gas flow slots 202 are formed by a plurality of extensions 204 spaced apart at regular or non-regular intervals around the circumference of the distal end 110, where each slot 202 is situated between a pair of the extensions 204. Upon the swirl ring 102 being securely affixed to the nozzle 108, the slots 202 are closed off by the proximal end of the nozzle 108 to create bounded holes. Hence, each gas flow opening 136 can be a two-piece composite opening cooperatively defined by the nozzle 108 and the swirl ring 102.

In some embodiments, to form the interface 118 between the swirl ring 102 and the nozzle 108, the swirl ring 102 can include a nozzle retention surface 216 (e.g., interior and/or exterior surface) of the elongated body 103 for securely attaching the nozzle 108 at its distal end 110. In one example, as illustrated in FIGS. 4a and b, the nozzle retention surface 216 can be a feature, such as one or more grooves located on the external surface of the elongated body 103, such as on the extensions 204. The nozzle retention surface 216 can capture the nozzle 108 through one of snap fit, crimping, or threading to form the interface 118. In a crimping example, a portion of the nozzle 108 can be crimped against and into the groove 216 to securely affix the nozzle 108 to the swirl ring 102. Alternatively, a similar retention surface can be disposed on the nozzle 108 to retain the swirl ring 102 thereto. Other manufacturing and assembly options are available and viable to connect the two components. For example, the nozzle 108 can be overmolded onto the swirl ring 102 to form the interface 118.

Figure 5A:
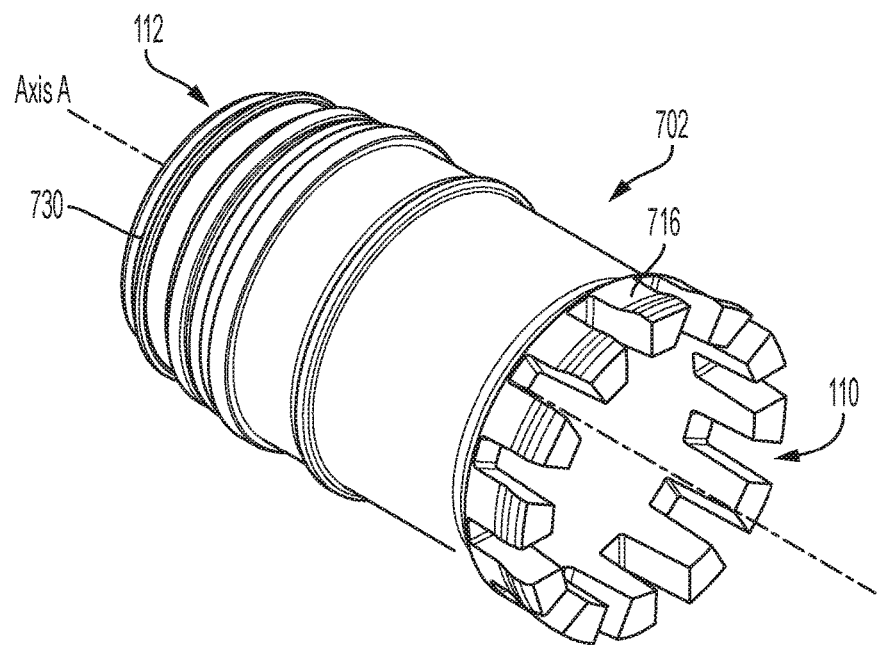
FIGS. 5a and 5b are isometric and sectional views of another swirl ring design compatible with the cartridge of FIG. 1, respectively, according to an illustrative embodiment of the invention.
Figure 5B:
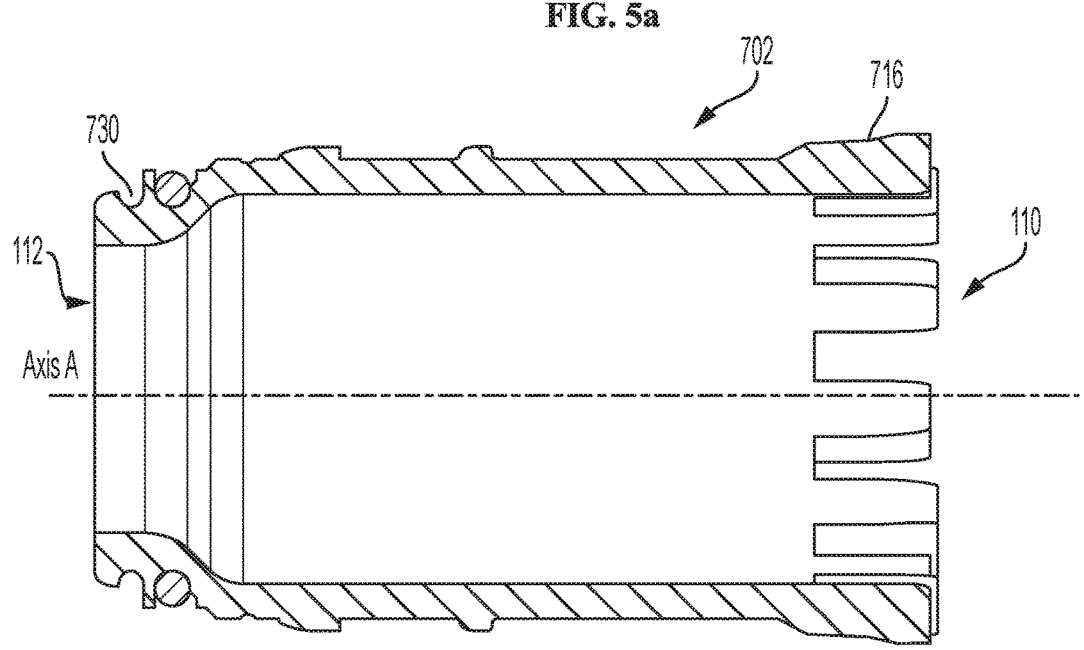

FIGS. 5a and b are isometric and sectional views of another swirl ring 702 compatible with the cartridge 100 of FIG. 1, respectively. As shown, the swirl ring 702 is substantially similar to the swirl ring 102 except that the nozzle retention surface 716 of the swirl ring 702 comprises a sloped surface at a tapered angle relative to the longitudinal axis A. The sloped surface 716 can be adapted to capture the nozzle 108 through one of snap fit, crimping, or threading to form the interface 118 of FIG. 1.

In some embodiments, as shown in FIGS. 4a and b, to form the interface 120 between the swirl ring 102 and the end cap 106, the swirl ring can include a cap retention feature 230 located on a surface (e.g., interior and/or exterior surface) of the elongated body 103 for securely retaining the end cap 106 at its proximal end 112. The cap retention feature 230 can be one or more grooves that capture the end cap 106 through one of snap fit, crimping, or threading to form the interface 120. For example, a portion of the end cap 106 can be crimped into the groove(s) 230 to securely affix the end cap 106 to the swirl ring 102. In some embodiments, as shown in FIGS. 1 and 4b, a lip portion 232 of the proximal end 112 of the swirl ring 102 is inserted inside of the end cap 106 after the two components are coupled together. Alternatively, a similar retention feature can be disposed about the end cap 106 to join the swirl ring 102. Other manufacturing and assembly options are available and viable to connect the two components. For example, the end cap 106 can be over-molded onto the swirl ring 102 to form the interface 120. A similar cap retention feature 730 can be located on a surface of the swirl ring 702 of FIGS. 5a and b and provide substantially the same function as the cap retention feature 230.

In general, each of the retention surfaces/elements 216, 230 of FIGS. 4a and b simplifies alignment of the parts in the cartridge 100 in comparison to an operator having to perform alignment of individual components without any structural guidance. In some embodiments, the locking of the swirl ring 102 to the nozzle 108 at the interface 118 via the retention element 216 aligns the two components relative to each other and further retains the electrode 104 in the chamber formed by the locking of the swirl ring 102 and the nozzle 108. The inner wall of the swirl ring 102 can radially align the electrode 104 such that there is a relatively small gap between the inner wall of the swirl ring 102 and the radial fins 114 of the electrode 104, thereby limiting a radial motion of the electrode 104. This thus establishes a radial centering of the nozzle exit orifice 144 with respect to the distal end 125 of the electrode 104 within the chamber, such as within a tolerance of about 0.005 inches. In some embodiments, the locking of the swirl ring 102 to the end cap 106 at the interface 120 via the retention element 230 aligns the two components relative to each other and further longitudinally aligns the electrode 104 in the chamber. For example, after the swirl ring 102 and the end cap 106 are joined, the depth of the depressed center 304 of the end cap 106 controls how far back the electrode 104 can move longitudinally toward the proximal end 124 in relation to the nozzle 108 during a transferred arc mode (e.g., when a gas flow is used to bias the electrode 104 into contact with the end cap 106), such as within a blow-back distance of 0.02 to 0.12 inches. The locking of the swirl ring 102 to the end cap 106 at the interface 120 via the retention element 230 also secures the resilient element 122 within the cartridge 100 while accurately positioning the resilient element 122 relative to the proximal end 124 of the electrode 104. In addition, the joining of the nozzle 108 to the swirl ring 102 helps to define the longitudinal motion of the electrode 104 to within the blow-back distance between the distal end 125 of the electrode 104 and the nozzle exit orifice 144 during the transferred arc operation. Such restraint on the longitudinal motion of the electrode 104 promotes accuracy and repeatability of plasma arc initiation in torch operations. Similarly, each of the retention surfaces/elements 716, 730 of FIGS. 5a and b simplifies alignment of the parts in the cartridge 100 upon assembly of the swirl ring 702 into the cartridge 100.

Figure 6:
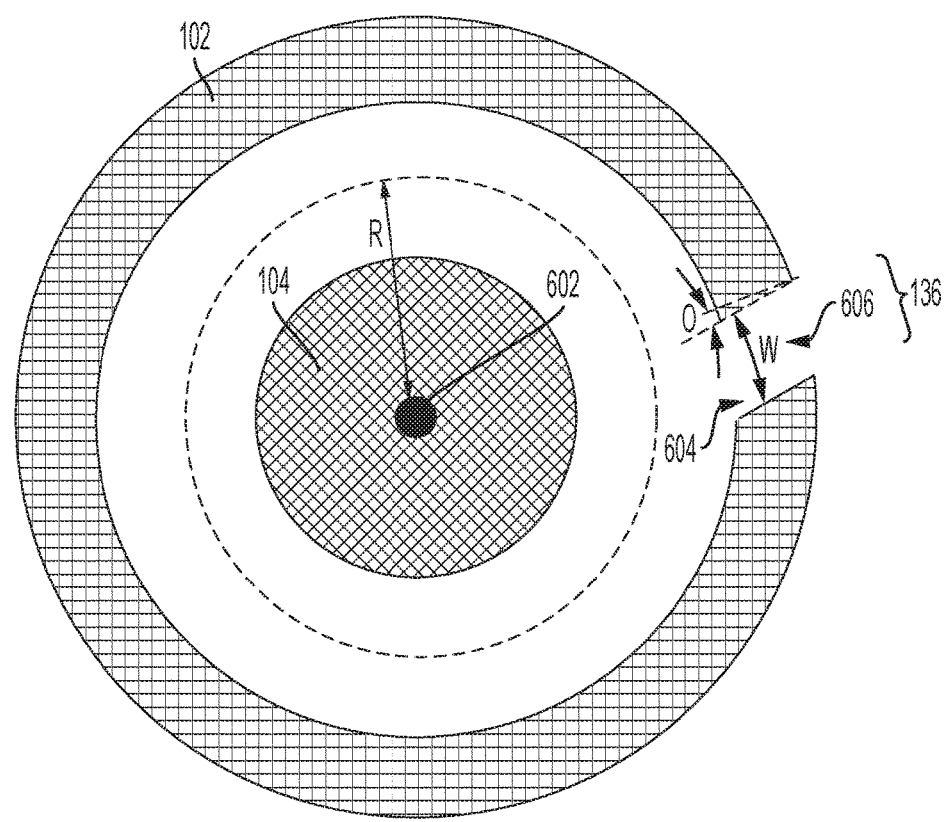
FIG. 6 is a sectional view of the swirl ring of the cartridge of FIG. 1 with the electrode aligned within the swirl ring and illustrating an exemplary gas flow opening.

In some embodiments, the gas flow openings 136 of the swirl ring 102 are suitably shaped and dimensioned to enhance swirling of a gas flow therethrough. FIG. 6 is a sectional view of the swirl ring 102 of the cartridge 100 of FIG. 1 with the electrode 104 radially aligned within the swirl ring 102 and illustrating an exemplary gas flow opening 136.

As shown, the swirl ring 102 and the electrode 104 have a shared center 602. Width W represents the curved axial width of each gas flow opening 136 (only one gas flow opening is shown). Length R represents the average distance (radius) between the center of the electrode 104 and the radius of the annular space between the exterior of the electrode body and the inner wall of the swirl ring 102, as measured from the shared center 602. In some embodiments, the W/R ratio is less than about 0.5. This value allows a gas flow entering a gas flow opening 136 to impinge somewhat perpendicularly on surface of the electrode 104, increasing gas turbulence and enhancing electrode cooling. In contrast, a traditional gas flow opening design has a W/R ratio of about 1.0, which causes a gas to impinge at most tangentially relative to a surface of the electrode 104. The substantial perpendicular impingement (as opposed to the tangential impingement) generates more flow distribution, more uniform gas flow swirling, and better cooling of the electrode 104. In some embodiments, the life of the electrode 104 is extended by 25% when the W/R ratio is less than about 0.5. This design ratio is applicable to gas flow openings 136 represented by slots 202 molded at the distal end 110 of the swirl ring 102 or by enclosed holes (not shown) formed, molded, or drilled into the distal end 110.

In some embodiments, only one row of gas flow openings 136 is disposed around the distal end 110 of the swirl ring 102. For example, one row of twelve gas flow openings 136 can be disposed symmetrically about the swirl ring 102. In contrast, traditional swirl ring designs have two or more rows (layers) of gas flow openings, with some traditional swirl rings having eighteen openings per row. Due to the reduced number of gas flow openings 136 in the present design, the width W of individual gas flow openings 136 is increased to generate the same gas flow swirl force and maintain the same overall cross-sectional area of the gas flow openings 136 combined in comparison to the traditional designs. In addition, for each gas flow opening 136, the offset O between the opening 604 in the inner wall of the swirl ring 102 and the opening 606 on the outer wall of the swirl ring 102 is reduced (e.g., to about less than or equal to about 0.040 inches) whereas such an offset associated with a gas flow opening of a traditional swirl ring design is larger (e.g., about 0.12 inches) In general, reducing the number of gas flow openings 136, coupled with locating the openings 136 on a single row, simplifies manufacturing cycle time, reduces material cost, and is more compatible with an injection molding approach for manufacturing the swirl ring 102. The gas flow opening design described with respect to the swirl ring 102 can also be applied to the swirl ring 702 of FIGS. 5a and b.

In some embodiments, the swirl ring 102 or 702 is manufactured through injection molding of one or more high-temperature thermoplastic materials comprising a polymer formed of ether and ketone molecules (e.g., ether ketone based compounds), such as polyetheretherketone (PEEK), polyaryletherketone (PAKE), polyetherketoneketone (PEKK), polyetherketoneetherketone-ketone (PEKEKK) and variants thereof. Exemplary thermoplastic materials also include polyamide-imide (PAI), polyetherimide (PEI), and/or polytetrafluoroethylene (PTFE). In some embodiments, properties associated with suitable thermoplastic materials for the invention have a glass transition temperature (Tg) of greater than about 320 Fahrenheit, a coefficient of linear thermal expansion (CLTE) of less than about 22 micro-inch/inch-Fahrenheit below Tg, a CLTE of less than about 55 micro-inch/inch-Fahrenheit above Tg, a melting point of greater than about 720 Fahrenheit, and/or a dielectric strength of greater than about 480 kilo-volt/inch. The use of thermoplastics to manufacture swirl rings reduces cartridge cost in comparison to, for example, Vespel™, Torlon, Celazole or Phenolic compounds or other thermalset plastics, which are materials currently used to manufacture swirl rings, but are comparatively more expensive to obtain and difficult to use. However, it is known that thermoplastics have operating temperatures that are lower than thermos-set Vespel™, which can potentially impact the integrity of swirl rings and electrode life in general. To resolve the high temperature performance issues, the swirl ring 102 or 702 can be made from thermoplastic resins having one or more fortifying additives to provide the desired thermal resistance and/or thermal conductivity, thus enabling effective use of thermoplastic material(s) in cartridges and/or swirl rings. Exemplary fortifying additives include glass fibers, minerals, boron nitride (BN), Cubic BN and/or Vespel™ particles. As an example, the material polymide/polyetheretherketone (PI/PEEK), a heat resistant material that can include about 50% recycled Vespel™ particles, can be used to manufacture the swirl ring 102 or 702. In addition, the swirl ring 102 or 702 is positioned in such a location in the cartridge 100 that it avoids exposure to the highest operating temperatures during torch operation. Thus, in practice, using a thermoplastic material to manufacture the swirl ring 102 is unlikely to affect the integrity of the swirl ring 102 or 702. Furthermore, when the electrode 104 experiences an end-of-life event, which is also the end of life of the cartridge 100, the plastic material melts, which does not affect the cutting operation during the consumable life. In contrast, known thermal-set based swirl rings, which are reused repeatedly with various sets of electrodes and nozzles, commonly have lifecycles of 20 to 30 times that of electrodes and nozzles. These lifecycles place requirements and demands on the swirl rings, which can lead to over design and also inconsistent performance as the swirl rings can thermally warp (e.g., expand and/or shrink) over their lifecycles, providing different fits, interfaces, and performance based on lifecycle position.

In some embodiments, the elongated body 103 of the swirl ring 102 is formed using an injection molding technique (e.g., thermoplastic injection molding). In some embodiments, if the gas flow openings 136 include slots 202 defined by the distal end 110 of the swirl ring 102, the slots 202 can be formed at the same time as the elongated body 103 via the same thermoplastic injection molding process. In general, the gas flow slots 202, in contrast to drilled holes in accordance with traditional designs for creating gas flow passageways, are more compatible with the injection molding technique for forming the swirl ring 102. Thus, molding the gas flow slots 202 into the swirl ring body 103 eliminates the additional step of drilling holes into the body 103. Using gas flow slots 202 instead of drilled holes in a swirl ring design also reduces material cost and the cost of long cycle time associated with drilling operations. The nozzle retention feature 216 and/or the cap retention feature 230 can also be formed at the same time as the elongated body 103 via the same thermoplastic injection molding process. Therefore, most, if not all, of the swirl ring 102 can be manufactured using a cost-effective single injection molding process. Overall, a molded thermoplastic process for forming the swirl ring 102 provides a faster and cheaper manufacturing approach in comparison to the traditional processes. Processes and materials for manufacturing the swirl ring 102 of FIGS. 4a and b can also be used to manufacture the swirl ring 702 of FIGS. 5a and b.

Figure 7A:
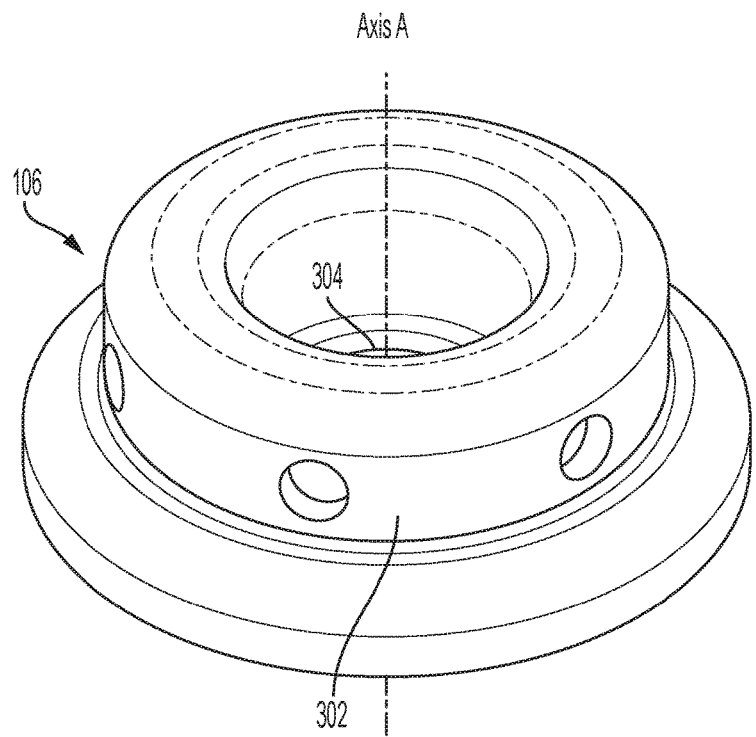
FIGS. 7a and 7b are isometric and sectional views of the crown of the cartridge of FIG. 1, respectively, according to an illustrative embodiment of the invention.

FIGS. 7a and b are isometric and sectional views of the end cap 106 (e.g., a crown) of the cartridge 100 of FIG. 1, respectively, according to an illustrative embodiment of the invention. The end cap 106 provides at least one of the following functions: (i) securely engaging the swirl ring 102 or 702 at its proximal end 112 to form the interface 120, thereby aligning the electrode 104; (ii) providing a holder for the resilient element 122; and (iii) passing an electrical current to the electrode 104 in a blow-back contact-start configuration. As illustrated, the end cap 106 has a substantially hollow body 300 defining a proximal end 320 and a distal end 322. The hollow body 300 includes a circular tunnel portion 302 and a depressed center 304 extending away from the proximal end 320 of the end cap 106. In some embodiments, the body 300 of the end cap 306 has a substantially uniform thickness, thereby promoting efficient and uniform current passage and assisting with the establishment of precise consumables alignment. Uniform thickness of the end cap 106, coupled with a stamp manufacturing technique, also simplifies manufacturing and minimizes manufacturing cycle time, consumable weight, and material usage.

In some embodiments, an interior surface 308 of the circular tunnel portion 302 at the proximal end 320 defines a biasing surface for physically contacting and electrically communicating with the resilient element 122. The resilient element 122 can bias against the proximal end 124 of the electrode 104 so as to move the electrode 104 away from the end cap 106. That is, the resilient element 122 is situated between and physically contacts the biasing surface 308 of the end cap 106 and the proximal end 124 of the electrode 104 such that the resilient element 122 imparts a separation force between the electrode 104 and the biasing surface 308.

In some embodiments, an interior surface 310 of the depressed center 304 of the end cap 106 at the distal end 322 defines a contact surface that is configured for physical contact and electrical communication with a corresponding contact surface 128 of the electrode 104 at its proximal end 124. During the transferred arc mode, the contact surface 310 of the end cap 106 is in an abutting relationship with the corresponding contact surface 128 of the electrode 104. However, during the initiation of a pilot arc in the pilot arc mode, the contact surface 310 is in a spaced relationship with the corresponding contact surface 128 that is defined by an absence of contact between the two surfaces.

The resilient element 122 is generally maintained inside of the cartridge 100 between the end cap 106 and the electrode 104. In some embodiments, the resilient element 122 is secured to either the end cap 106 or the electrode 104. In other embodiments, the resilient element 122 is secured to both the electrode 104 and the end cap 106. For example, the resilient element 122 can be secured by welding, soldering, bonding, fastening, a diametral interference fit or another type of friction fit to the end cap 106 and/or the electrode 104. In some embodiments, the substantially hollow body 300 of the end cap 106 is configured to house the resilient element 122 between its biasing surface 308 and the proximal end 124 of the electrode 104. For example, the circular tunnel portion 302 of the end cap 106 can function as a holder of the resilient element 122. Specifically, the resilient element 122 can be held in place by the biasing surface 308, an inner interior surface 312 and an outer interior surface 314 of the tunnel portion 302, where the diameter of the inner interior surface 312 with respect to the longitudinal Axis A is slightly smaller than the inner diameter of the resilient element 122, and the the diameter of the outer interior surface 314 with respect to the longitudinal Axis A is slightly larger than the outer diameter of the resilient element 122.

In some embodiments, radial movement of the resilient element 122 is further restrained by the proximal end 112 of the swirl ring 102 or 702 after the swirl ring 102 or 702 is affixed to the end cap 106. As shown in FIG. 1, after the end cap 106 is coupled to the swirl ring 102 (e.g., by being crimped into the cap engagement groove 230), the lip portion 232 of the swirl ring 102 can extend into the interior of the circular tunnel portion 302 of the end cap 106. Therefore, the lip portion 232 can further restrain and guide the positioning of the resilient element 122 inside of the end cap 106.

In some embodiments, the end cap 106 is configured to be in electrical communication with a power supply (not shown) when the cartridge 100 is installed within a torch. This enables a flow of current from the power supply to the electrode 104 via the resilient element 122 and/or the contact surface 310, depending on the mode of torch operation. In some embodiments, at least one vent hole 316 (or gas exit orifice) is disposed in the end cap 106, extending from an interior surface to an exterior surface of the body 300 to cool the cartridge 100. For example, a vent hole 316 can be located on the circular portion 302. Alternatively, vent hole(s) 316 are absent from the end cap 106.

In one exemplary operation, during pilot arc initiation, the power supply provides a pilot arc current to the end cap 106 and the pilot arc current is passed to the electrode 104 through the resilient element 122 that biases the electrode 104 against nozzle 108. As the resilient element 122 urges the electrode 104 into abutting relation with the nozzle 108, there is an absence of physical contact and electrical communication between the contact surface 310 of the end cap 106 and the corresponding contact surface 128 of the electrode 104. The resilient element 122 can be configured to pass substantially all of the pilot arc current from the end cap 106 to the electrode 104.

During pilot arc initiation, a gas is introduced into the plasma chamber 140 between the electrode 104 and the nozzle 108. Gas pressure can build within the plasma chamber 140 until the pressure is sufficient to overcome the separation force exerted by the resilient element 122. At that point, the gas pressure moves the electrode 104 toward the end cap 106 and away from the nozzle 108 along the longitudinally axis A (while compressing the resilient element 122) until the corresponding contact surface 128 of the electrode 104 comes into physical contact with the contact surface 310 of the end cap 106. As the electrode 104 is moved away from the nozzle 108 by gas pressure, an arc is generated or initiated in the plasma chamber 140 to form a plasma arc or jet that can be transferred to a workpiece (not shown).

During transferred arc mode, the corresponding contact surface 128 of the electrode 104 engages in substantially planar physical contact with the contact surface 310 of the end cap 106 to establish electrical communication (e.g., electrical current passes between the end cap 106 and the electrode 104 at the interface of the contact surface 310 and the corresponding surface 128). When the contact surface 310 of the end cap 106 abuts the corresponding surface 128 of the electrode 104, a current path is established such that at least a portion of a current passes directly between the two components. When the arc has been transferred to the workpiece, a cutting current is supplied to the torch (e.g., during transferred arc mode). The cutting current can be passed from the end cap 106 to the electrode 104 during transferred arc operation via (1) the resilient element 122 and/or (2) the interface between the contact surfaces 310, 128. In some embodiments, the current path directly between the end cap 106 and the electrode 104 has lower resistance and/or higher conductance than the current path from the end cap 106 through the resilient element 122 to the electrode 104. Hence, substantially all of the electrical current for sustaining a plasma arc (in transferred arc mode) can be passed directly between the contact surfaces 128, 310.

In some embodiments, the resilient element 122 is formed from a material that facilitates both carrying an electrical current and dissipating thermal heat associated with the current to prevent the resilient element 122 from melting. For example, the material of the resilient element 122 can be selected based on the current rating of the material. In some embodiments, the resilient element 122 comprises a helical compression spring, wire, or metal strip. For example, different types of resilient element 122 configurations are described in U.S. Ser. No. 13/344,860, assigned to Hypertherm, Inc., of Hanover, N.H., the contents of which are hereby incorporated herein by reference in their entirety.

In some embodiments, the end cap 106 is fabricated from an electrically conductive material, such as copper, copper alloy, brass, or other materials suitable for passing current both during pilot arc operation and transferred arc operation. The end cap 106 can be formed using a stamping approach from a material blank.

Figure 8:
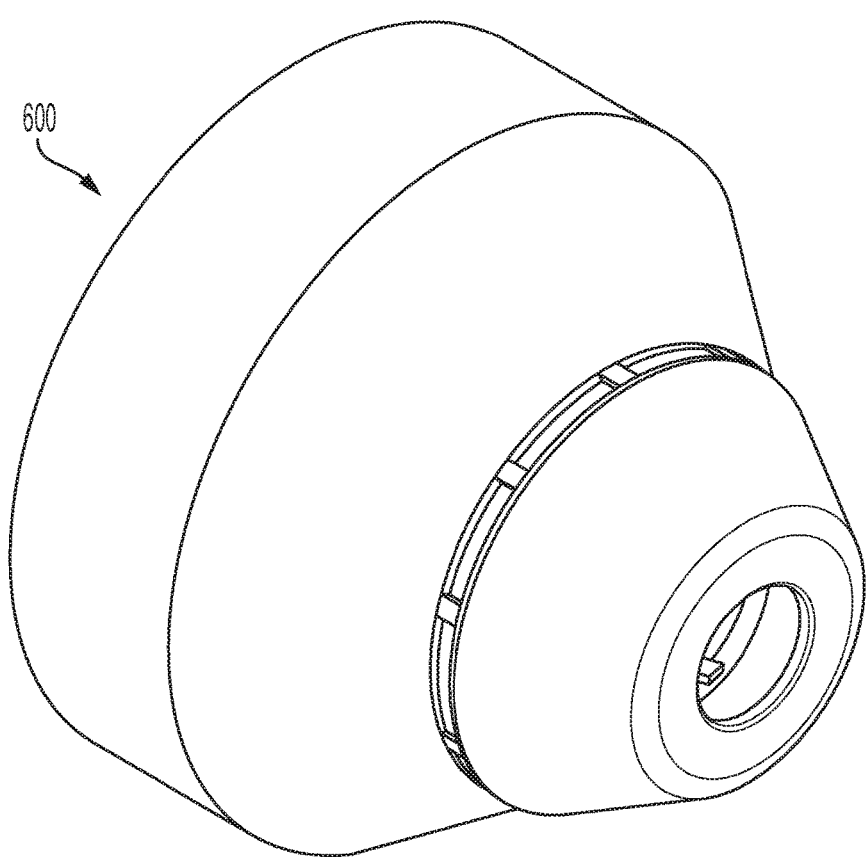
FIG. 8 is an exemplary shield design compatible with the cartridge of FIG. 1, according to an illustrative embodiment of the invention.

In another aspect, the cartridge 100 can additional include a shield. FIG. 8 shows an exemplary shield 600 compatible with the cartridge 100 of FIG. 1, according to an illustrative embodiment of the invention. The shield 600 can be made from a conductive material, such as copper or silver. The shield 600 can be affixed to the nozzle 108 via one of crimping, threading and snap-fit. In some embodiments, a flow passageway (not shown) is disposed in the nozzle 108 to allow a gas (e.g., a shield gas) to flow through/by the nozzle 108 to the shield 600.

Figure 9:
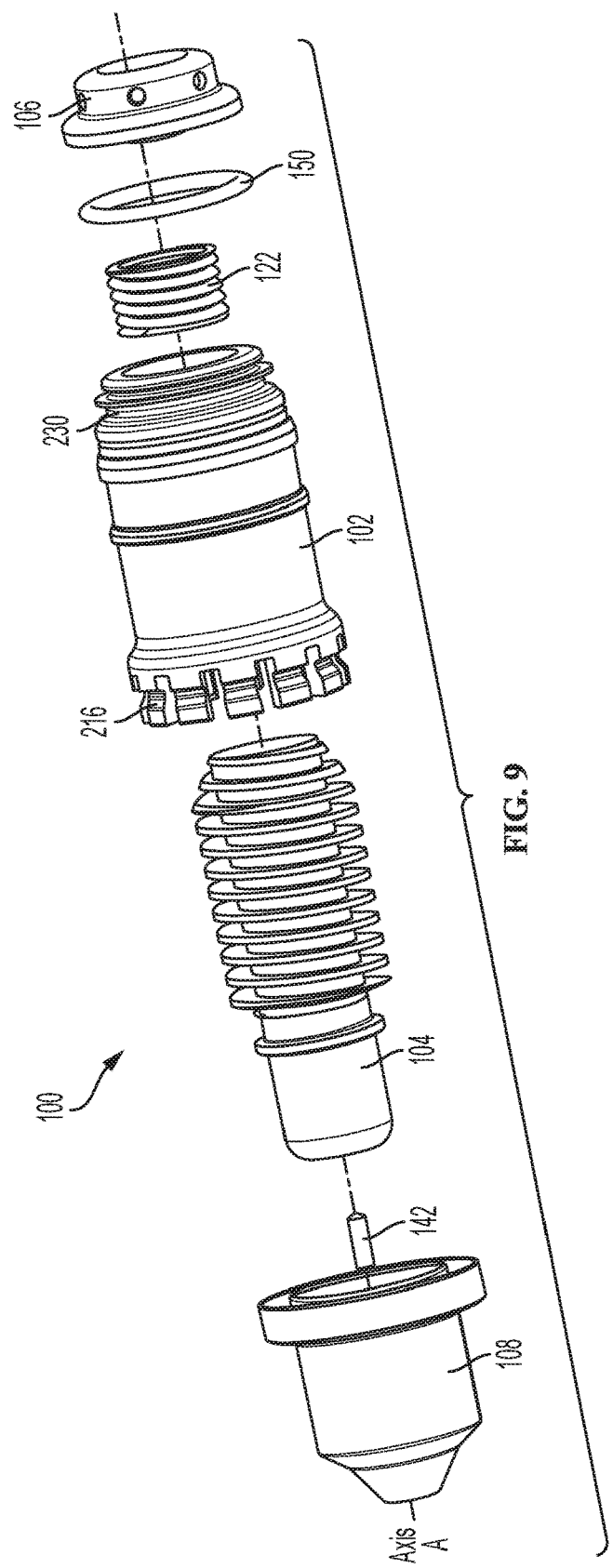
FIG. 9 is an exploded view of the cartridge of FIG. 1, according to an illustrative embodiment of the invention.

FIG. 9 is an exploded view of the cartridge 100 of FIG. 1, according to an illustrative embodiment of the invention. FIG. 9 shows the nozzle 108, the electrode 104, the swirl ring 102, the resilient element 122, the sealing device 150, and the end cap 106 in an unassembled state before forming the cartridge 100. In some embodiments, the insert 142 is also a part of the cartridge 100. During assembly, the electrode 104 is housed in the chamber formed by the coupling of the nozzle 108 to the distal end 110 of the swirl ring 102. The nozzle 108 can be securely affixed to the outer wall of the swirl ring 102 through the retention element 216 (e.g., a groove disposed on the swirl ring 102 against which the nozzle 108 is crimped or a thread to which the nozzle 108 is threaded). This interconnection secures the electrode 104 within the cartridge 100 while the inner wall of the swirl ring axially aligns the electrode 104 about the longitudinal axis A with respect to the nozzle 108 such that the electrode 104 is limited in its axial motion. The resilient element 122 is inserted into the swirl ring 102 from its proximal end 112 until it contacts the proximal end 124 of the electrode 104 within the swirl ring 102. The end cap 106 is then securely affixed to the proximal end 112 of the swirl ring 102 while substantially confining the resilient element 122 in the circular portion 304 of the end cap 106 and axially aligning the resilient element relative to the end cap 106. The end cap 106 can be connected to the swirl ring 102 through the retention element 230 (e.g., a groove disposed on the swirl ring 102 against which the end cap 106 is crimped or a thread to which the end cap 106 is threaded). This interconnection enables the biasing surface 308 of the end cap 106 to bias the resilient element 122 against the proximal end of the electrode 104, thereby urging it into an abutting position with the nozzle 108. This interconnection also longitudinally aligns the electrode 104 with respect to the end cap 106 such that during the transferred arc mode, the electrode 104 is only able to retract from the nozzle 108 far enough until it abuts the contact surface 310 of the depressed portion 304 of the end cap 106. Furthermore, the sealing device 150 can be disposed around an exterior surface of the proximal end 112 of the swirl ring 102 either before or after the end cap 106 is affixed to the swirl ring 102. In some embodiments, the swirl ring 702 of FIGS. 5a and b are used in the cartridge 100 in place of the swirl ring 102.

In some embodiments, a method is provided to assemble the cartridge 100 of FIG. 1. First, a thermoplastic material is molded to form the swirl ring 102 or 702. Various features of the swirl ring 102 or 702 can be created during the same molding process, such as the gas flow openings 136 and/or the nozzle retention surface 216 molded at the distal end 110 of the swirl ring 102. Similar features can be molded onto the swirl ring 702. During assembly, the electrode 104 can be disposed inside of the hollow body of the swirl ring 102 or 702. The inside wall of the swirl ring 102 or 702 can radially align the electrode 104. The electrode can be retained within the swirl ring 102 or 702 by fixedly securing the nozzle 108 to the distal end 110 of the swirl ring 102 or 702 via the nozzle retention surface 216 or 716, respectively. For example, the fixedly securing can be achieved through one of crimping, threading or snap-fitting with respect to the nozzle retention surface 216 or 716. Upon affixing the nozzle 108 to the swirl ring 102 or 702, a radial centering of the nozzle exit orifice 144 with respect to the distal end 125 of the electrode 104 is established. The electrode 104 can be longitudinally aligned relative to the nozzle 108 by fixedly securing an end cap 106 to the proximal end 112 of the swirl ring 102 or 702 via the cap retention element 230 or 730, respectively, thereby establishing the longitudinal alignment during a transferred arc operation of the cartridge 100 when a gas flow is used to bias the electrode 104 into contact with the end cap 106. Specifically, during the transferred arc mode, the longitudinal alignment includes restraining a longitudinal motion of the electrode 104 to within a blow-back distance defined by the distal end 125 of the electrode 104 and the exit orifice 144 of the nozzle 108. In some embodiments, the resilient element 122 is inserted into the end cap 106 and housed in the tunnel portion 302 of the end cap 106 prior to affixing the end cap to the swirl ring 102 or 702. In some embodiments, the sealing device 150, such as in the form of an o-ring, can be located on an external surface of the swirl ring 102 or 702 at its proximal end 112 to engage an internal surface of the plasma arc torch body (not shown) when the the cartridge 100 is installed into the plasma arc torch body.

Test results have shown that the cartridge design 100 of FIG. 1, operating at a current of 105 amps, can have the same or better performance than that of individual consumables (e.g., a nozzle, electrode, and swirl ring) assembled into a PMX 105 Amp plasma arc torch (operated at 105 amps), and at a lower manufacturing cost. Table 1 shows a comparison of performance and cost between the cartridge 100 and the individual consumables for a PMX 105 Amp plasma arc torch.

|  | Cartridge 100 | PMX 105 Amp Torch |
|---|---|---|
| Anode life at 105 A (hours) | 2.5 | 2.2 |
| Max cut speed at ½" mild steel (in per minute) | 95 | 95 |

The cost of the cartridge 100, which represents the combined cost of a swirl ring, electrode and nozzle (i.e., without an end cap), is lower than the total cost of the individual consumables in a PMX 105 Amp torch, which includes the cost of just a nozzle and an electrode (i.e., when a swirl ring is not even considered). In term of performance, a torch having the cartridge 100 installed therein has comparable maximum cut speed as compared to a PMX 105 Amp torch that contains individual consumable components. Performance of a torch containing the cartridge 100 is also better in terms of anode life.

In addition to the benefits described above, there are many others benefits associated with using the cartridge 100 in a plasma arc torch. First, such a design promotes ease of use through quick change capabilities, short setup time and ease of consumable selection for an end user. It also provides consistent cut performance because a suite of consumables are changed at once when the cartridge is changed, where the cartridge promotes easy component alignment, thus accuracy and repeatability of torch operation. In contrast, variation in performance is introduced when components are changed individually at different times. For example, there is more room to make an error when an operator has to align and orient individual torch components relative to each other. In another example, long term re-use of the same component (e.g., a swirl ring) can cause dimensional alteration after each blow-out, thereby altering the performance quality even if all other components are changed regularly. In addition, since the manufacturing and/or installation cost of a cartridge is lower than the combined cost of a set of consumables, there is a lower cost associated with per cartridge change than per change of a set of consumables. Furthermore, different cartridges can be designed to optimize torch operation with respect to different applications, such as marking, cutting, maintaining long life, etc.

In some embodiments, the cartridge 100 is single use, meaning that disassembly and replacement of individual components at the end of the life of the cartridge is not practical or cost effective. The entire cartridge 100 is discarded and/or disposed (e.g., recycled), without replacing individual particular parts. If the cartridge 100 is recycled, in addition to recovering the copper, a benefit of constructing the swirl ring 102 of a thermoplastic material is that the material can be reheated, reshaped, and frozen repeatedly, thus making it easily recyclable. In contrast, Vespel™ and other thermal-set materials lack these characteristics that promote recyclability.

Figure 10:
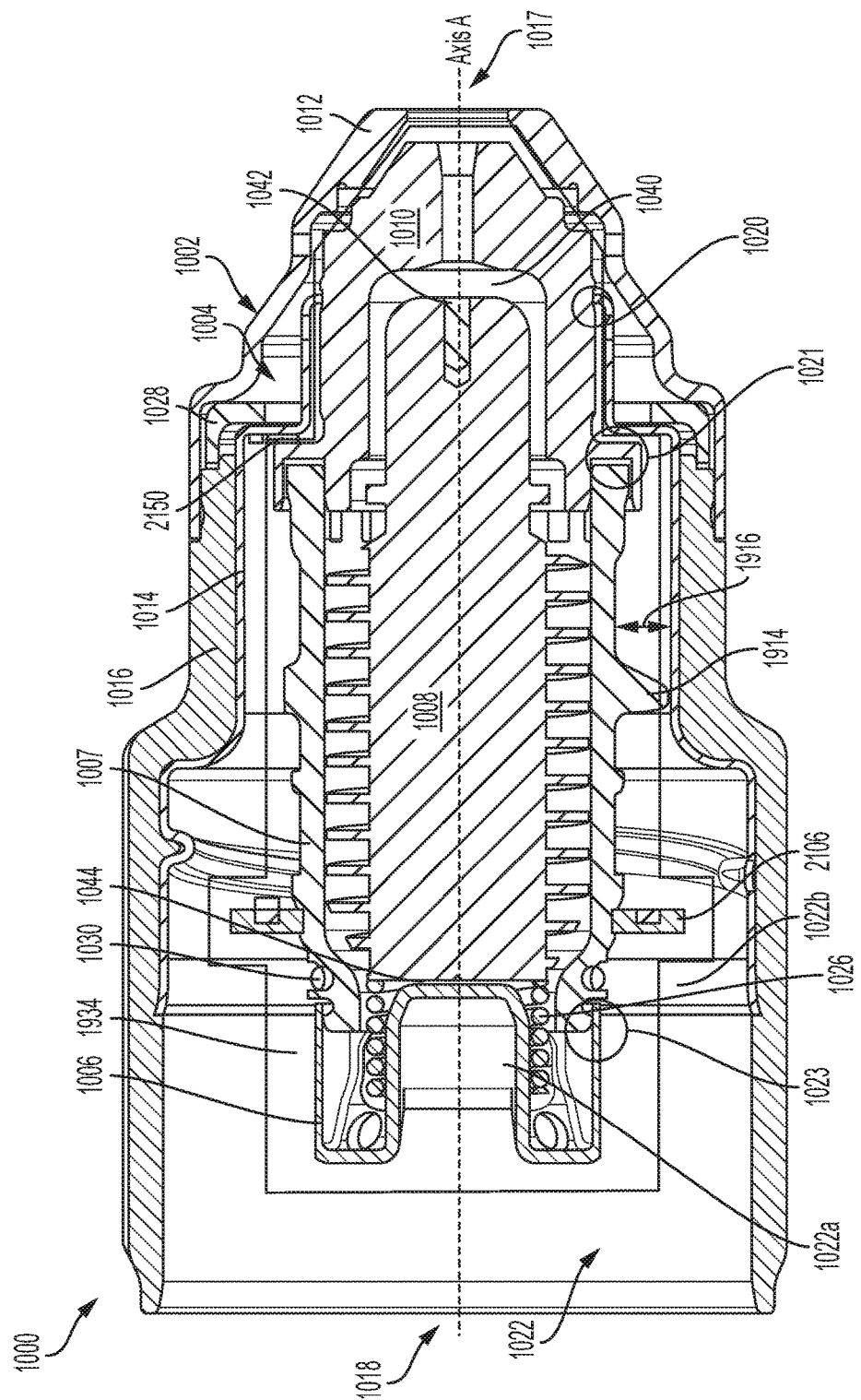
FIG. 10 is a sectional view of another exemplary cartridge for a plasma arc torch, according to an illustrative embodiment of the invention.

FIG. 10 is a sectional view of another exemplary consumable cartridge for a contact start plasma arc torch, according to an illustrative embodiment of the invention. As shown, the consumable cartridge 1000 has an inner component 1004 and an outer component 1002. The outer component 1002 can include at least one of a shield 1012, a retaining cap 1014, a cap sleeve 1016 or an insulator component 1028. In some embodiments, the outer component 1002 comprises two or more of these components fixedly secured to one another. The inner component 1004 can include at least one of a crown 1006, a swirl ring 1007, an electrode 1008, or a nozzle 1010. For example, the inner component 1004 can comprise all these components, as illustrated by the irregular box of FIG. 10. The inner component 1004 can additionally include a resilient element 1026, which can be substantially the same as the resilient element 122 of FIG. 1, a sealing device 1030 and/or a signal device 2106. The electrode 1008 of the cartridge 1000 can be substantially the same as the electrode 104 of FIG. 1. For example, the electrode 1008 can include an emissive insert 1042 (e.g., same as the insert 142).

Generally, the cartridge 1000 can include multiple consumable pieces that are assembled together as an integrated, unitary device. In some embodiments, if any one of the elements in the cartridge 1000 needs replacement, the entire cartridge 1000 is replaced. The cartridge 1000 can use a blow-back contact starting mechanism for contact starting a plasma arc torch upon assembly into the torch. For example, the electrode 1008 can be a spring-forward electrode, which means that the resilient element 1026 (e.g., a spring) can exert a separating force on the proximal end of the electrode 1008 to bias the electrode 1008 away from the crown 1006 and toward the nozzle 1010.

The outer component 1002 includes a substantially hollow body that defines a longitudinal axis A, a distal end 1017 (i.e., the end closest to a workpiece during operation of a plasma arc torch incorporating the cartridge 1000), and a proximal end 1018 (i.e., the end opposite of the distal end 1017). The inner component 1004 is adapted to be disposed substantially within the hollow body of the outer component 1002 with at least a portion of the inner component 1004 surrounded by the hollow body. The inner component 1004 can include an engagement feature disposed on an inner or outer surface to engage the outer component 1002 by longitudinally constraining (i.e., axially securing) the outer component 1002 relative to the inner component 1004 while permitting independent rotation of the components relative to each other (i.e., enabling rotatable engagement) when the cartridge 1000 is not assembled in a plasma arc torch. Such rotatable engagement and axial securement can be accomplished by one of crimping, snap fitting, frictional fitting or threading.

The inner component 1004 can include the nozzle 1010, the swirl ring 1007, the electrode 1008 and the crown 1006. In some embodiments, the rotatable engagement and axial securement between the outer and inner components occurs between the nozzle 1010 of the inner component 1004 and the retaining cap 1014 of the outer component 1002 at the interface 1020 by one of a frictional fit, crimping, snap fit or threading connection. For example, the nozzle 1010 can include an engagement feature, such as a groove, circumferentially disposed on an external surface that allows a distal tip of the retaining cap 1014 to frictionally fit into the groove. In some embodiments, the nozzle 1010 is fixedly secured to (i.e., axially and radially restrains) the retaining cap 1014 at the interface 1020. In this case, the rotatable engagement and axial securement between the outer and inner components can be indirectly accomplished by rotatable engagement and axial securement between the swirl ring 1007 and the nozzle 1010 of the inner component 1004 at the interface 1021, where the nozzle 1010 is fixedly secured to the outer component 1002. In some embodiments, the nozzle 1010 is fixedly secured to the retaining cap 1014 at the interface 1020, and the swirl ring 1007 is fixedly secured to the nozzle 1010 at the interface 1021. In this case, the rotatable engagement and axial securement between the outer and inner components can be indirectly accomplished by rotatable engagement and axial securement between the crown 1006 and the swirl ring 1007 of the inner component 1004 at the interface 1023, where the swirl ring 1007 is fixedly secured to the outer component 1002 via its connection to the nozzle 1010.

Generally, the inner component 1004 can be divided into a forward portion and a rear portion with respect to the location of the rotatable engagement and axial securement feature. For example, the forward portion includes the rotatable engagement and axial securement feature while the rear portion does not. That is, the rear portion can have no means for enabling axial securement and rotatable engagement with the outer component 1004. As an example, if the rotatable engagement and axial securement feature is disposed on the nozzle 1010, the forward portion of the inner component 1004 includes the nozzle 1010 and the rear portion includes the electrode 1008, swirl ring 1007 and/or crown 1006. As another example, if the rotatable engagement and axial securement feature is between the swirl ring 1007 and the nozzle 1010, the forward portion of the inner component 1004 includes the swirl ring 1007 and the nozzle 1010, while the rear portion includes the electrode 1008 and the crown 1006. Upon rotatable engagement and axial securement of the inner and outer components at the forward portion of the inner component 1004, the rear portion of the inner component 1004 is adapted to be substantially suspended within the hollow body of the outer component 1002. Thus, via the rotatable engagement and axial securement of the inner and outer components at the forward portion, the rear portion can have little to no direct physical contact with the inner surface of the hollow body of the outer component 1002 while remaining substantially radially centered within the hollow body of the outer component 1002.

In some embodiments, the cartridge 1000 includes a hollow region 1022 between the rear portion of the inner component 1004 and the proximal end 1018 of the outer component 1004. As shown, the hollow region 1022 can include (i) a center cavity portion 1022a in the recess of the crown 1006 and (ii) a tubular portion 1022b between the outer surface of the crown 1006 and swirl ring 1007 and the inner surface of the retaining cap 1014 and cap sleeve 1016. The tubular portion 1022b can substantially surround the center cavity portion 1022a and extend further into the cartridge 1000 than the center cavity portion 1022a. The hollow region 1022 is configured to receive a torch head (not shown) to enable mating between the rear portion of the inner component 1004 (e.g., the crown 1006) and certain components of the torch head (e.g., a cathode), as described below in detail with reference to FIGS. 21 and 22.

As described above, the outer component 1002 can include at least one of the shield 1012, retaining cap 1014 or cap sleeve 1016 oriented substantially symmetrically about the longitudinal axis A. In some embodiments, the outer component 1002 also includes an insulator component 1028. The retaining cap 1014 and/or the shield 1012 can be constructed from an electrically and/or thermally conductive material, such as copper or brass. The two components can be made of the same material or different materials (e.g., the shield 1012 can be made of copper and the retaining cap 1014 can be made of brass). The cap sleeve 1016 and/or the insulator component 1028 can be manufactured through injection molding of a plastic material (e.g., nylon resin) or a high-temperature thermoplastic material comprising a polymer formed of ether and ketone molecules (e.g., ether ketone based compounds), such as polyetheretherketone (PEEK). In some embodiments, at least one of the cap sleeve 1016 or insulator component 1028 is manufactured from the same or similar material as the swirl ring 102 or 702. In some embodiments, the insulator component 1028 is manufactured from an electrically insulating material (e.g., plastic) that can withstand a higher temperature than that of the cap sleeve 1016. Generally, each of the interfaces among various elements of the outer component 1002 can be formed by one of crimping, snap fit, frictional fit, or threading.

Figure 11:
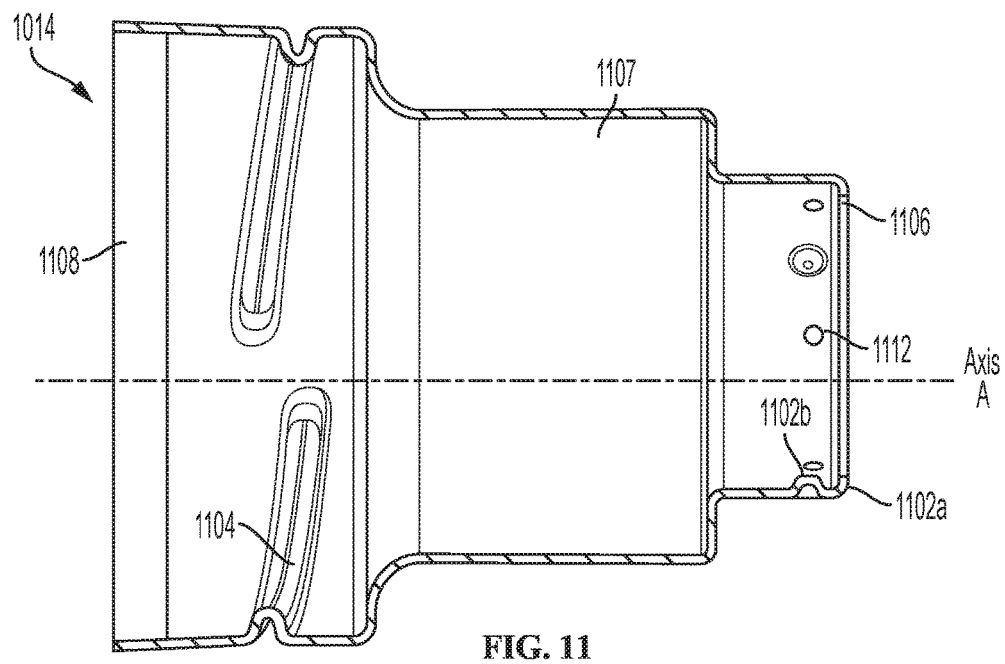
FIG. 11 is an exemplary configuration of the retaining cap of the cartridge of FIG. 10, according to an illustrative embodiment of the invention.

FIG. 11 is an exemplary configuration of the retaining cap 1014 of the cartridge 1000 of FIG. 10. The retaining cap 1014 can have a substantially hollow body with a substantially uniform thickness. Uniform thickness of the retaining cap 1014, coupled with a stamp technique for manufactures the component, simplifies manufacturing procedure and minimizes manufacturing cycle time, consumable weight, and material usage. Generally, the retaining cap 1014 can include three substantially hollow, cylindrical portions—a distal portion 1106, a middle portion 1107, and a proximal portion 1108. The portions can stack together along the longitudinal axis A and form a stepped configuration where the distal portion 1106 can have a smaller diameter in the radial direction (i.e., perpendicular to the axis A) than that of the middle portion 1107, which can have a smaller diameter than that of the proximal portion 1108.

In some embodiments, an interior surface the distal portion 1106 of the retaining cap 1014 includes a retention feature 1102 (e.g., a protrusion, tab or flange) configured to rotatably engage and axially secure to the forward portion of the inner component 1004 (e.g. at the nozzle 1010 of the inner component 1004) via one of snap fit, frictional fit, crimping or threading, when the forward portion is disposed in the hollow body of the retaining cap 1014. As shown, the retention feature 1102 comprises a protrusion 1102a, which can be generated by bending a portion of the wall of the retaining cap 1014. The protrusion 1102a is adapted to snap fit into a groove on the nozzle 1010. In addition, the retention feature 1102 includes a bumper 1102b adjacent to the protrusion 1102a to generate friction between the retaining cap 1014 and the nozzle 1010 upon engagement via frictional fit. The protrusion 1102a and the bumper 1102b are dimensioned as such that they permit the components to independently rotate relative to each other after engagement. Alternatively, the retention feature 1102 can be suitably configured to fixedly engage (i.e., axially and radially secure) the forward portion of the inner component 1004. In some embodiments, a section of the retaining cap 1014, such as the distal portion 1106 of the retaining cap 1014, includes at least one vent hole 1112 extending from an interior surface to an exterior surface of the retaining cap 1014 to permit a flow of gas therethrough.

In some embodiments, the proximal portion 1108 of the retaining cap 1014 includes one or more threads 1104 to engage a torch head (not shown) of a plasma arc torch when the cartridge 1000 is installed into the torch. In some embodiments, two or more discrete threads 1104 (e.g., three threads) can be disposed circumferentially around an interior surface of the proximal portion 1108 of the retaining cap 1014 to engage a set complementary threads on the torch head, when at least a portion of the torch head is disposed in the hollow body of the proximal portion 1108. Locking between the torch head and the retaining cap 1014 requires rotation of one component relative to the other by a degree depending on the number of discrete threads 1104 disposed on the retaining cap 1014. For example, if there are three discrete threads 1104, a rotation of only about 120 degrees is needed to lock the components to each other. This facilitates quick installation of the cartridge 1000 onto a plasma arc torch. In general, the retaining cap 1014 has sufficient material thickness and/or strength to retain the cartridge 1000 to the torch head via the threaded engagement.

Figure 12A:
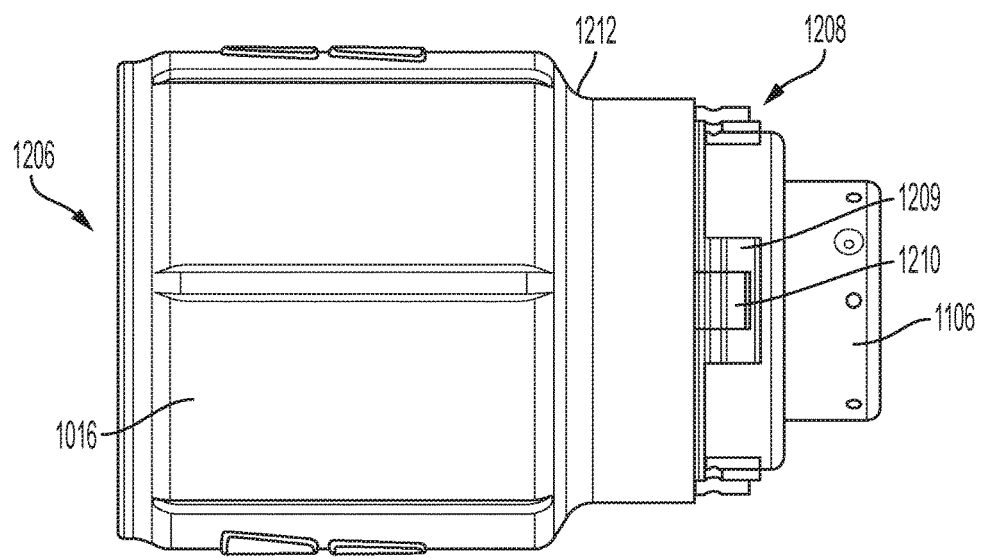
FIGS. 12a and 12b are sectional and exterior profile views, respectively, of an exemplary cap sleeve overmolded onto the retaining cap of FIG. 11, according to an illustrative embodiment of the invention.
Figure 12B:
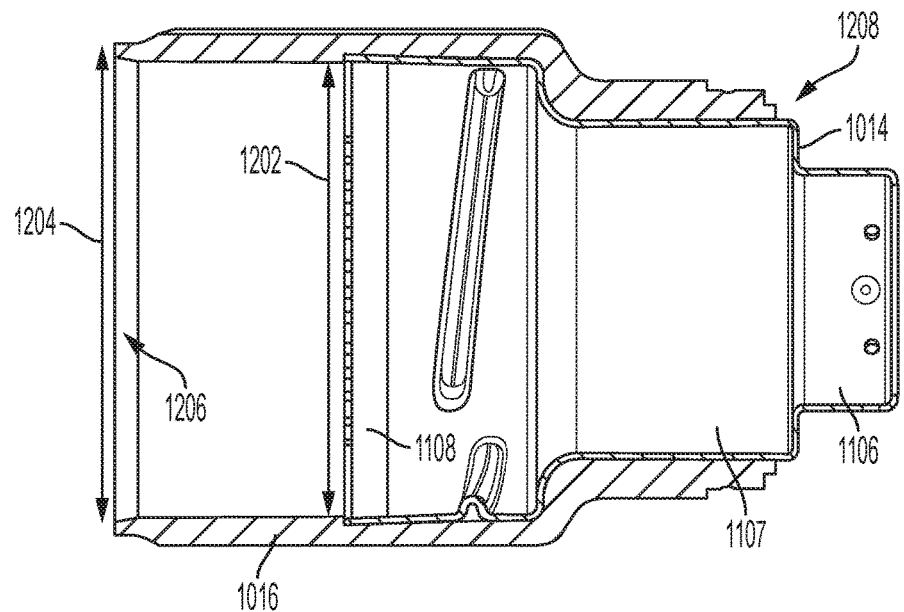

FIGS. 12a and 12b are sectional and exterior profile views, respectively, of an exemplary cap sleeve 1016 overmolded onto the metallic retaining cap 1014 of FIG. 11, which can form at least a portion of the outer component 1002. As shown in FIG. 12a, the cap sleeve 1016 has a substantially hollow body, at least a portion of which is overmolded onto the external surfaces of the middle and proximal portions 1107, 1108 of the retaining cap 1014. In some embodiments, only the distal portion 1106 of the retaining cap 1014 is fully exposed. The cap sleeve 1016 can include a proximal end 1206 and a distal end 1208 along the longitudinal axis A. In some embodiments, the distal end 1208 of the cap sleeve 1016 includes one or more retention features for engaging the insulator component 1028. For example, the distal end 1208 of the cap sleeve 1016 can be molded over the middle portion 1107 of the retaining cap 1014 as one or more tabs 1209. A raised feature 1210 can be disposed on each the tabs 1209. The combination of the tabs 1209 and the raised features 1210 can be used to engage the insulator component 1028, as explained below in detail with reference to FIGS. 14a-c. In some embodiments, the cap sleeve 1016 includes one or more retention features for engaging the shield 1012. For example, the cap sleeve 1016 can include at least one groove 1212 disposed on an external surface, against which a portion of the shield 1012 can be crimped to secure the two components together.

As shown in FIG. 12b, the cap sleeve 1016 substantially surrounds the retaining cap 1014 at its middle and proximal portions 1107, 1108 and can extend proximally beyond the retaining cap 1014 in the longitudinal direction. In some embodiments, the interior diameter 1202 of the cap sleeve 1016 near where the cap sleeve 1016 overlaps with the proximal portion 1108 of the retaining cap 1014 is smaller than the interior diameter 1204 of the cap sleeve 1016 at the proximal end 1206 of the cap sleeve 1016, such as by a draft of 0.5 degrees. This varying inner diameter along the length of the cap sleeve 1016 helps to guide insertion of the torch head (not shown) into the retaining cap 1014 and facilitates their relative alignment prior to rotation of one component relative to the other to achieve engagement at the discrete threads 1104 of the retaining cap 1014.

Figure 13:
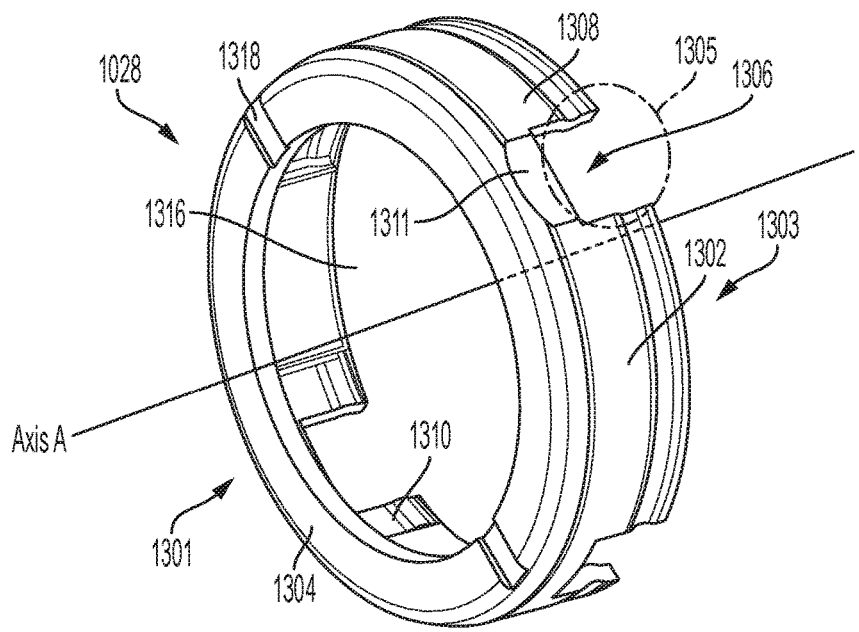
FIG. 13 is an exemplary configuration of the insulator component, which can be a part of the outer component of the cartridge of FIG. 10, according to an illustrative embodiment of the invention.

FIG. 13 is an exemplary configuration of the insulator component 1028, which can be a part of the outer component 1002 of the cartridge 1000 of FIG. 10 or a stand-alone element. The insulator component 1028 is generally circular in shape and constructed from an electrically non-conductive material. The insulator component 1028 can be located between the shield 1012 and the retaining cap 1014/cap sleeve 1016 combination of the outer component 1002 to space the majority of the outer component 1002 (e.g., the retaining cap 1014 and the cap sleeve 1016) from the shield 1012 and to electrically insulate the retaining cap 1014 from the shield 1012. The insulator component 1028 includes a shoulder 1304, also referred to as a contour, step, or flange, located at the distal end 1301 of the insulator component 1028. The shoulder 1304 is oriented substantially perpendicularly to the longitudinal axis A. The shoulder 1304 defines an opening 1316 that complements the shape of the distal portion 1106 of the retaining cap 1014 and permits the distal portion 1106 therethrough. In some embodiments, the opening 1316 has a diameter that is substantially the same as or larger than the diameter of the distal portion 1106 of the retaining cap 1014, but smaller than the diameter of the middle portion 1107 of the retaining cap 1014, such that the middle portion 1107 cannot pass through the opening 1316. An external surface of the shoulder 1304 can include one or more channels 1318 dispersed about the opening 1316 to provide a gas flow path such that a portion of a gas flowing to the shield 1012 can travel through the channels 1318 to cool the insulator component 1028 and the shield 1012.

The insulator component 1028 also includes a substantially hollow cylindrical body 1302 located at the proximal end 1303 of the insulator component 1028. The cylindrical body 1302 is disposed about the longitudinal axis A and extends along the longitudinal axis. In some embodiments, retention features are provided on the cylindrical body 1302 to engage the insulator component 1028 with the shield 1012 and/or the cap sleeve 1016. For example, a cap sleeve retention feature 1305 can include a slot 1306 extending from an interior surface to an exterior surface of the cylindrical body 1302. The slots 1306 are defined by a plurality of extensions 1308 disposed about the cylindrical body 1302, where each slot 1306 is situated between a pair of the extensions 1308. The cap sleeve retention feature 1305 can also include at least one groove 1310 on an internal surface of the cylindrical body 1302 centered around a corresponding slot 1306 and on the extensions 1308. The grooves 1310 and the slots 1306, which made up the cap sleeve retention features 1305, are configured to cooperatively engage the cap sleeve 1016 by one of frictional fit, snap fit, threading or crimping. A shield retention feature 1311 can include at least one groove disposed on an external surface of the cylindrical body 1302, such as adjacent to a slot 1306. The grooves 1311 are configured to engage the shield 1012 via crimping, for example.

Figure 14A:
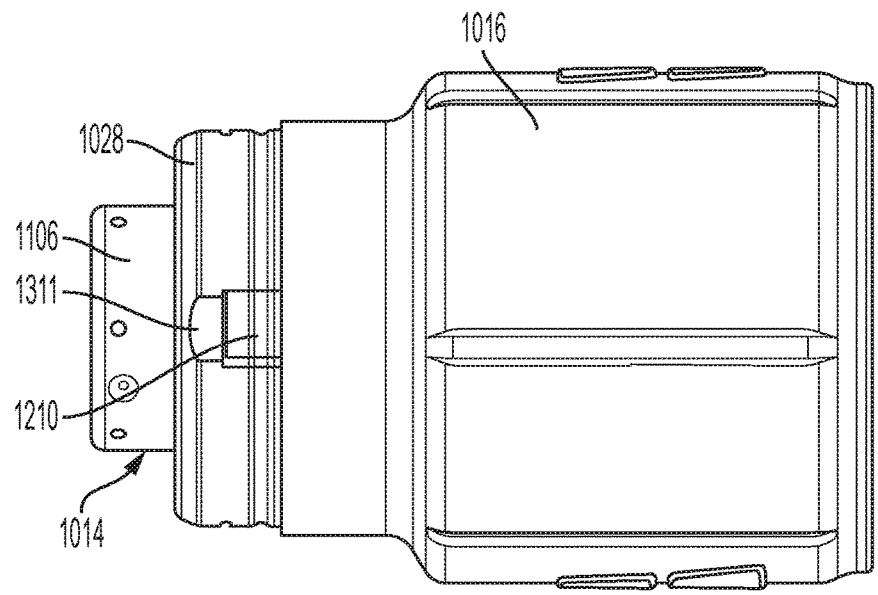
FIGS. 14a-c are various views of the insulator component of FIG. 13 fixedly secured to the cap sleeve and the retaining cap, according to an illustrative embodiment of the invention.
Figure 14B:
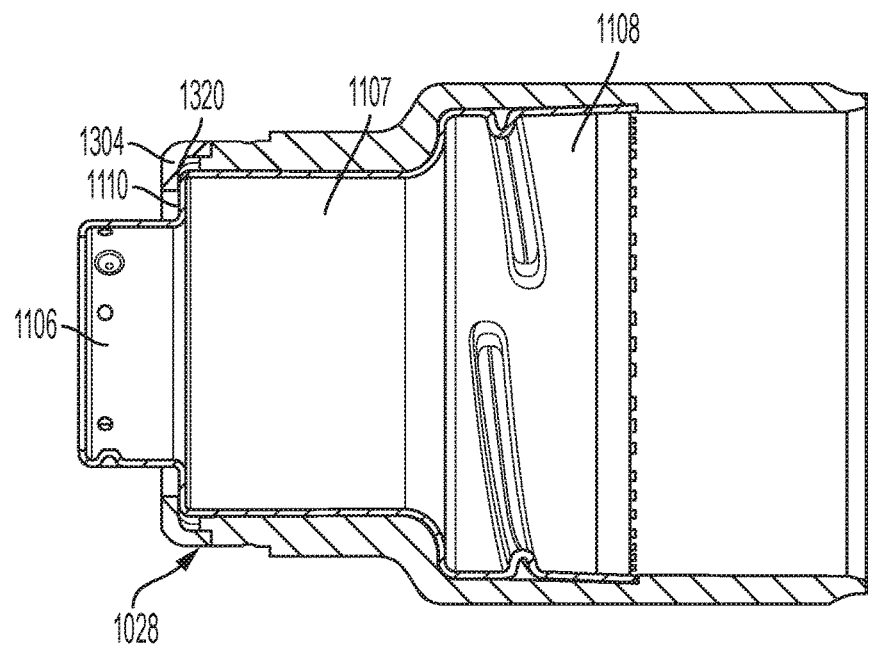
Figure 14C:
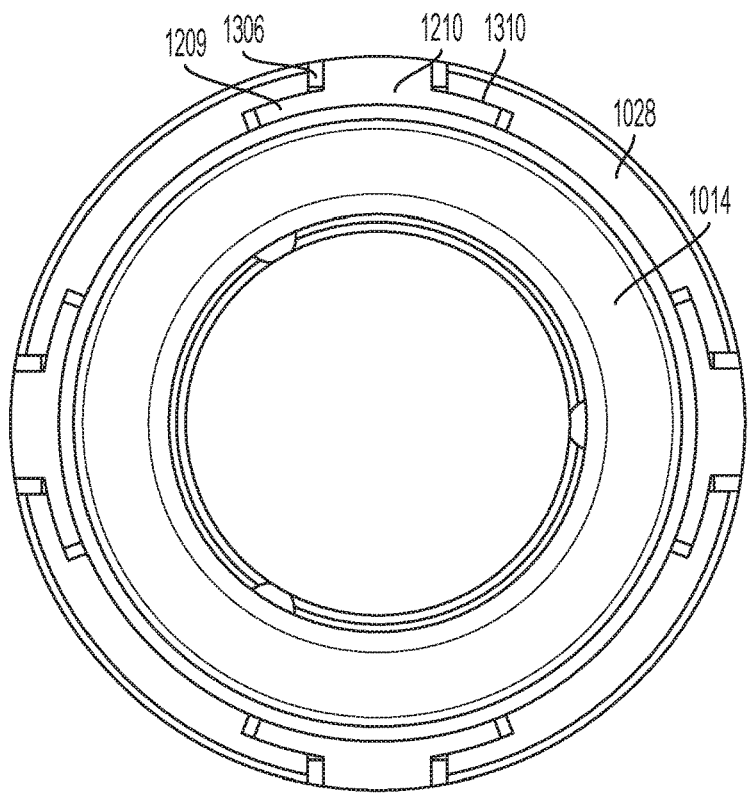

FIGS. 14a-c are various views of the insulator component 1028 of FIG. 13 fixedly secured to the cap sleeve 1016 and the retaining cap 1014. The three components 1028, 1016, 1014 can form at least a portion of the outer component 1002. During assembly, the distal portion 1106 of the retaining cap 1014 can slide through the opening 1316 defined by the shoulder 1304 of the insulator component 1028 until an interior surface 1320 of the shoulder 1304 abuts against an exterior surface 1110 of the middle portion 1107 of the retaining cap 1014 and no further advancement is possible. At this point, the combination of the retaining cap 1014 and the cap sleeve 1016 are securely seated against the insulator component 1028, with the insulator component 1028 substantially surrounding the exterior surface 1110 of the middle portion 1107 of the retaining cap 1014. The grooves 1310 and the slots 1306 of the cap sleeve retention feature 1305 of the insulator component 1028 can engage the retention feature 1210 of the cap sleeve 1016 via frictional fit, for example, to connect the insulator component 1028 to the cap sleeve 1016. The friction for the frictional fit can be supplied by the crimping force of the shield 1012 when it is attached to the insulator component 1028. Specifically, the grooves 1311 of the insulator component 1028 can provide a surface to which the shield 1012 is crimped against to fixedly connect the insulator component 1028 to the shield 1012. In addition, the connection between the insulator component 1028 and the cap sleeve 1016 also fixedly engages the insulator component 1028 to the retaining cap 104 via its fixed connection to the cap sleeve 1016 (i.e., the cap sleeve 1014 is overmolded onto the middle portion 1107 of the retaining cap 1014).

FIG. 14c illustrates a cross-sectional view of the assembly comprising the insulator component 1028, the cap sleeve 1016 and the retaining cap 1014, where the cross-sectional view is in the radial plane and from the perspective of a viewer at the distal end of the assembly. As shown, upon abutment of the insulator component 1028 against the retaining cap 1014, the one or more grooves 1310 in the interior surface of the insulator component 1028 can snap fit with the tabs 1209 of the cap sleeve 1014, while the raised regions 1210 of the cap sleeve 1014 can be inserted into the slots 1306 of the insulator component 1028. Such snap fit connection can fixedly join the insulator component 1028 with the cap sleeve 1016 (and also to the retain cap 1014 through the overmolded cap sleeve 1016). Because the cross-sectional dimension of each raised region 1210 is less than that of each slot 1306, each raised region 1210 is adapted to leave at least a portion of each slot 1306 unobstructed, thus permitting gas flow therethrough. As shown in FIG. 14c, the cap sleeve 1016 and the insulator component 1028 can engage at four locations radially disposed around the longitudinal axis A. In other embodiments, fewer or more engagement locations are constructed.

Figure 15:
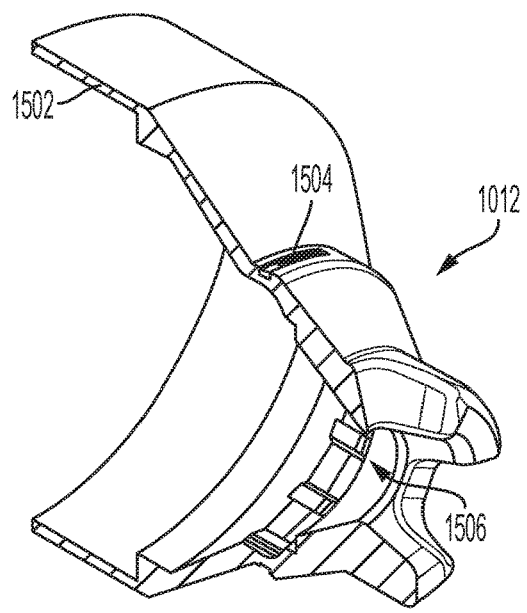
FIG. 15 is an exemplary configuration of the shield that can be a part of the outer component of the cartridge of FIG. 10, according to an illustrative embodiment of the invention.

FIG. 15 is an exemplary configuration of the shield 1012, which can be a part of the outer component 1002 of the cartridge 1000 of FIG. 10 or a stand-alone piece. The shield 1012 of FIG. 15 can be used in a hand-cutting plasma arc torch. The shield 1012 comprises a substantially hollow body. A section in a proximal portion 1502 of the hollow body can be crimped against one or more grooves 1212 on the distal end 1208 of the cap sleeve 1014 to securely connect the shield 1012 to the cap sleeve 1016. Another section of the proximal portion 1502 can be crimped against the grooves 1311 of the insulator component 1028 to securely connect the shield 1012 to the insulator component 1028. These connections also fixedly engage the shield 1012 to the retaining cap 1014 via their common connection (either directly or indirectly) to the cap sleeve 1016. Other means for connecting the shield 1012 to the cap sleeve 1016 and/or the insulator component 1028 are also within the scope of the present invention, including threading or snap fit. The shield 1012 can also include a shield exit orifice 1506 and one or more gas vent holes 1504 disposed on a body of the shield 1012 extending from an interior surface to an exterior surface of the shield 1012.

Figure 16:
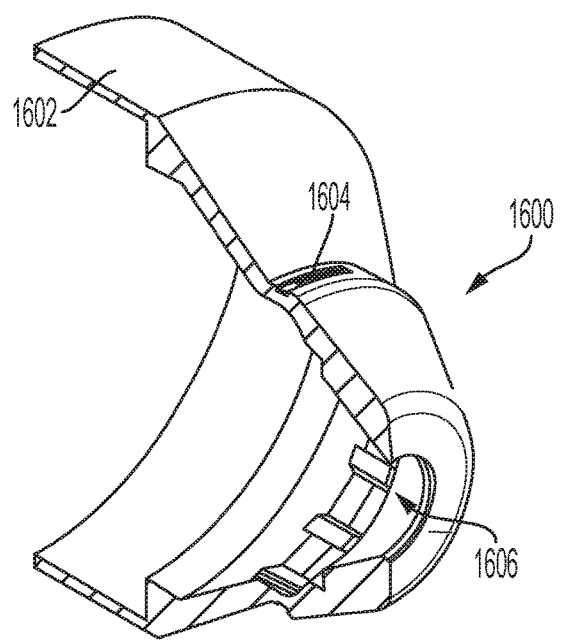
FIG. 16 is another exemplary shield that is compatible with the cartridge of FIG. 10, according to an illustrative embodiment of the invention.

FIG. 16 is another exemplary shield 1600 that is compatible with the cartridge 1000 of FIG. 10. The shield 1600 can be used in a mechanized plasma arc torch. The shield 1600 can also include a proximal portion 1602 that is substantially the same as the proximal portion 1502 of the shield 1012 of FIG. 15 to securely connect the shield 1600 to the cap sleeve 1016 and the insulator component 1028 by one of crimping, frictional/snap fit or threading. The shield 1600 can also include a shield exit orifice 1606 and one or more gas vent holes 1604, similar to the shield 1012 of FIG. 15.

In other embodiments, the shield 1012 can be substantially the same as the shield 800 described above with respect to FIG. 8. In some embodiments, the insulator component 1028 is dimensioned to align and center the shield 1012 relative to the retaining cap 1014 and the cap sleeve 1016 in the radial direction. As clearly illustrated in FIG. 10, the insulator component 1028 spaces the shield 1012 from the combination of retaining cap 1014 and cap sleeve 1016. Thus, when the shield 1012 is fixedly connected to the cap sleeve 1016 and/or the insulator component 1028, the tight tolerance among the components minimizes radial movement of the shield 1012 that can result in its radial misalignment.

As described above with reference to FIG. 10, the inner component 1002 can include at least one of the crown 1006, electrode 1008, swirl ring 1007 or nozzle 1010 oriented substantially symmetrically about the longitudinal axis A. The inner component 1002 can additionally include the resilient element 1026, the sealing device 1030 and/or the signal device 2106. Generally, each of the interfaces among various elements of the inner component 1004 can be formed by one of crimping, snap fit, frictional fit, or threading to fixedly connect (i.e., axially and radially secure) or axially secure and rotatably engage the components. In some embodiments, the inner component 1004 is substantially the same or similar to the cartridge 100 described above with reference to FIG. 1. For example, the electrode 1008 can be substantially the same as the electrode 104 of FIG. 2. The electrode 1008 can be relatively flat near the proximal end such that the electrode 1008 provides a stable surface for contacting the resilient element 1026.

Figure 17:
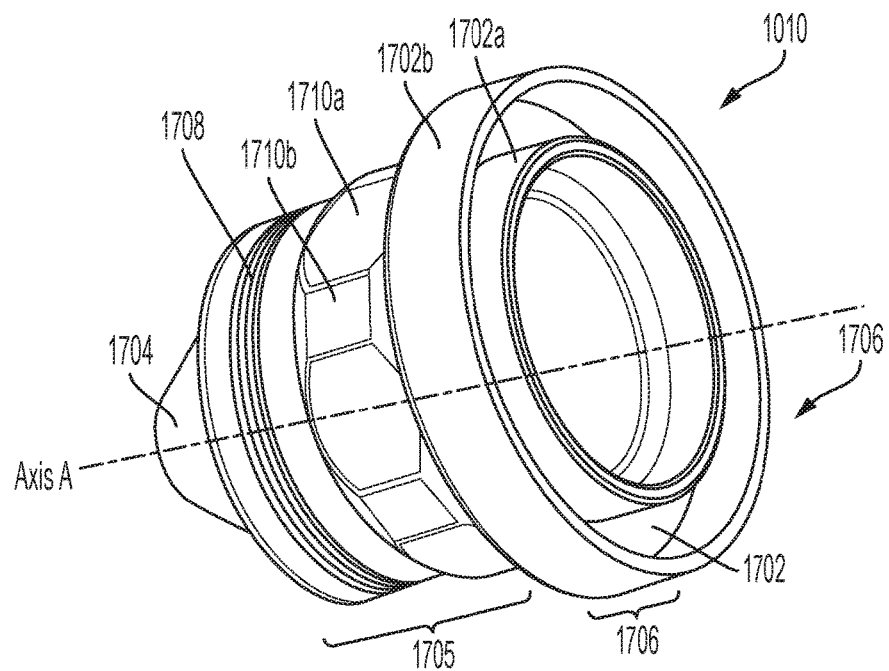
FIG. 17 is an exemplary configuration of the nozzle of the cartridge of FIG. 10, according to an illustrative embodiment of the invention.

The nozzle 1010 can be a part of the inner component 1004 of the cartridge 1000 in FIG. 10. The nozzle 1010 can define, in relation to the electrode 1008, a plasma chamber 1040. In some embodiments, the nozzle 1010 is substantially the same as the nozzle 108 of FIG. 3. FIG. 17 shows another exemplary configuration of the nozzle 1010 of the cartridge 1000 of FIG. 10. The nozzle 1010 defines a distal portion 1704, a middle portion 1705, and a proximal portion 1706 along the longitudinal axis A. The nozzle 1010 can include a retention feature at the proximal portion 1706, such as an indent 1702 with an inner surface 1702*a* and an outer surface 1702*b*, configured to connect the nozzle 1010 to the distal end of the swirl ring 1007 at the interface 1021 (as shown in FIG. 10). For example, the distal end of the swirl ring 1007 can be inserted into the indent 1702, and at least one of the inner surface 1702*a* or the outer surface 1702*b* of the indent 1702 can be crimped against a groove on the distal end of the swirl ring 1007 to secure the two components together. Connection between the nozzle 1010 and the swirl ring 1007 at the interface 1021 can be one of (i) rotatable engagement and axial securing or (ii) fixed engagement (i.e., axial and radial securing) via one of snap fit, crimping, frictional fit or threading. As will be described below, the engagement between the nozzle 1010 and the swirl ring 1007 is adapted to control the swirl strength of a gas at the interface 1021 as the engagement defines the size and shape of the swirl holes of the swirl ring 1007 upon assembly.

The nozzle 1010 can also include a retention feature in the middle portion 1705, such as one or more grooves 1708 circumferentially disposed on an outer surface of the nozzle 1010, to rotatably engage and axially secure the retention feature 1102 of the retaining cap 1014 to form the interface 1020 (as shown in FIG. 10) via one of snap fit, frictional fit, crimping or threading. Alternatively, the retention feature 1708 can be configured to fixedly secure (i.e., axial and radial secure) the retaining cap 1014 thereto to form the interface 1020. Upon engagement, the retaining cap 1014 substantially surrounds the outer surface of at least the middle portion 1705 and the proximal portion 1706 of the nozzle 1010. The nozzle 1010 can further include a series of flat elements 1710*a* interspersed among a series of raised elements 1710*b* circumferentially disposed on an external surface of the middle portion 1705. The raised elements 1710*b* facilitates radial alignment and centering of the nozzle 1010 relative to the retaining cap 1014 and the flat elements 1710*a* provide spacing between the nozzle 1010 and the retaining cap 1014 to permit gas flow therethrough.

Figure 18:
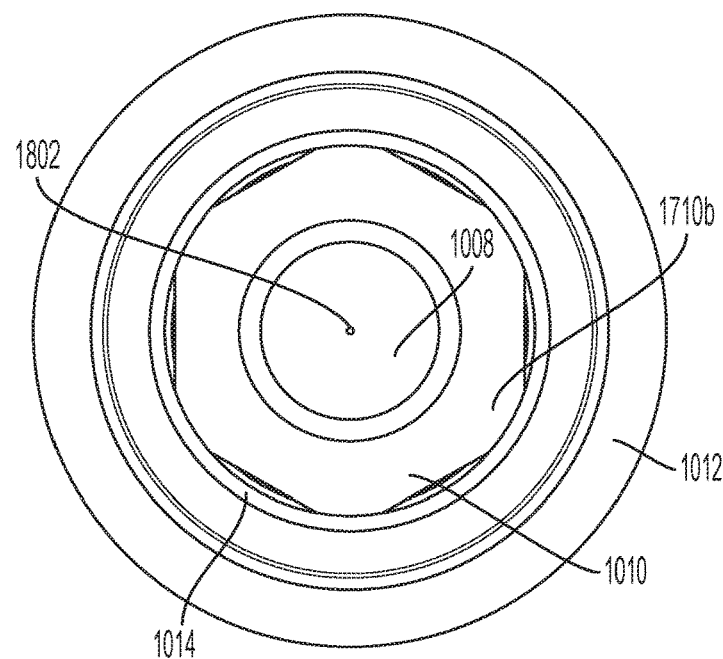
FIG. 18 is cross-sectional view of an assembly comprising the nozzle, the retaining cap and the shield of the cartridge of FIG. 10, according to an illustrative embodiment of the invention.

FIG. 18 is cross-sectional view of an assembly comprising the nozzle 1010, the retaining cap 1014 and the shield 1012, where the cross-sectional view is in the radial plane and from the perspective of a viewer at the proximal end of the assembly. The assembly also includes the electrode 1008. As shown, these components can be radially aligned and concentrically positioned with a common center 1802. At least a portion of the electrode 1008 is disposed within a cavity defined by the inner wall of the nozzle 1010 that can radially align the electrode 1008 by limiting a radial movement of the electrode 1008. At least a portion of the nozzle 1010 can be disposed within a cavity defined by the inner wall of the retaining cap 1014 that radially aligns the nozzle 1010 by limiting a radial movement of the nozzle 1010. Specifically, the raised elements 1710*b* on the external surface of the nozzle 1010 are configured to abut against the correspond inner surface of the retaining cap 1014 to radially orient the nozzle 1010 relative to the retaining cap 1014. The flat elements 1710*a* on the external surface of the nozzle 1010 allow spacing between the nozzle 1010 and the retaining cap 1014 such that a gas can flow therethrough. At least a portion of the retaining cap 1014 is disposed within a cavity defined by the inner wall of the shield 1012 that can radially align the retaining cap 1014 by limiting a radial movement of the retaining cap 1014.

Figure 19A:
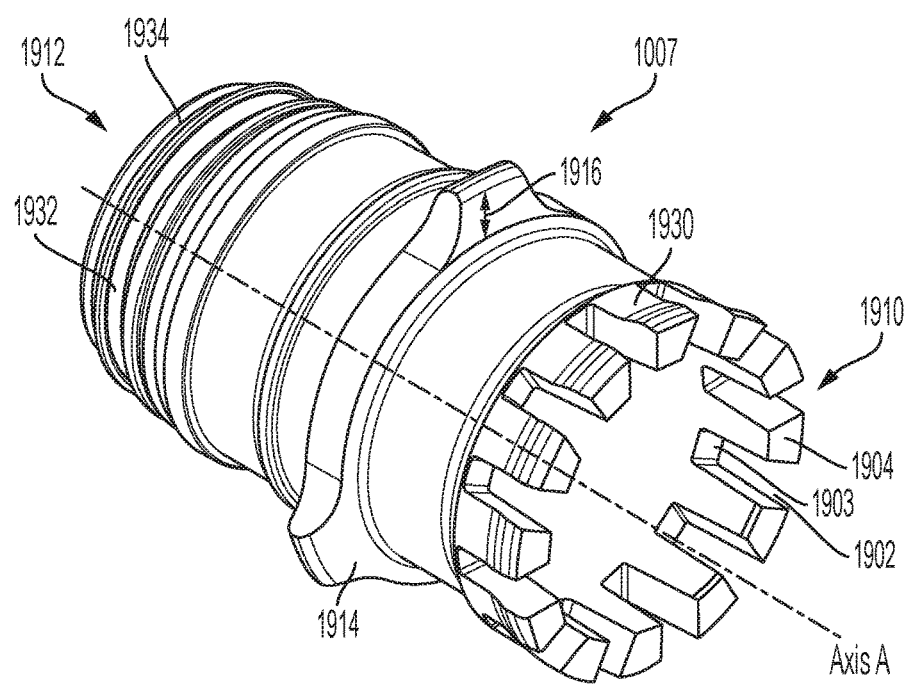
FIGS. 19a-c are various views of another exemplary configuration of the swirl ring 1007 of the cartridge 1000 of FIG. 10, according to an illustrative embodiment of the invention.
Figure 19B:
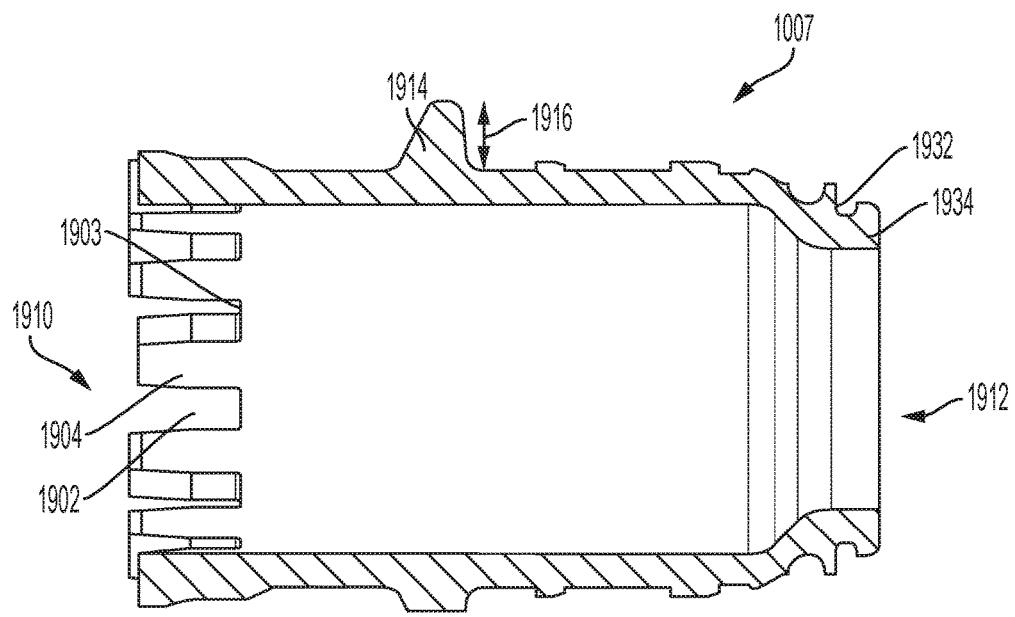
Figure 19C:
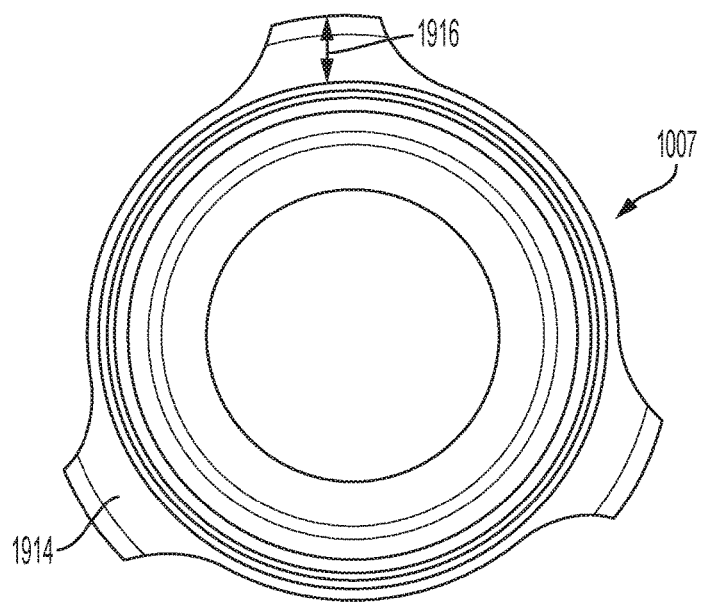

As described above, the swirl ring 1007 can be a part of the inner component 1004 of the cartridge 1000 in FIG. 10. In some embodiments, the swirl ring 1007 is substantially the same as the swirl ring 102 of FIGS. 4*a* and 4*b*. In some embodiments, the swirl ring 1007 is substantially the same as the swirl ring 702 of FIGS. 5*a* and 4*b*. FIGS. 19*a-c* are various views of another exemplary configuration of the swirl ring 1007 of the cartridge 1000 of FIG. 10. The swirl ring 1002 can be made of the same material and/or from the same manufacturing process as the swirl 102 or 702. As shown, the swirl ring 1002 can be defined by a substantially hollow, elongated body having a distal end 1910 and the proximal end 1912 along the longitudinal axis A. The hollow body of the swirl ring 1007 is dimensioned to receive the electrode 1008 and substantially extend over the length of the electrode 1008 along the longitudinal axis A. The inner wall of the swirl ring 1007 can thus radially align the electrode 1008 by limiting a radial movement of the electrode 1008. In some embodiments, the fins of the electrode 1008 are wider than the opening of swirl ring 1007 at the proximal end 1912 such that the electrode 1008 is hindered from exiting the swirl ring 1007 from the proximal end 1912.

The interface 1021 can be formed between the distal end 1910 of the swirl ring 1007 and the nozzle 1008 to join the two consumable components together. The joining can fixedly secure (i.e., axially and radially secure) the swirl ring 1007 to the nozzle 1008 via one of snap fit, crimping, frictional fitting or threading. Alternatively, the joining can rotatably engage and axially secure the swirl ring 1007 to the nozzle 1008 (e.g., via one of snap fit, crimping, or frictional fitting) that permits the components to independently rotate relative to each other after engagement. For example, the swirl ring 1007 can include a nozzle retention surface 1930 (e.g., interior and/or exterior surface) of the swirl ring 1007 for fixedly securing or rotatably engaging and axially securing the nozzle 1010 at its distal end 1910. The nozzle retention surface 1930 can be a feature (e.g., one or more grooves) located on the external surface of the swirl ring 1007 (e.g., on the extensions 1904) to capture the nozzle 1010 through crimping. Alternatively, a similar retention surface can be disposed on the nozzle 1010 to retain the swirl ring 1007 thereto.

Another interface 1023 can be formed between the proximal end 1912 of the swirl ring 1007 and the crown 1006 to join the two consumable components together. The joining can fixedly secure the crown 1006 and the the swirl ring 1007 via one of snap fit, crimping, frictional fitting or threading. Alternatively, the joining can rotatably engage and axially secure the swirl ring 1007 to the crown 1006 (e.g., via one of snap fit, crimping, or frictional fitting) that permits the components to independently rotate relative to each other after engagement. For example, the swirl ring 1007 can include a retention feature 1932 located on a surface (e.g., interior and/or exterior surface) of the swirl ring 1007 for fixedly securing or rotatably engage and axially securing the crown 1006 at its proximal end 1912. The retention feature 1932 can be one or more grooves located around an external surface of the swirl ring 1007 to capture the crown 1006 through crimping, for example, to form the interface 1023. Alternatively, a similar retention feature can be disposed about crown 1006 to join the swirl ring 1007 thereto. In general, the interface 1021 and/or the interface 1023 form a chamber in which the electrode 1008 is disposed and aligned (longitudinally and radially) relative to the nozzle 1010 and the crown 1006.

In some embodiments, the swirl ring 1007 has a set of radially spaced gas flow openings 1902 configured to impart a tangential velocity component to a gas flow for the plasma arc torch, causing the gas flow to swirl. This swirl creates a vortex that constricts the arc and stabilizes the position of the arc on the insert 1042. The one or more gas flow openings 1902 are disposed about the distal end 1910 of its elongated body, such as around a circumference of its distal end 1910. In some embodiments, the one or more gas flow openings 1902 are molded. Each gas flow opening 1902 can extend from an interior surface to an exterior surface of the elongated body and is oriented to impart a swirling motion relative to the axis A to the gas (e.g., air) flowing therethrough. Each gas flow opening 1902 can be circular or non-circular (e.g., rectangular, squared and/or square-cornered) in geometry. In some embodiments, the gas flow openings 1902 have substantially uniform dimensions. In some embodiments, as shown in FIG 19, the gas flow openings 1902 are at least partially defined by slots 1903 at the distal end 1910 of the swirl ring 1007. These gas flow slots 1903 are formed by a plurality of extensions 1904 spaced apart at regular or non-regular intervals around the circumference of the distal end 1910, where each slot 1903 is situated between a pair of the extensions 1904. Upon the swirl ring 1007 being engaged to the nozzle 1010, the slots 1903 are closed off by the proximal portion 1706 of the nozzle 1010 to create bounded holes. Hence, each gas flow opening 1902 can be a two-piece composite opening cooperatively defined by the nozzle 1010 and the swirl ring 1007. The nozzle 1010 can control the swirling strength of a gas therethrough by dimensioning the size and shape of the gas flow opening 1902 upon assembly.

In some embodiments, the swirl ring 1007 has a set of fins 1914 radially spaced around an external surface between the distal end 1910 and proximal end 1912. As illustrated in FIG. 19C, three fins 1914 are disposed around an external surface of the swirl ring 1007. Fewer or more fins are possible. The fins 1914 are configured to radially align and center the swirl ring 1007 relative to the retaining cap 1014 upon assembly of the cartridge 1000. As described above, when the inner component 1004 and the outer component 1002 are joined to form the cartridge 1000, the rear portion of the inner component 1004, which can include the swirl ring 1007, can be substantially suspended within the hollow body of the outer component 1002 and can be relatively detached from the outer component 1002 other than at the point of engagement between the inner and outer components. The fins 1914 are configured to radially align the swirl ring 1007 within the hollow body of the outer component 1002 (i.e., within the cavity defined by the inner wall of the retaining cap 1014) by limiting a radial movement of the swirl ring 1007 within the hollow body. Thus, each fin 1914 has a radial length 1916 that can be less than or equal to the radial distance between the external surface of the swirl ring 1007 (i.e., without the fins 1914) and the inner surface of the retaining cap 1014 when the swirl ring 1007 is centered within the retaining cap 1014. The fins 1914 can have substantially uniform dimensions. The fins 1914 can be a plurality of protrusions spaced apart at regular or non-regular intervals around an external circumference of the swirl ring 1007. The radial spacing between the fins 1914 allows gas to flow therethrough. In addition, each fin 1914 can be constructed such that there is a clearance between the fin 1914 and the corresponding inner sidewall of the retaining cap 1014 when the swirl ring 1007 is centered within the retaining cap 1014 to allow a gas flow therethrough. Alternatively, the fins 1914 can be located on other components of the cartridge 1000 to accomplish the same radial alignment function. For example, the fins 1914 can be disposed in an internal surface of the outer component 1002, such as on an internal surface of the retaining cap 1014, to radially align the inner and outer components upon engagement. In some embodiments, the fins 1914 comprise a mechanism (not shown) for securing the swirl ring 1007 to the retaining cap 1014 via, for example, snap fit. This connection can replace the securement mechanism between the nozzle 1010 and the swirl ring 1007 at the interface 1021.

Figure 7B:
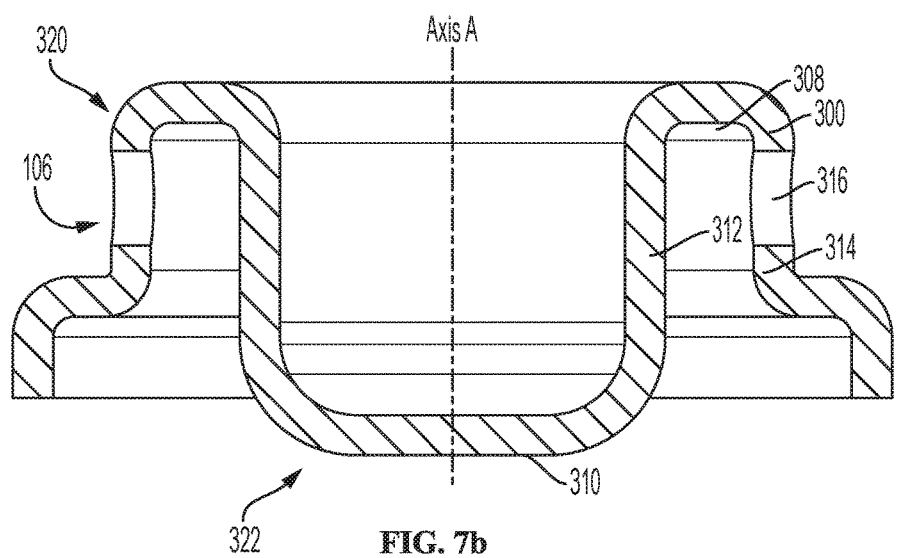
Figure 20A:
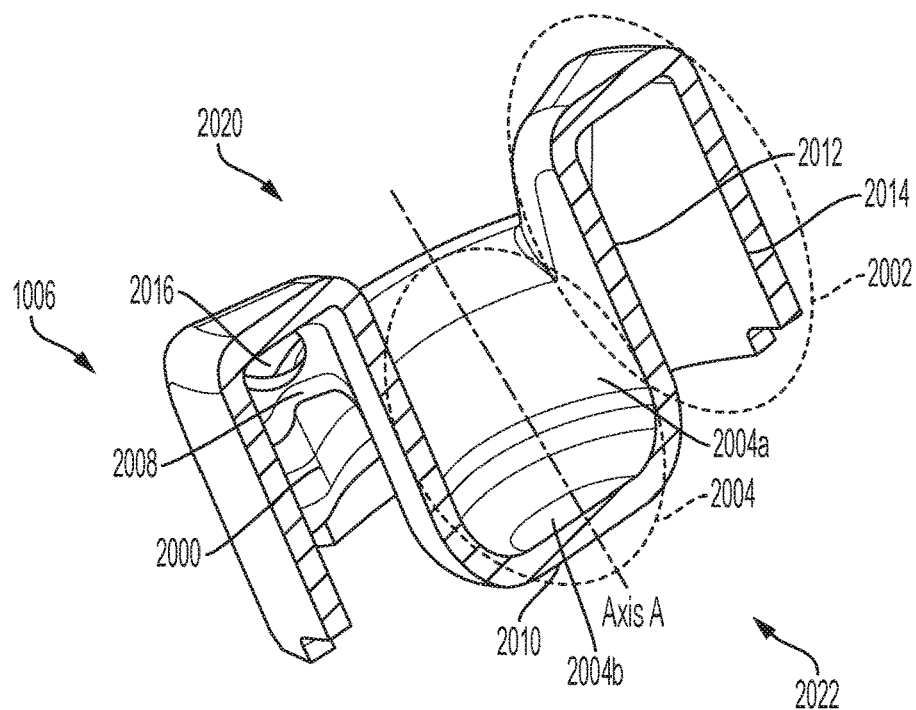
FIGS. 20a and b are exemplary configurations of the crown of the cartridge of FIG. 10, according to an illustrative embodiment of the invention.

As described above, the crown 1006 can be a part of the inner component 1004 of the cartridge 1000 in FIG. 10. In some embodiments, the crown 1006 is substantially the same as the end cap 106 illustrated in FIGS. 7a and 7b. FIGS. 20a and b are exemplary configurations of the crown 1006 of the cartridge 1000 of FIG. 10. The crown 1006 provides at least one of the following functions: (i) rotatably engaging and axially securing or fixedly securing the swirl ring 1006 at the proximal end 1912 of the swirl ring 1006 to form the interface 1023, thereby aligning the electrode 1008; (ii) mating with a cathode (not shown) of a torch head (not shown) upon assembly of the cartridge 1000 into a plasma arc torch (not shown); (iii) providing a holder for the resilient element 1026; and (iii) passing an electrical current from the cathode (e.g., a power contact for directing current from a power supply) to the electrode 1008 in a blow-back contact-start configuration.

As illustrated in FIG. 20a, the crown 1006 has a substantially hollow body 2000 defining a proximal end 2020 and a distal end 2022. The hollow body 2000 includes a circular raised portion 2002 and a depressed center 2004. The circular raised portion 2002 defines a substantially hollow protrusion extending toward the proximal end 2020 of the crown 1006 and the depressed center 2004 defines a cavity extending away from the proximal end 2020. The depressed center 2004 can be defined by a relatively cylindrical sidewall 2004a and a relatively flat bottom wall 2004b. In some embodiments, the body 2000 of the crown 1006 has a substantially uniform thickness, thereby promoting efficient and uniform current passage and assisting with the establishment of precise consumables alignment. Uniform thickness of the crown 1006, coupled with a stamp manufacturing technique, also simplifies manufacturing and minimizes manufacturing cycle time, consumable weight, and material usage.

In some embodiments, similar to the crown 106, an interior surface 2008 of the raised portion 2002 at the proximal end 2020 defines a biasing surface for physically contacting and electrically communicating with the resilient element 1026. The resilient element 1026 can bias against the proximal end of the electrode 1008 so as to move the electrode 1008 away from the crown 1006. That is, the resilient element 1026 is situated between and physically contacts the biasing surface 2008 of the crown 1006 and the proximal end of the electrode 1008 such that the resilient element 1026 imparts a separation force between the electrode 1008 and the biasing surface 2008.

In some embodiments, similar to the crown 106, an interior surface of the depressed center 2004 of the crown 1006 at the distal end 2022 defines a contact surface 2010 that is configured for physical contact and electrical communication with a corresponding contact surface 1044 of the electrode 1008 at its proximal end. During the transferred arc mode, the contact surface 2010 of the crown 1006 is in an abutting relationship with the corresponding contact surface 1044 of the electrode 1008. However, during the initiation of a pilot arc in the pilot arc mode, the contact surface 2010 is in a spaced relationship with the corresponding contact surface 1044 that is defined by an absence of contact between the two surfaces.

In some embodiments, similar to the crown 106, the resilient element 1026 is generally maintained between the crown 1006 and the electrode 1008. The resilient element 1026 can be a part of the inner component 1004 and can be secured to either the crown 1006 or the electrode 1008. In other embodiments, the resilient element 1026 is secured to both the electrode 1008 and the crown 1006. For example, the resilient element 1026 can be secured by welding, soldering, bonding, fastening, a diametral interference fit or another type of friction fit to the crown 1006 and/or the electrode 1008. In some embodiments, the substantially hollow body 2000 of the crown 1006 is configured to house the resilient element 1026 between its biasing surface 2008 and the proximal end of the electrode 1008. For example, the raised portion 2002 of the crown 1006 can function as a holder of the resilient element 1026. Specifically, the resilient element 1026 can be held in place by the biasing surface 2008, an inner interior surface 2012, and an outer interior surface 2014 of the raised portion 2002, where the diameter of the inner interior surface 2012 with respect to the longitudinal Axis A is slightly smaller than the inner diameter of the resilient element 1026, and the diameter of the outer interior surface 2014 with respect to the longitudinal Axis A is slightly larger than the outer diameter of the resilient element 1026.

In some embodiments, radial movement of the resilient element 1026 is further restrained by the proximal end 1912 of the swirl ring 1007 after the swirl ring 1007 is affixed to the crown 1006. As shown in FIG. 10, after the crown 1006 is coupled to the swirl ring 1007 (e.g., by being crimped into the engagement groove 1932 of the swirl ring 1007), the lip portion 1934 of the swirl ring 1007 can extend into the interior of the raised portion 2002 of the crown 1006. Therefore, the lip portion 1934 can further restrain and guide the positioning of the resilient element 1026 inside of the crown 1006.

In some embodiments, the depressed center 2004 of the crown 1006 is configured to substantially surround and house a cathode (not shown) of a torch head (not shown) when the cartridge 1000 is coupled to the torch head. The cathode can physically mate with at least one of the side wall 2004a or bottom wall 2004b of the cavity defined by the depressed center 2004. Upon mating with the cathode, the crown 1006 is adapted to pass an electrical current from the cathode to the electrode 1008 in a pilot mode or transferred arc mode of operation. For example, in a pilot mode of operation, an electrical current can be passed from the cathode, substantially through the side wall 2004a of the crown 1006, to the resilient element 1026 and to the electrode 1008. In a transferred arc mode of operation, an electrical current can be passed from the cathode, substantially through the bottom wall 2004b of the crown 1006, and directly to the electrode 1008 via the contact surfaces 2010, 1044.

In some embodiments, the raised portion 2002 is configured to contact and activate a consumable sensor inside of the plasma arc torch upon installation of the cartridge 1000 onto a torch head. This function of the raised portion 2002 will be described in detail below with reference to FIG. 22. In some embodiments, an opening (not shown) extending from an interior surface to an exterior surface of the crown 1006 is disposed on the tip of the raised portion 2002. The lip portion 1934 of the swirl ring 1007 can extend proximally into the crown 1006 through the opening to contact and activate the consumable sensor inside of the torch. In some embodiments, at least one optional vent hole 2016 (or gas exit orifice) is disposed in the crown 1006, extending from an interior surface to an exterior surface of the body 2000, to cool the cartridge 1000 (e.g., cooling the resilient element 1026). For example, the vent hole 2016 can be located at the proximal tip of the raised portion 2002. In some embodiments, the lip portion 1934 of the swirl ring 1006 can extend through the vent hole 2016 to activate the consumable sensor. In some embodiments, the swirl ring 1007 is a part of the crown 1006.

Figure 20B:
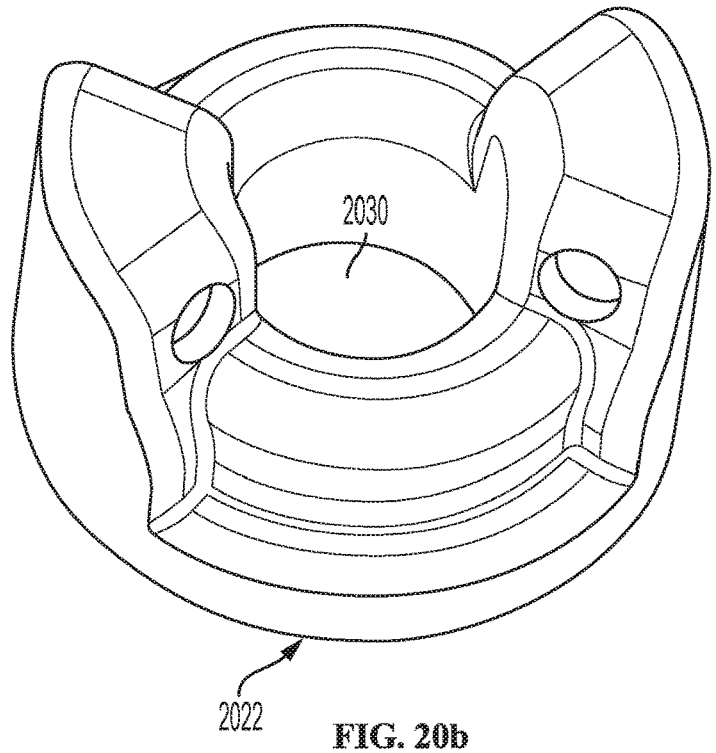

In an alternative embodiment, as illustrated in FIG. 20b, an opening 2030 extends from an interior surface to an exterior surface of the crown 1006 at the distal end 2022 of the crown 1006. The opening 2030 thus replaces the bottom wall 2004b of the cavity defined by the depressed center 2004. In this case, the cathode is adapted to extend through the opening 2030 and physically contact the electrode 1008 in the transferred arc mode.

Figure 21:
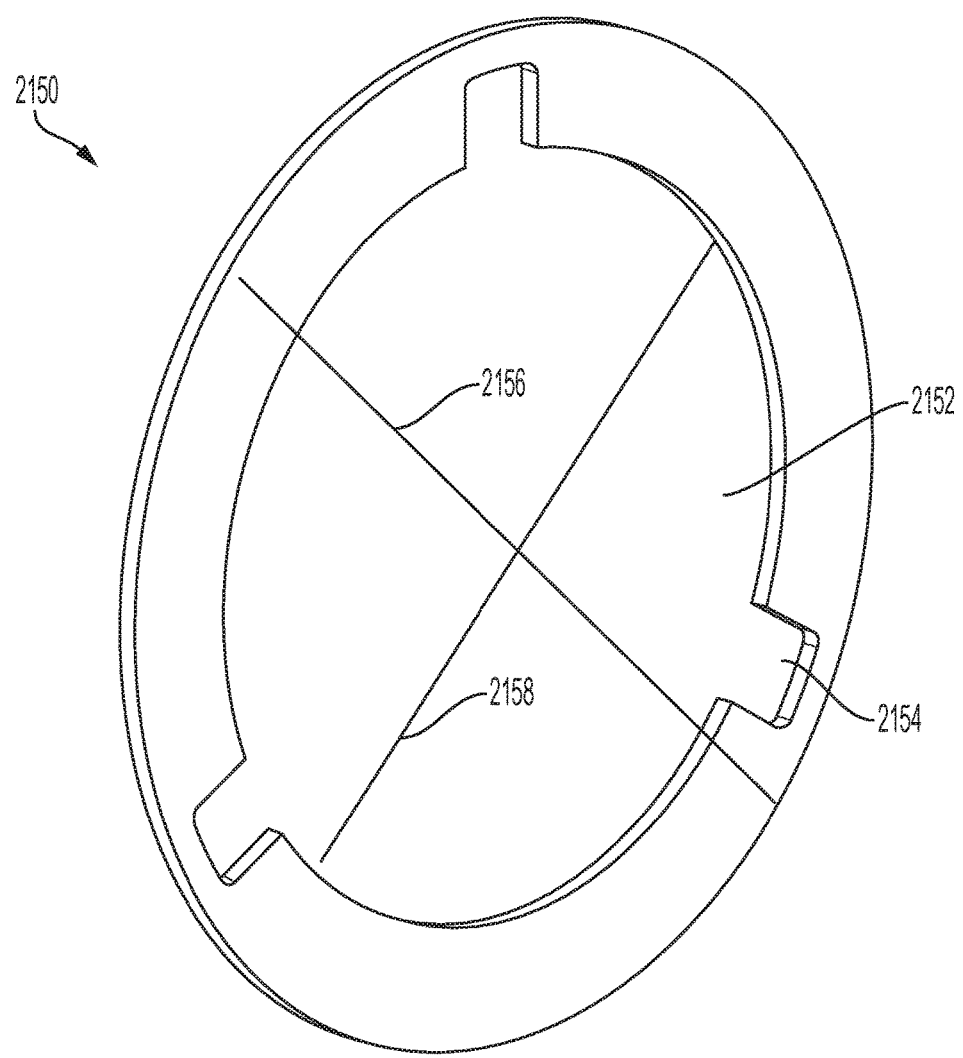
FIG. 21 shows an exemplary insert between the nozzle and the outer component of the cartridge of FIG. 10 to control gas flow, according to an illustrative embodiment of the invention.

In another aspect, a component can be inserted between the nozzle 1010 and the outer component 1002 to control gas flow therebetween. FIG. 21 shows an exemplary spacer component 2150 that can be generally located between an outer surface of the middle portion 1705 of the nozzle 1010 and an inner surface of the middle portion 1107 of the retaining cap 1014. The spacer 2150, which can be in the form of a washer, can be a part of the inner component 1004 (i.e., secured to the inner component 1004), a part of the outer component 1002 (i.e., secured to the inner component 1002), or a stand-alone piece. The spacer 2150 can be a thin, substantially circular disk with a circular opening 2152 disposed in the center that is configured to surround a circumference of an external surface of the nozzle 1010 at its middle portion 1705. For example, the spacer 2150 can be dimensioned such that (i) its outer diameter 2156 is about the same as or smaller than the interior diameter of the middle portion 1107 of the retaining cap 1014, but greater than that of the distal portion 1106 of the retaining cap 1014; and (ii) the diameter 2158 of the circular opening 2152 is same as or greater than that of the middle portion 1705 of the nozzle 1010, but less than that of the proximal portion 1706 of the nozzle 1010. In some embodiments, the circular opening 2152 has a plurality of gas passageways 2154 (e.g., in the form of rectangular slots, half circles, irregular shapes, letters, etc) connected thereto. The gas passageways 2154 can be radially dispersed around the circular opening 2152 at regular or irregular intervals. In some embodiments, the size, number and/or shape of the gas passageways 2154 are adjustable for different processes to permit different amount and/or pattern of gas therethrough. The spacer 2150 can be made from an electrically conductive material, such as brass, copper or aluminum.

Figure 22:
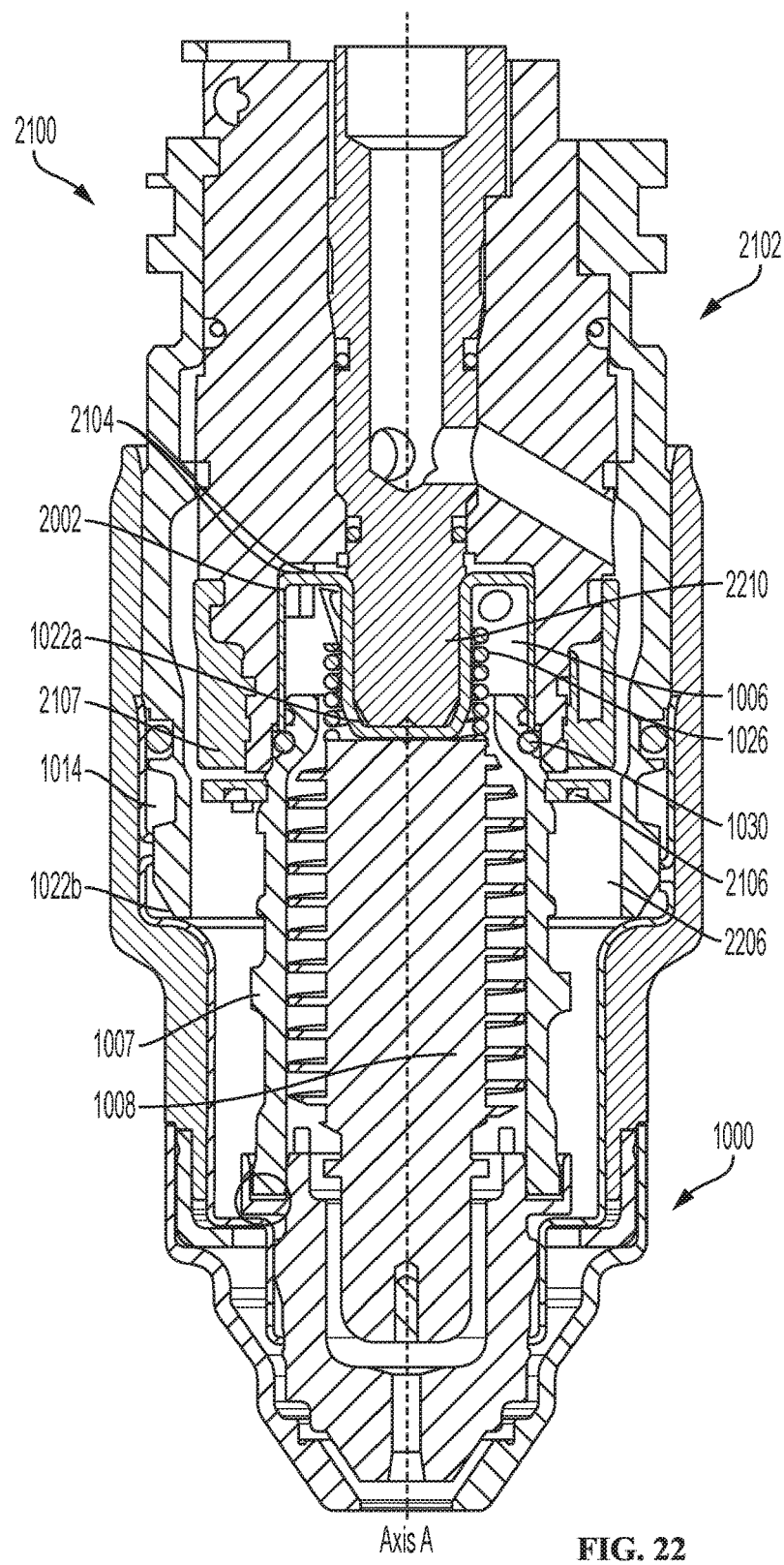
FIG. 22 shows an exemplary plasma arc torch including the cartridge of FIG. 10 and a torch head, according to an illustrative embodiment of the invention.
Figure 23:
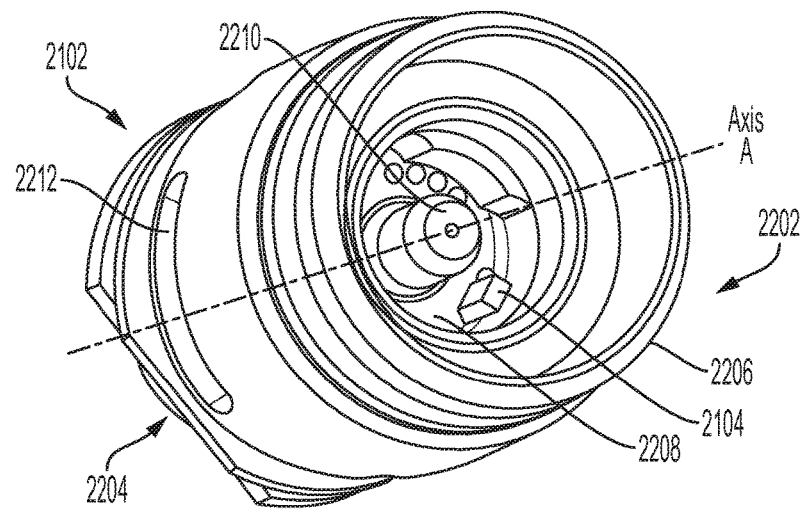
FIG. 23 is an exemplary configuration of the torch head of FIG. 22, according to an illustrative embodiment of the invention.

FIG. 22 shows an exemplary plasma arc torch 2100 including the cartridge 1000 of FIG. 10 and a torch head 2102. Generally, the hollow region 1022 of the cartridge 1000 (as shown in FIG. 10) is configured to receive the torch head 2102 and couple the torch head 2102 thereto. FIG. 23 is an exemplary configuration of the torch head 2102 of FIG. 22. The torch head 2102 defines a distal end 2202 and a proximal end 2204 along the longitudinal axis A. As shown, the distal end 2202 of the torch head 2102 generally has an outer circular portion 2206, an inner cavity portion 2208 surrounded by the outer circular portion 2206, and a cathode 2210 disposed in the cavity portion 2208, all of which are concentrically aligned along the longitudinal axis A. A consumable sensor 2104 can also be disposed in the cavity 2208 inside of the torch head 2102 substantially parallel to the cathode 2210. The outer circular portion 2206 can extend further distally along the longitudinal axis A than the cathode 2210. In some embodiments, an external surface of the outer circular portion 2006 includes one or more threads 2212 configured to engage the cartridge 1000. In some embodiments, the consumable sensor 2104 is a switch located in the interior of the torch head 2102. The consumable sensor 2104 can be in the form of a plunger, such that when it is not activated, the plunger is in an extended position. Upon activation of the consumable sensor 2104, the torch 2100 can provide a flow of current from the torch head 2102 to the cartridge 1000 to enable torch operations.

Referring to FIG. 22, the hollow region 1022 of the cartridge 1000 is shaped and dimensioned to complement the distal end 2202 of the torch head 2102 such that (i) the center cavity portion 1022a of the hollow region 1022 is adapted to mate with the cathode 2210 of the torch head 2102 and (ii) the extended tubular portion 1022b of the hollow region 1022 is adapted to mate with the outer circular portion 2206 of the torch head 2102. The center cavity portion 1022a (i.e., the cavity defined by the depressed center 2004 of the crown 1006) substantially surrounds and physically contacts at least a portion of the cathode 2210 by physically receiving the cathode 2210 extending into the cartridge 1000. Thus, the crown 1006 is disposed between the cathode 2210 and the electrode 1008, and the crown 1006 is adapted to electrically communicate with the cathode 2210 and/or the electrode 1008. Specifically, the depressed portion of the crown 1006 provides an interface that allows the cathode 2210 to maintain direct electrical communication with the electrode 1008 at least in a transferred arc mode operation. In some embodiments, if there is an opening 2030 at the bottom of the depressed portion of the crown 1006 (as shown in FIG. 20b), the cathode 2210 can be disposed through the opening 2030 to maintain direct electrical communication and physical contact with the electrode 1008 at least in a transferred arc mode operation. In some embodiments, the cathode 2210 can be adjacent to and extend substantially parallel to the resilient element 1026.

In some embodiments, mating between the cathode 2210 and the center cavity portion 1022a of the hollow body 1022 prevents the inner component 1004 (or at least the crown 1006 of the inner component 1004) from rotating in the radial plane, thereby radially locking the crown 1006 into position. Such mating also allows the raised portion 2002 of the crown 1006 to press against the consumable sensor 2104 (e.g., to push the plunger into a retracted position), thereby activating the sensor 2104 and permitting the torch to operate. In alternative embodiments, one or more raised features (not shown) in other elements of the cartridge 1000 (e.g., on the swirl ring 1007) can extend proximally pass the crown 1006 to press against the consumable sensor 2104 and activate the sensor 2014. For example, the lip portion 1934 of the swirl ring 1007 can extend pass the vent hole 2016 or another hole (not shown) of the crown 1006 to contact and activate the consumable sensor 2104.

Because the inner component 1004 and the outer component 1002 of the cartridge 1000 are independently rotatable in the axial plane, radial locking of the inner component 1004 still permits the outer component 1002 to rotate axially. Hence, upon fixed engagement between the cathode 2210 and the inner component 1004, an operator can rotate the outer component 1002 axially such that the threads 1104 disposed on an inner surface of the retaining cap 1014 fixedly engage the complementary threads 2212 on the outer surface of the torch head 2102 to further secure the torch head 2102 to the cartridge 1000. Alternatively, threads can be disposed on the inner component 1004, such as on an outer surface of the swirl ring 1007 to engage the torch head 2102.

In some embodiments, the sealing device 1030, such as an o-ring, is coupled to an external surface of the swirl ring 1007 near its proximal end 1912 to engage an internal surface of the torch head 2102 when the cartridge 1000 is coupled to the torch head 2102. The sealing device 1030 is configured to provide a leak-proof seal of fluids (e.g., gases) between the cartridge 1000 and the torch head 2102 at that location.

In some embodiments, the signal device 2106, such an electrically writable and/or readable device, is attached to the swirl ring 1007 of the cartridge 1000 to transmit information about the swirl ring 1007 and/or other cartridge components in the form of one or more signals. Exemplary information encoded on the signal device 2106 can include generic or fixed information, such as a consumable's name, trademark, manufacturer, serial number, and/or type. In some embodiments, the encoded information is unique to the consumable, such as metal composition of the consumable, weight of the consumable, date, time and/or location of when the consumable was manufactured, etc. Information encoded to the signal device 2106 can also specify operating parameters and/or data about the consumable that is independent of a detectable physical characteristic of the consumable. The signal device 2106 can be a radio-frequency identification (RFID) tag or card, bar code label or tag, integrated circuit (IC) plate, or the like. In some embodiments, the signal device 2106 is a circular RFID tag coupled around an external surface of the swirl ring 1007 (e.g., via snap fit) near its proximal end 1912. Generally, the signal device 2106 can be a part of the cartridge 1000 and positioned at a location in the cartridge 1000 away from metallic components that can interfere with signal transmission and reception. In some embodiments, a receiver 2107 can be disposed in the torch head 2102 or the cartridge 1000 to receive information wirelessly transmitted by the signal device 2106. The receiver 2107 is adapted to process these signals to extract the pertinent data and forward the data to a processor (not shown) for analysis.

Figure 24A:
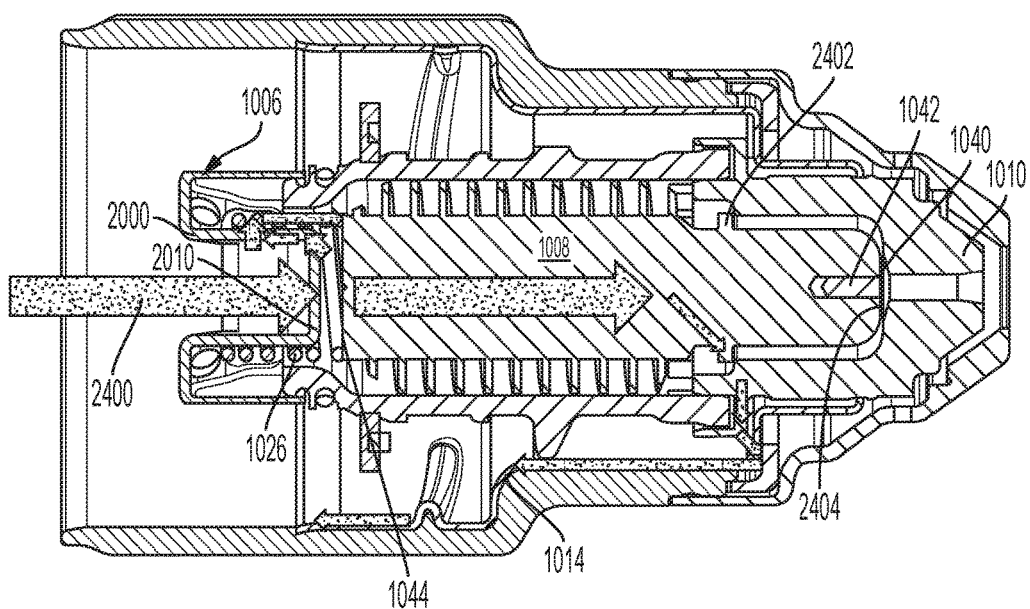
FIGS. 24a and b show exemplary pilot arc current flow paths through the cartridge of FIG. 10 during pilot arc initiation, according to an illustrative embodiment of the invention.

FIGS. 24a and b show exemplary pilot arc current flow paths through the cartridge 1000 of FIG. 10 during pilot arc initiation. Specifically, FIG. 24a shows an exemplary pilot arc current flow path 2400 through the cartridge 1000 if the electrode 1008 has at least one flange 2402 disposed around a circumference of the electrode body. In a pilot arc mode of torch operation, the flange 2402 is adapted to make contact with the nozzle 1010 instead of the distal end 2404 of the electrode 1008. In addition, there may be a clearance between the distal end 2404 of the electrode 1008 and the nozzle 1010 when the flange 2402 makes contact with the nozzle 1010. As describe above, a pilot arc current 2400 can be provided by a power supply (not shown) from the torch head 2102 to the cartridge 1000 upon activation of the consumable sensor 2104. As shown, the pilot arc current 2400 is adapted to travel from the cathode 2210 of the the torch head 2102, via the body 2000 of the crown 1006 where it contacts the cathode 2210, to the resilient element 1026 housed inside of the crown 1006. The pilot arc current 2400 can pass to the electrode 1008 through the resilient element 1026 that biases the electrode 1008 against the nozzle 1010. As the resilient element 1026 urges the electrode 1008 into an abutting relation with the nozzle 1010 at the flange 2402, there is an absence of physical contact and electrical communication between the contact surface 2010 of the crown 1006 and the corresponding contact surface 1044 of the electrode 1008. The resilient element 1026 can be configured to pass substantially all of the pilot arc current 2400 from the crown 1006 to the electrode 1008. The current 2400 continues to flow from the flange 2402 of the electrode 1008, to the nozzle 1010 and return to the power supply via the retaining cap 1014 and the torch head (not shown).

Figure 24B:
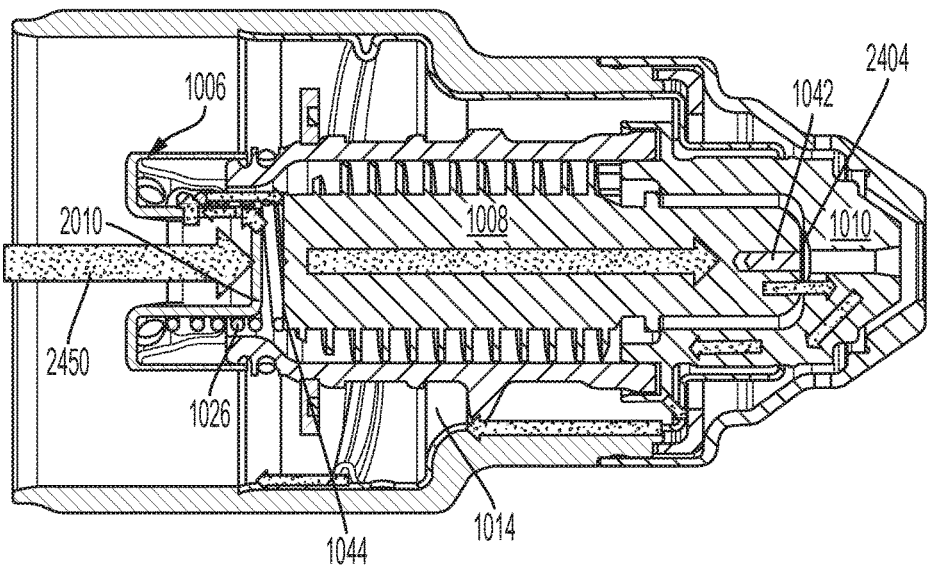

FIG. 24b shows an exemplary pilot arc current flow path 2450 through the cartridge 1000 if the electrode 1008 does not have any nozzle-contacting feature (e.g., the flanges 2402) other than the distal end 2404, where the halfnium 1042 is located. In this configuration, the pilot arc current path 2450 is similar to the pilot arc current path 2400 except the distal end 2404 of the electrode 1008 is adapted to contact the nozzle 1010 as the resilient element 1026 urges the electrode 1008 into an abutting relation with the nozzle 1010.

After pilot arc initiation, a gas is introduced into the plasma chamber 1040 between the electrode 1008 and the nozzle 1010. Gas pressure can build within the plasma chamber 1040 until the pressure is sufficient to overcome the separation force exerted by the resilient element 1026. At that point, the gas pressure moves the electrode 1008 toward the crown 1006 and away from the nozzle 1010 along the longitudinally axis A (while compressing the resilient element 1026) until the corresponding contact surface 1044 of the electrode 1008 comes into physical contact with the contact surface 2010 of the crown 1006. As the electrode 1008 is moved away from the nozzle 1010 by gas pressure, an arc is generated or initiated in the plasma chamber 1040 to form a plasma arc or jet that can be transferred to a workpiece (not shown).

Figure 25:
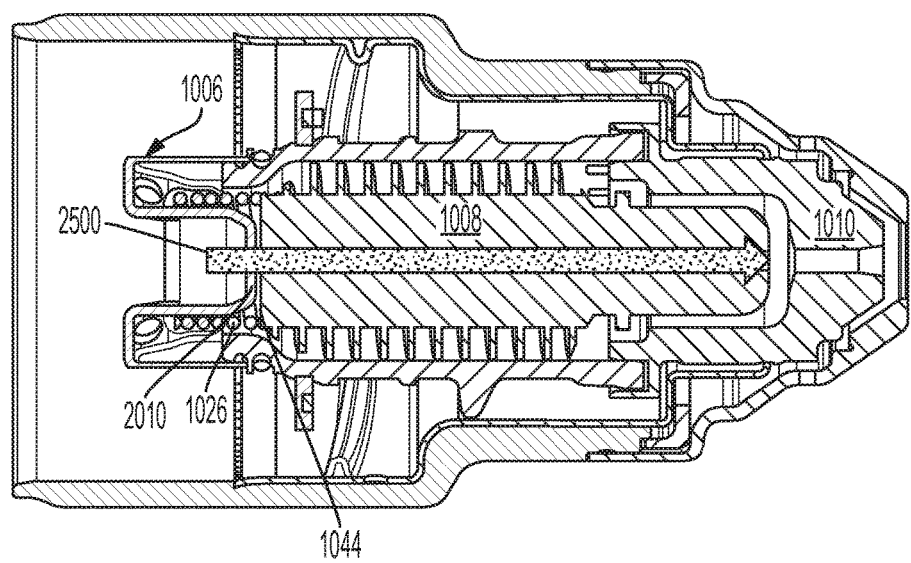
FIG. 25 shows an exemplary transferred arc current flow path through the cartridge of FIG. 10 during transferred arc mode of torch operation, according to an illustrative embodiment of the invention.

FIG. 25 shows an exemplary transferred arc current flow path through the cartridge 1000 of FIG. 10 during transferred arc mode of torch operation. In this mode, the corresponding contact surface 1044 of the electrode 1008 engages in substantially planar physical contact with the contact surface 2010 of the crown 1006 to establish electrical communication (e.g., electrical current passes between crown 1006 and the electrode 1008 at the interface of the contact surface 2010 and the corresponding surface 1044). When the contact surface 2010 of the crown 1006 abuts the corresponding surface 1044 of the electrode 1008, a current path is established such that at least a portion of the current passes directly between the two components. When the arc has been transferred to the workpiece, a cutting current is supplied to the torch (e.g., during transferred arc mode). The cutting current can be passed from the cathode 2210, through the crown 1006, to the electrode 1008 during transferred arc operation via (1) the resilient element 1026 and/or (2) the interface between the contact surfaces 2010, 1044. In some embodiments, as illustrated in FIG. 25, the current path 2500 that is directly from the cathode 2210 to the electrode 1008 via the crown 1006 has lower resistance and/or higher conductance than the current path from the cathode 2210, to the crown 1006, and through the resilient element 1026 to the electrode 1008. The lower resistance in the current path 2500 is further enhanced by the fact that the crown 1006 physically contacts both the cathode 2210 and the electrode 1008 during the transferred arc mode. Hence, substantially all of the electrical current 2500 for sustaining a plasma arc (in transferred arc mode) can be passed directly between the contact surfaces 2010, 1044.

Generally, the inner component 1002 is substantially conductive to support both the pilot arc mode and the transferred arc mode of operations. In addition, the crown 1006 can maintain direct physical and electrical contact with the cathode 2210 in both the pilot arc mode and transferred arc mode. The crown 1006 can also maintain direct physical and electrical contact with the electrode 1008 in the transferred arc mode. In some embodiments, there is an opening in the bottom wall 2004b of the depressed center 2004 of the crown 2006 that allows the cathode 2210 to physically contact and electrically communicate with the electrode 1008 in the transferred arc mode. In the pilot arc mode, the cathode 2210 may be physically separated from the electrode 1008 due to the separation force applied by the resilient element 1026 on the electrode 1008.

Figure 26:
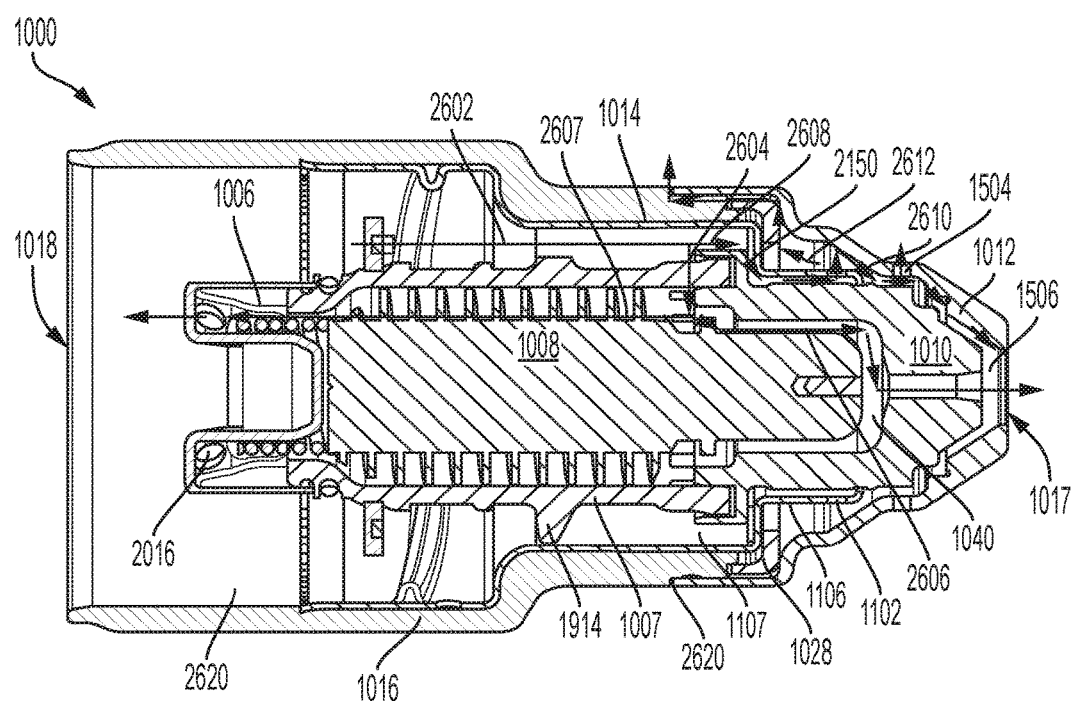
FIG. 26 is an exemplary gas flow path through the cartridge of FIG. 10, according to an illustrative embodiment of the invention.

FIG. 26 is an exemplary gas flow path through the cartridge 1000 of FIG. 10. A gas flow 2602 can be introduced into the cartridge 1000 and travel toward the distal end 1017 of the outer component 1002 in a channel between an interior surface of the retaining cap 1014 and an exterior surface of the swirl ring 1007. The gas flow 2602 is adapted to move over the fins 1914 disposed in the channel, where the fins 1914 can be on an external surface of the swirl ring 1007 and/or on an internal surface of the retaining cap 1014. The gas flow 2602 is bifurcated at the distal end 1910 of the swirl ring 1007, with (i) an electrode cooling flow 2604 directed through the set of gas flow slots 1903 on the distal end 1910 of the swirl ring 1007 and (ii) a retaining cap flow 2608 generally directed between the nozzle 1010 and the retaining cap 1014. As depicted, the electrode cooling flow 2604 can be further bifurcated into two portions, a plasma chamber flow 2606 and a vent flow 2607. The plasma chamber flow 2606 travels distally between an external surface of the electrode 1008 and an internal surface of the nozzle 1010 to cool both the electrode 1008 and the nozzle 1010 before reaching the plasma chamber 1040 to constrict the plasma arc therein. The plasma chamber flow 2606 can exit the plasma chamber 1040 through a nozzle exit orifice of the nozzle 1010 and the shield exit orifice 1506 of the shield 1012. The vent flow 2607 is adapted to travel in a reverse direction to the proximal end 1018 of the outer component 1002 and exit the cartridge 1000 through the vent hole 2016 in the crown 1006.

The retaining cap flow 2608 is adapted to travel in a channel between an internal surface of the retaining cap 1014 and an external surface of the nozzle 1010. In some embodiments, the retaining cap flow 2608 can travel through one or more gas passageways 2154 on the spacer component 2150 located between the middle portion 1107 of the retaining cap 1014 and the middle portion 1705 of the nozzle 1010. These gas passageways 2154 can be sized and dimensioned to regulate the gas flows therethrough. The retaining cap flow 2608 can continue to the section of the channel between the distal portion 1106 of the retaining cap 1014 and the middle portion 1705 of the nozzle 1010. In some embodiments, the flat elements 1710a on the external surface of the nozzle 1010 provide spacing between the nozzle 1010 and the retaining cap 1014 to permit gas flow therethrough. At the distal portion 1106 of the retaining cap 1014, one or more vent holes 1102 disposed on the retaining cap 1014 allows the retaining cap flow 2608 to flow out of the channel between the retaining cap 1014 and the nozzle 1010 and bifurcate into two portions—a distal shield flow 2610 and a proximal shield flow 2612. The distal shield flow 2610 can travel toward the distal end 1017 of the outer component 1002 between the nozzle 1010 and the shield 1012 and exit the cartridge 1000 through either the shield exit orifice 1506 of the shield 1012 or the one or more vent holes 1504 on the shield 1012. The distal shield flow 2610 can cool the nozzle 1010 and the shield 1012. The proximal shield flow 2612 can flow proximally to pass through the slots 1306 and the gas channels 1318 of the insulator component 1028 disposed between the shield 1012 and the retaining cap 1014/cap sleeve 1016 assembly. The proximal shield flow 2612 can exit the cartridge 1000 via at least one vent hole 2620 located between the cap sleeve 1016 and the shield 1012. The proximal shield flow 2612 is adapted to cool the insulator component 1028 and the shield 1012.

In some embodiments, swirling and/or mixing of the gas flows (i.e., characterized by the presence of axial, radial, and circumferential components in the gas flows) can occurs at several locations throughout the cartridge 1000, such as at locations where the flow channels are relatively straight. For example, swirling and/or mixing of the vent flow 2607 can occur as it travels through the crown 1006. As another example, swirling and/or mixing of the retaining cap flow 2608 can occur as it travels in the channel between the interior surface of the distal portion 1106 of the retaining cap 1014 and the exterior surface of the middle portion 1705 of the nozzle 1010. As yet another example, swirling and/or mixing of the proximal shield flow 2612 can occur as it flows proximally through the insulator component 1028.

Figure 27:
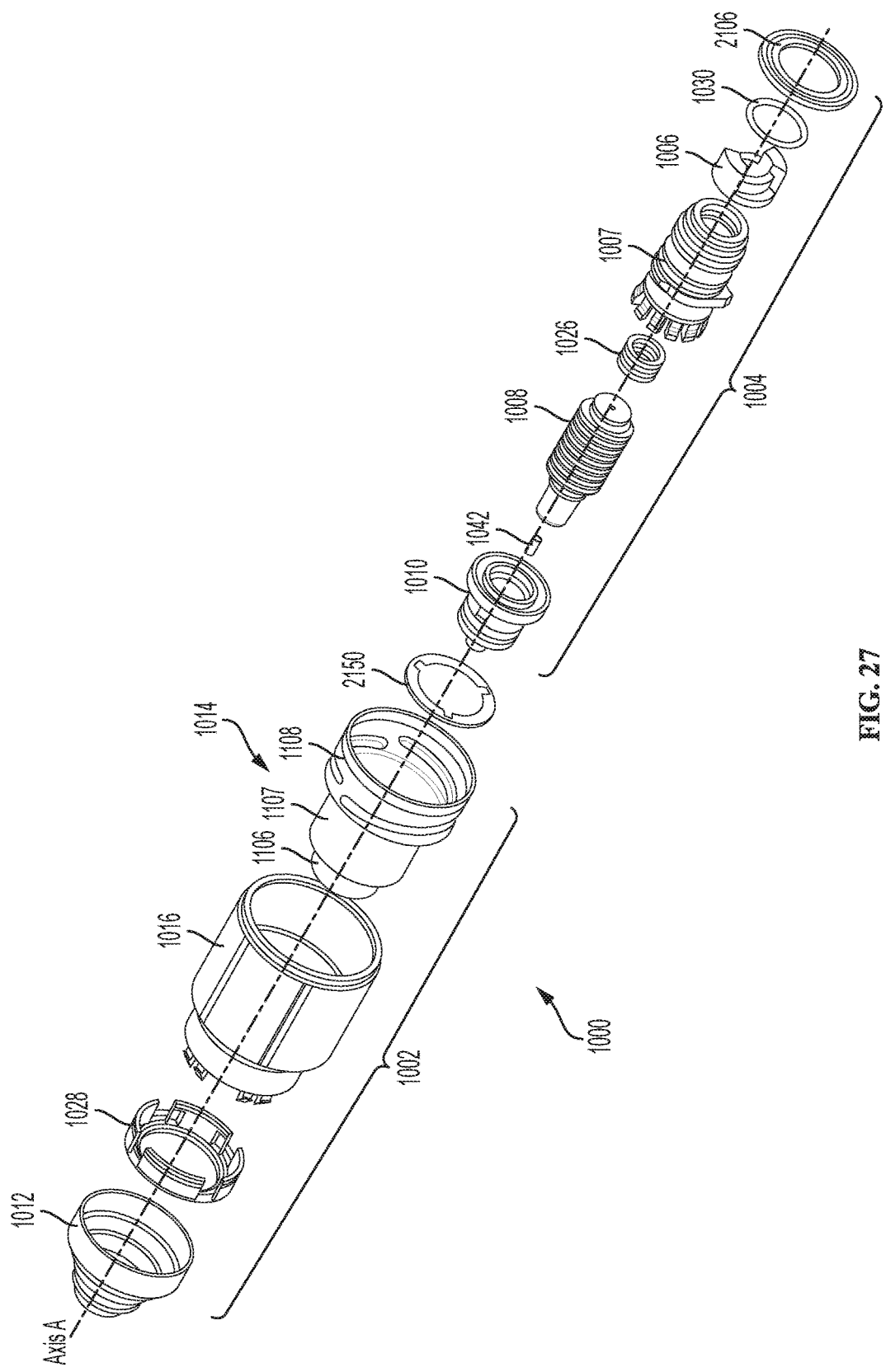
FIG. 27 is an exploded view of the cartridge of FIG. 10, according to an illustrative embodiment of the invention.

FIG. 27 is an exploded view of the cartridge 1000 of FIG. 10. FIG. 27 shows the shield 1012, the insulator component 1028, the cap sleeve 1016, the retaining cap 1014, the spacer component 2150, the nozzle 1010, the insert 1042, the electrode 1008, the resilient element 1026, the swirl ring 1007, the crown 1006, the sealing device 1030, and the signal device 2106. During assembly of the outer component 1002, the cap sleeve 1016 can be overmolded onto the retaining cap 1014 to substantially surround at least the middle portion 1107 and the proximal portion 1108 of the retaining cap 1014. The distal portion 1106 of the retaining cap 1014 can be substantially exposed. The insulator component 1028 can be fixed secured to the distal end 1208 of the cap sleeve 1016 (e.g., via snap fit) such that the distal portion 1106 of the retaining cap 1014 also passes through the opening 1316 of the insulator component 1028 and is substantially exposed. FIGS. 14a-c show an exemplary assembly of the retaining cap 1014, the cap sleeve 1016 and the insulator component 1028. The shield 1012 can be fixedly secured to the cap sleeve 1016 and the insulator component 1028 (e.g., via crimping). In some embodiments, at least one of the shield 1012, the insulator component 1028, the cap sleeve 1016 and the retaining cap 1014 (such as all of these components) form the outer component 1002. Upon assembly, the elements of the outer component 1002 are radially and concentrically aligned with respect to the longitudinal axis A.

During assembly of the inner component 1002, the electrode 1008 is housed in the chamber formed by the coupling of the nozzle 1010 to the distal end 1910 of the swirl ring 1007. The nozzle 1010 can be securely affixed to the swirl ring 1007 (e.g., via crimping). This interconnection secures the electrode 1008 within the inner component 1002 while the inner wall of the swirl ring axially aligns the electrode 1008 about the longitudinal axis A with respect to the nozzle 1010 such that the electrode 1008 is limited in its axial motion. The resilient element 1026 is inserted into the swirl ring 1007 from its proximal end 1912 until it contacts the relatively flat proximal end of the electrode 1008 within the swirl ring 1007. The crown 1006 is then securely affixed to the proximal end 1912 of the swirl ring 1007 while substantially confining the resilient element 1026 in the raised portion 2002 of the crown 1006 and axially aligning the resilient element 1026 relative to the crown 1006. The crown 1006 can be connected to the swirl ring 1007 through crimping, for example. This interconnection enables the biasing surface 2008 of the crown 1006 to bias the resilient element 1026 against the proximal end of the electrode 1008, thereby urging it into an abutting position with the nozzle 1010. This interconnection also longitudinally aligns the electrode 1008 with respect to the crown 1006 such that during the transferred arc mode, the electrode 1008 is only able to retract from the nozzle 1010 far enough until it abuts the contact surface 2010 of the depressed center 2004 of the crown 1006.

In some embodiments, the sealing device 1030 is disposed around an exterior surface of the swirl ring 1007 either before or after the crown 1006 is affixed to the swirl ring 1007. In some embodiments, the signal device 2106 is disposed around an exterior surface of the swirl ring 1007 to store and transmit information about one or more components of the cartridge 1000.

To assemble the cartridge 1000, the optional spacer 2150 can be first disposed into the substantially hollow body of the outer component 1002 from the proximal end 1206 of the cap sleeve 1016. The spacer 2150 can distally advance within the hollow body of the outer component 1002 until it reaches the distal end of the middle portion 1107 of the retaining cap 1014 and cannot advance further to move into the distal portion 1106 of the retaining cap 1014. At this point, the spacer 2150 is adapted to fit around and radially align with an interior circumference of the middle portion 1107 of the retaining cap 1014. The inner component 1004 can also be disposed into the hollow body of the outer component 1002 from the proximal end 1206 of the cap sleeve 1016. The distal end 1704 of the nozzle 1010 is adapted to move through the opening 2152 of the spacer 2150 and the opening in the distal portion 1106 of the retaining cap 1014. Such distal advancement of the inner component 1004 stops when the proximal portion 1706 of the nozzle 1010 contacts the spacer 2150 and the nozzle 1010 can no longer move through the opening 2152 of the spacer 2150. At this point, an operator can couple the outer component 1002 to the inner component 1004 to form the interface 1020 by rotatably engaging and axially securing the retention feature 1102 of the retaining cap 1014 with the retention feature 1708 on the nozzle 1010 (e.g., via snap fit) such that the two components are permitted to rotate independently relative to each other upon engagement.

In some embodiments, the engagement between nozzle 1010 and the retaining cap 1014 at the interface 1020 is fixed both axially and radially. Instead, rotational engagement and axial securement can occur at one of the interfaces 1021 or 1023. For example, the nozzle 1010 can be fixedly secured to the retaining cap 1014 at the interface 1020. Rotational engagement and axial securing between the inner and outer components occurs instead at the interface 1021 between the swirl ring 1007 and the nozzle 1010. As another example, the nozzle 1010 and the swirl ring 1007 can both be fixedly secured at the interfaces 1020 and 1021. Rotational engagement and axial securement between the inner and outer components occurs instead at the interface 1023 between the crown 1006 and the swirl ring 1007.

In some embodiments, a method is provided to assemble the cartridge 1000 of FIG. 10. The method can include disposing the inner component 1004 within a hollow body of the outer component 1002. In some embodiments, the spacer 2150 can be first disposed in the hollow body of the outer component 1002 prior to disposing the inner component 1004 within the hollow body. The method includes rotatably engaging and axially coupling the inner and outer components together by axially restraining the outer component 1002 relative to a forward portion of the inner component 1004 (e.g., at the nozzle 1010 of the inner component 1004) while permitting independent rotation of the inner and outer components relative to each other. After such engagement, a rear portion of the inner component 1004 (e.g., the swirl ring 1007, the electrode 1008, the crown 1006 and the resilient element 1026) can be substantially suspended and radially oriented within the hollow body of the outer component 1002. Such radial alignment between the inner and outer components can be assisted by the fins 1914 that can be disposed on the surface of the swirl ring 1007 or another cartridge component (e.g., an inner surface of the retaining cap 1014).

The inner component 1004 can be assembled by disposing the electrode 1008 inside of a hollow body of the swirl ring 1007, retaining the electrode 1008 within the hollow body by fixedly securing the nozzle 1010 to the distal end 1910 of the swirl ring 1007, and fixedly securing the crown 1006 to the proximal end 1912 of the swirl ring 1007. The outer component 1002 can be assembled by over-molding the cap sleeve 1016 onto the retaining cap 1014. In some embodiments, the outer component 1002 can further include the insulator component 1028 and/or the shield 1012 fixedly connected to the cap sleeve 1016 and/or the insulator component 1028.

The cartridge 1000 can be coupled to the torch head 2102 of the plasma arc torch 2100 to enable torch operations. During assembly, the torch head 2102 can be inserted into the hollow body 1022 of the cartridge 1000 such that (i) the cathode 2210 of the torch head 2102 physically mates with the center cavity portion 1022a of the hollow body 1022 that is defined by the recess of the crown 1066, and/or (ii) the extended outer circular portion 2206 of the torch head 2102 physically mates with the tubular portion 1022b of the hollow body 1022. In this configuration, the crown 1006 is positioned between the cathode 2210 and the electrode 1008 and the three components are radially and longitudinally aligned. The crown 1006 is adapted to be aligned with the consumable sensor 2104, at which position the inner component 1004 is radially fixed while the outer component 1002 of the cartridge 1000 is still independently rotatable. Thus, an operator can rotate the outer component 1002 to engage the threads 1104 on internal surface of the retaining cap 1014 of the cartridge 1000 with the complementary threads 2212 on the external surface of the outer circular portion 2206 of the torch head 2102, thereby securing the torch head 2102 to the cartridge 1000. Specifically, as the threads 1104 of the retaining cap 1014 are being rotated relative to the complementary threads 2212 of the torch head 2102, the outer component 1002 moves both radially (rotation with the threads 1104) and axially (advancement toward the torch head 2102), and the inner component 1004 can move axially advancing toward the torch head 2102, but not radially. When the threads 1104, 2212 are engaged, the torch head 2102 is fully seated.

In some embodiments, after the engagement of the torch head 2102 and the cartridge 1000, the raised portion 2002 of the crown 1006 or the extended lip 1934 of the swirl ring 1007 presses against the consumable sensor 2104 located in the interior of the torch head 2102 to activate a flow of electrical current from the cathode 2210 of the torch head 2102 to the cartridge 1000. The flow of electrical current enables one of a pilot arc mode or a transferred arc mode of torch operation. In the pilot arc mode of operation, the electrical current flows from the cathode 2210 to the biasing surface 2008 at the proximal end 2020 of the crown 1006, to the resilient element 1026 and to the electrode 1008 as a part of the current path. In the transferred arc mode of operation, the electrical current flows from the cathode 2210 to the contact surface 2010 at the distal end 2022 of the crown 1006, and to the corresponding contact surface 1044 of the electrode 1008 as a part of the current path. Alternatively, in the transferred arc mode, the electrical current can flow directly from the cathode 2210 to the electrode 1008 as the two components physically contact each other.

It should be understood that various aspects and embodiments of the invention can be combined in various ways. Based on the teachings of this specification, a person of ordinary skill in the art can readily determine how to combine these various embodiments. Modifications may also occur to those skilled in the art upon reading the specification.

What is claimed is:

1. A crown for a plasma arc torch, the crown comprising:
   a body defining a distal end that is closest to a workpiece during an operation of the plasma arc torch and a proximal end opposite of the distal end, the distal end of the body disposed adjacent to and aligned with a proximal end of an electrode of the plasma arc torch;
   at least one raised feature at the proximal end of the body, the raised feature adapted to depress a consumable sensor inside of the plasma arc torch to permit a flow of electrical current from a power supply; and
   a surface of the body having one of (i) a depressed center to conduct the electrical current through the body, or (ii) an opening adapted to provide the electrical current to the electrode.

2. The crown of claim 1, wherein the surface comprises the depressed center and the crown further comprises:
   a contact surface of the depressed center at the distal end of the body for physically contacting, during a transferred arc mode of the plasma arc torch, a corresponding surface of the electrode,
   wherein the at least one raised feature is configured to activate the consumable sensor by pressing against the consumable sensor upon installation of the crown into the plasma arc torch, thereby permitting the flow of electrical current through the contact surface to the electrode during a transferred arc mode of the plasma arc torch.

3. The crown of claim 1, wherein the body of the crown is substantially hollow and configured to retain a resilient element between a biasing surface of the body and the electrode.

4. The crown of claim 1, wherein the body of the crown has a substantially uniform thickness.

5. The crown of claim 2, wherein the body of the crown defines a cavity configured to receive at least a portion of a cathode of the plasma arc torch.

6. The crown of claim 5, wherein the contact surface is located in an interior surface of the crown body defining the cavity.

7. A cartridge consumable of a multi-piece cartridge consumable for a plasma arc torch, the cartridge consumable comprising:
   a crown defining a distal end that is closest to a workpiece during an operation of the plasma arc torch and a proximal end opposite of the distal end, the crown having one of a depressed center or an opening;

a swirl ring defining a distal end and a proximal end, the proximal end of the swirl ring disposed adjacent to and aligned with the distal end of the crown;

a nozzle fixedly connected to the swirl ring at the distal end of the swirl ring; and an electrode disposed in a chamber defined by the crown, the swirl ring and the nozzle;

at least one of the crown, the electrode, the swirl ring or the nozzle comprising a raised feature extending proximally, the raised feature configured to depress a consumable sensor to permit a flow of electrical current from a power supply to the cartridge consumable.

8. The cartridge consumable of claim 7, wherein the crown physically contacts a cathode of the plasma arc torch and is disposed between the cathode and the electrode.

9. The cartridge consumable of claim 8, wherein the opening of the crown is configured to allow at least a portion of the cathode to pass therethrough to physically contact the electrode in a transferred arc mode of operating the plasma arc torch.

10. The cartridge consumable of claim 8, wherein the depressed center of the crown defines a recess configured to permit the cathode to extend within the cartridge consumable and conduct the electrical current through the crown.

11. The cartridge consumable of claim 7, wherein the cartridge consumable is substantially conductive.

12. The cartridge consumable of claim 7, wherein a portion of the swirl ring is adapted to extend through an opening in the crown to depress the consumable sensor inside of the plasma arc torch.

13. The cartridge consumable of claim 8, wherein a spring component is adapted to extend longitudinally and substantially parallel to the cathode upon installation of the multi-piece cartridge consumable in the plasma arc torch.

14. The cartridge consumable of claim 7, further comprising a retention feature disposed on a surface of the cartridge consumable for rotationally engaging and axially securing an outer cartridge consumable of the multi-piece cartridge consumable.

15. The cartridge consumable of claim 14, wherein the retention feature is disposed on a surface of at least one of the nozzle or the swirl ring.

16. The crown of claim 1 wherein the body includes an electrically conductive material.

17. A method of installing a cartridge into a plasma arc torch, the method comprising:

assembling the cartridge consumable of claim 7;

securing a torch head to the cartridge that includes the cartridge consumable being at least a portion of an inner component and an outer component;

depressing, by the raised feature, the consumable sensor that is located inside of the torch head of the plasma arc torch; and establishing an electrical current flow path, including providing the flow of electrical current, from the power supply through the torch head and to the cartridge based on the depressing.

18. The method of claim 17, further comprising:

positioning the crown between a cathode of the torch head and the electrode; and radially and longitudinally aligning the cathode, the crown and the electrode.

19. The method of claim 18, further comprising enabling physical mating between the cathode and a recess of the crown.

20. The method of claim 18, further comprising enabling physical contact between the cathode and the electrode via an opening of the crown during a transferred mode operation of the plasma arc torch.

21. The method of claim 17, further comprising:

physically contacting, by a biasing surface at the proximal end of the crown, a resilient element; and physically contacting, by a contact surface at the distal end of the crown, a corresponding surface of the electrode during a transferred arc mode of the plasma arc torch.

22. The method of claim 21, further comprising permitting the flow of electrical current in the electrical current flow path through one of (i) the biasing surface to the resilient element during a pilot arc mode of the plasma arc torch or (ii) the contact surface to the electrode during the transferred arc mode.

23. The method of claim 17, further comprising:

disposing the cartridge consumable within a hollow body of an outer component, the cartridge consumable being at least a portion of an inner component; and axially restraining the inner component relative to the outer component while permitting independent rotation of the inner and outer components relative to each other.

24. The method of claim 23, further comprising substantially suspending and radially orienting, by the axial restraining, a rear portion of the inner component within the hollow body of the outer component.

25. The method of claim 23, further comprising radially aligning the inner component with respect to the outer component by one or more fins disposed on a surface of at least one of the inner or outer component.

26. The method of claim 17, wherein the raised feature is disposed on the crown or the swirl ring.

* * * * *